United States Patent [19]

Martz et al.

[11] 3,974,644
[45] Aug. 17, 1976

[54] COMBINED CYCLE ELECTRIC POWER PLANT AND HEAT RECOVERY STEAM GENERATOR HAVING IMPROVED MULTI-LOOP TEMPERATURE CONTROL OF THE STEAM GENERATED

[75] Inventors: Lyle F. Martz, Verona, Pa.; Richard J. Plotnick, Cherry Hill, N.J.

[73] Assignee: Westinghouse Electric Corporation, Pittsburgh, Pa.

[22] Filed: Aug. 8, 1974

[21] Appl. No.: 495,736

[52] U.S. Cl. .................. 60/39.18 B; 122/479 R; 122/7 B
[51] Int. Cl.² ..................... F02C 7/34; F02C 7/02
[58] Field of Search ............... 60/39.18 B, 666, 676, 60/661, 664; 122/7 B, 7 R, 479 D, 479 R; 415/47

[56] References Cited
UNITED STATES PATENTS

| | | | |
|---|---|---|---|
| 2,196,377 | 4/1940 | Baily | 122/479 D |
| 2,434,020 | 1/1948 | Taylor | 137/94 |
| 2,653,447 | 9/1953 | Heller | 60/39.18 B |
| 3,807,364 | 4/1974 | Schwartz | 122/7 R |
| 3,841,270 | 10/1974 | Sokolowski | 122/7 R |

FOREIGN PATENTS OR APPLICATIONS 295,189   12/1953   Switzerland........................... 60/666

*Primary Examiner*—Carlton R. Croyle
*Assistant Examiner*—L. J. Casaregola
*Attorney, Agent, or Firm*—E. F. Possessky

[57] ABSTRACT

A combined cycle electric power plant includes gas and steam turbines and a steam generator for recovering the heat in the exhaust gases exited from the gas turbine and for using the recovered heat to produce and supply steam to the steam turbine. The steam generator includes a superheater tube and a steam drum from which heated steam is directed through the superheater to be additionally heated into superheated steam by the exhaust gas turbine gases. An afterburner serves to further heat the exhaust gas turbine gases passed to the superheater tube and a bypass conduit is disposed about the superheater tube whereby a variable steam flow determined by a bypass valve disposed in the bypass conduit may be directed about the superheater tube to be mixed with the superheated steam therefrom, whereby the temperature of the superheated steam supplied to the steam turbine may be accurately controlled. Steam temperature control means includes a first control loop responsive to the superheated steam temperature for regulating the position of the bypass valve with respect to a first setpoint, and a second control loop responsive to the superheated steam temperature for controlling the fuel supply to the afterburner with respect to a second setpoint varying in accordance with the bypass valve position. In particular, as the bypass valve position increases, the second setpoint, originally higher than, is lowered toward a value substantially equal to that of the first setpoint.

23 Claims, 35 Drawing Figures

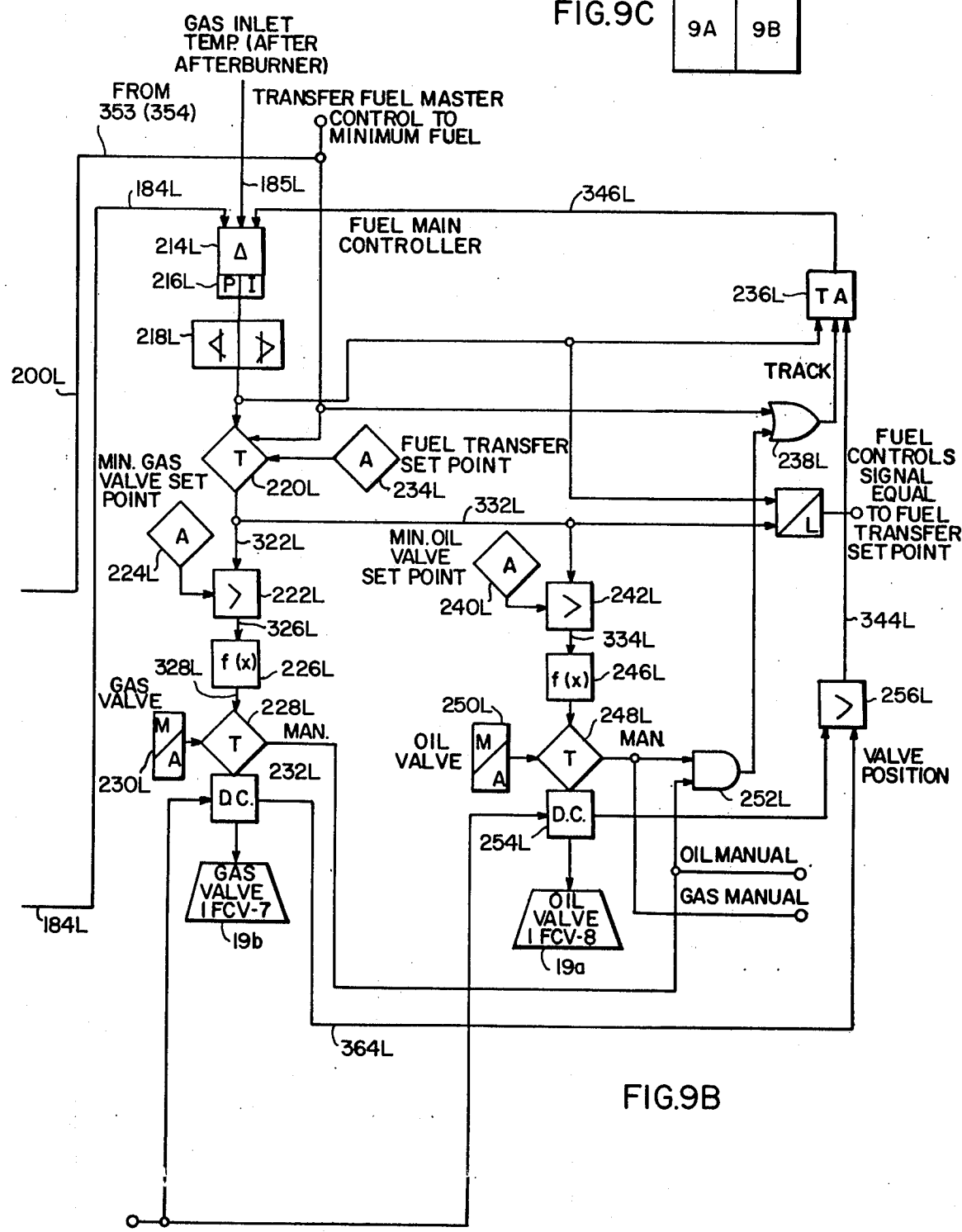

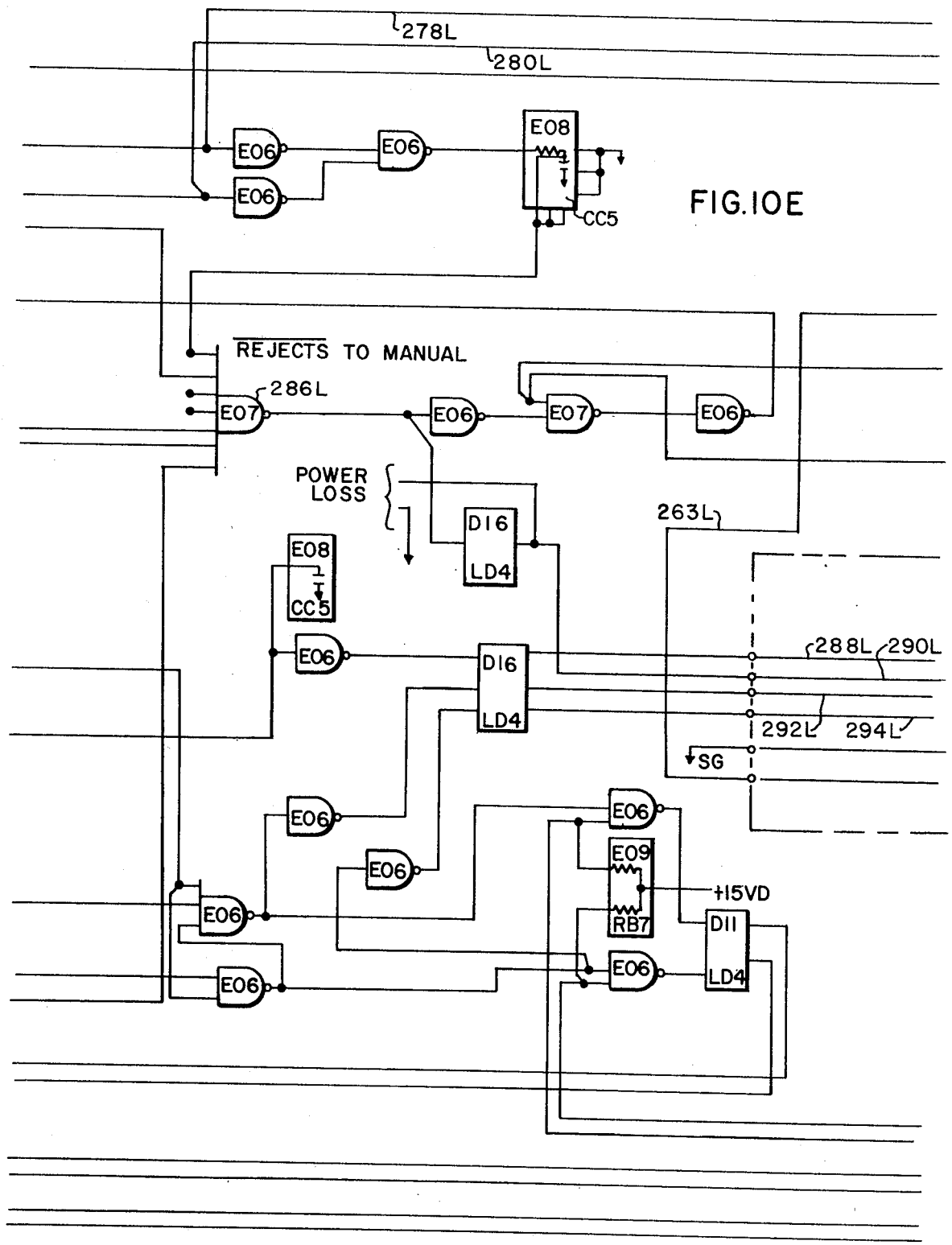

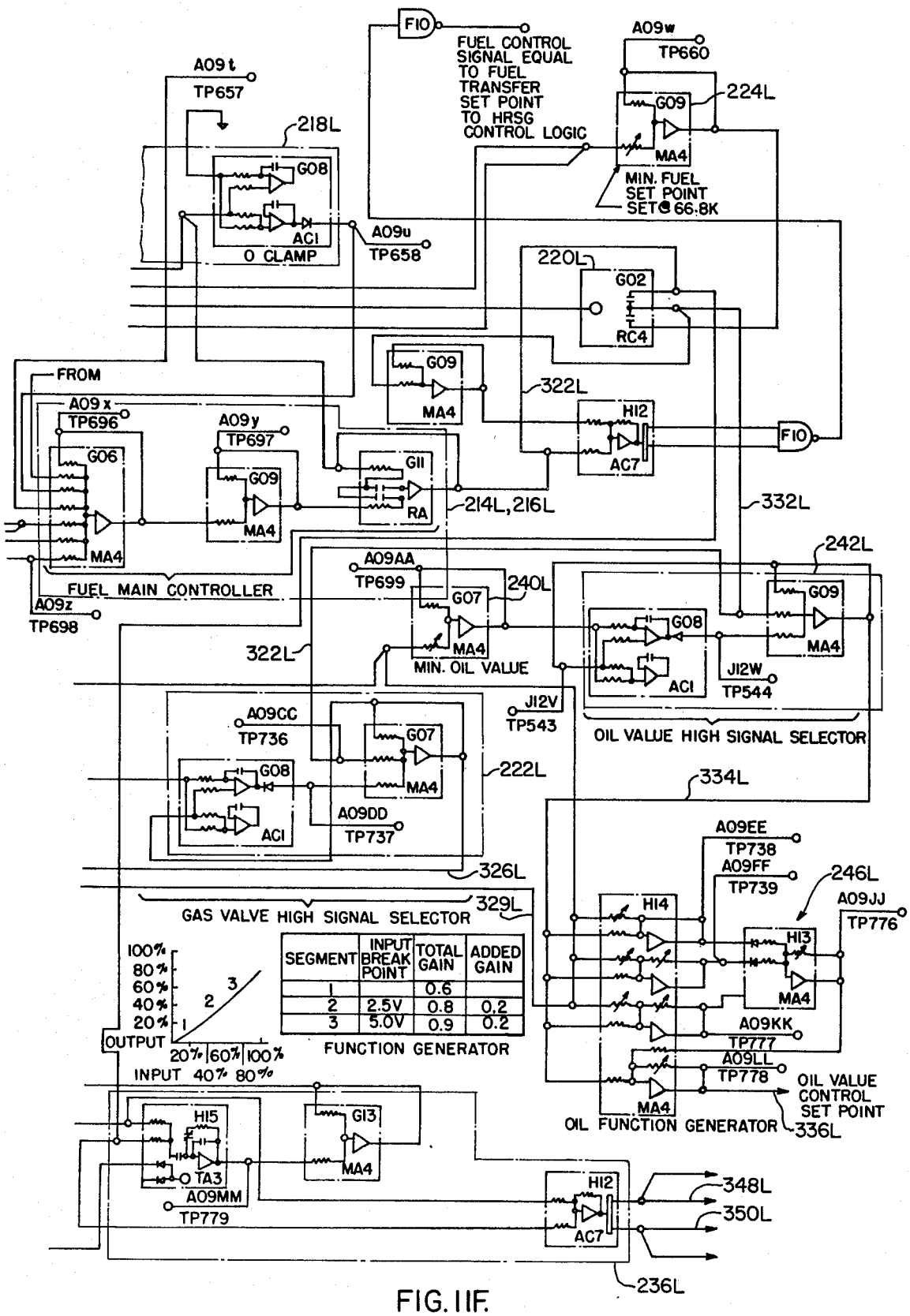
FIG. IIF.

COMBINED CYCLE ELECTRIC POWER PLANT AND HEAT RECOVERY STEAM GENERATOR HAVING IMPROVED MULTI-LOOP TEMPERATURE CONTROL OF THE STEAM GENERATED

CROSS-REFERENCE TO RELATED APPLICATION

Reference is made to application Ser. No. 495,765, filed concurrently herewith by Lyle F. Martz and Richard J. Plotnick, entitled "Combined Cycle Electric Power Plant Having a Control System Which Enables Drive Steam Generator Operation During Gas Turbine Operation" and assigned to the present assignee and related cases referred to therein, said designated case and said referred-to cases being incorporated herein by reference.

BACKGROUND OF THE INVENTION

Field of the Invention

The present invention relates to a combined cycle electric power plant and more particularly to improved superheat temperature control for heat recovery steam generators, as particularly adapted for use in combined cycle electric power plants.

Description of the Prior Art

In the design of modern electric power plants, it is a significant object to achieve the greatest efficiency possible in the generation of electricity. To this end, steam generators are designed to extract heat efficiently from and to use the extracted heat to convert a fluid such as water into superheated steam at a relatively high pressure. Further, such steam generators have been incorporated into combined cycle electric generating plants including both gas and steam turbines wherein the exhaust gases of the gas turbine are used to heat water into steam then to be transferred to the steam turbine. Typically, steam generators include a water-heating section or economizer tube, a high-pressure evaporator tube and finally a superheater tube whereby water is gradually heated while increasing levels of pressure are applied thereto to provide from the superheater tube, superheated steam to supply the steam turbine. A condenser is associated with the steam turbine to receive the spent steam therefrom and for converting it into water condensate to be fed back to the steam generator.

In a combined cycle electric power plant, the steam turbine is combined with a gas turbine whereby the heated exhaust gases of the gas turbine, otherwise lost to the atmosphere, are used to heat the circulated fluid and to convert it into steam to drive the steam turbine. In this manner, a significant reduction in the fuel required to heat the steam is achieved and the heat contained in the gas turbine exhaust gases is effectively utilized. Further, an afterburner associated with the exhaust exit of the gas turbine serves to additionally heat the gas turbine exhaust gases, whereby the heat required to generate sufficient steam to meet load requirements is provided. In particular, under conditions of relatively high loads, the heat of the gas turbine exhaust gases is insufficient to supply the steam requirements, the afterburner is turned on to further heat the gas turbine exhaust gases.

In steam heaters of the prior art, there has been suggested that control of the superheated steam may be maintained by bypassing a portion of the steam as derived from a steam drum of the steam generator, through a separate conduit about the superheater tube, whereby the bypassed steam and the superheated steam are recombined in selected proportions to achieve the desired temperature. For example, in U.S. Pat. No. 1,779,706, such a steam generator is suggested whereby primary and secondary superheater tubes are provided with a bypass conduit disposed about the primary superheater. The temperature of the steam passing from the steam generator output is measured and applied to a controller whereby the flow through the bypass conduit is controlled. The noted U.S. Pat. No. 1,779,706 does not, however, disclose that such control may be incorporated into or adapted to the particular problems of a combined cycle electric power plant.

Further, there is known in the prior art, e.g. U.S. Pat. No. 2,434,020, that the temperature of the steam output of a steam generator may be controlled by varying the fuel supply to the burner to maintain the desired steam temperature.

In the operation of a steam generator and in particular a heat recovery steam generator as incorporated into a combined cycle electric power plant, it is desired to precisely control the temperature of the superheated steam supplied to the steam turbine. There is a significant risk of damage to the system if the superheated steam temperature is permitted to exceed a predetermined critical value. If only one of the methods of controlling superheated steam heat temperature is employed as taught by the prior art, there is a risk that control of the superheated steam temperature may be lost. For example, it has been found that the use of a conduit for bypassing fluid about the superheater tube and for controlling the bypass flow, is effective for relatively low, bypass valve positions. However, as the superheated steam temperature increases and as a result thereof, the superheater bypass valve is increasingly opened, a point is reached as the valve approaches its full-open position, where the bypass valve loses its effectiveness to control the superheated steam temperature.

The description of prior art herein is made on good faith and no representation that any prior art considered is the best pertaining prior art nor that the interpretation placed on it is unrebuttable.

SUMMARY OF THE INVENTION

It is therefore an object of this invention to provide an improved temperature control of the superheated steam as generated by a steam generator and in particular, by a heat recovery steam generator as incorporated into a combined cycle electric power plant.

It is a more particular object of this invention to provide a new and improved method and apparatus of controlling the temperature of superheated steam by controlling both the flow of fluid bypassed about the superheater tube of the steam generator and the fuel supply to the afterburner.

These and other objects are accomplished in accordance with the teachings of this invention by providing a combined cycle electric power plant including a gas turbine, a steam turbine, means for generating electric power under the driving power of the turbines, and steam generating means for receiving the exhaust gases of the gas turbine and for using the heat therein to convert a transfer fluid such as water into steam to be supplied to the steam turbine. An afterburner is disposed to additionally heat the exhaust gases derived from the gas turbine. The steam generator of this invention includes a boiler drum from which heated steam is directed through a heat exchange tube, e.g. a superheater tube, a bypass conduit disposed about the superheater tube and a valve for controlling the bypass flow. Superheater steam temperature control is achieved by the coordinated control of the bypass valve and of the fuel supply to the afterburner.

In one illustrative embodiment of this invention, the superheated steam temperature control includes a first control loop for comparing a value indicative of the superheated steam temperature with a first setpoint indicative of the desired value of superheated steam temperature to provide an output for variably controlling the superheater bypass valve control position. A second control loop serves to compare a measured value of the superheated steam temperature with a second, variable setpoint for controlling a valve through which fuel is supplied to the afterburner. Coordination is provided between the first and second control loops in the form of a function generator responsive to the output of the first control loop to provide a variable output dependent upon the degree of opening of the superheater bypass valve. In particular, for relatively low openings of the superheater bypass valve, the second setpoint is set above the first, whereas the bypass valve is increasingly opened, the second setpoint is driven toward a value substantially equal to that of the first.

BRIEF DESCRIPTION OF THE DRAWINGS

These and other objects and advantages of the present invention will become more apparent by referring to the following detailed description and accompanying drawings in which:

FIG. 5G shows the manner in which FIGS. 5A to 5F are arranged;

FIGS. 9A and 9B show a functional diagram of a second control loop for controlling the valve supplying fuel to the afterburner, of the superheated steam temperature control system generally shown in FIG. 7, and FIG. 9C shows how these figures are tied together;

FIGS. 10A to 10F show in detail an illustrative embodiment of the circuitry which may be employed to perform the various functional blocks shown in FIG. 8;

DESCRIPTION OF THE PREFERRED EMBODIMENT

A. General Plant Description

Figure 1:
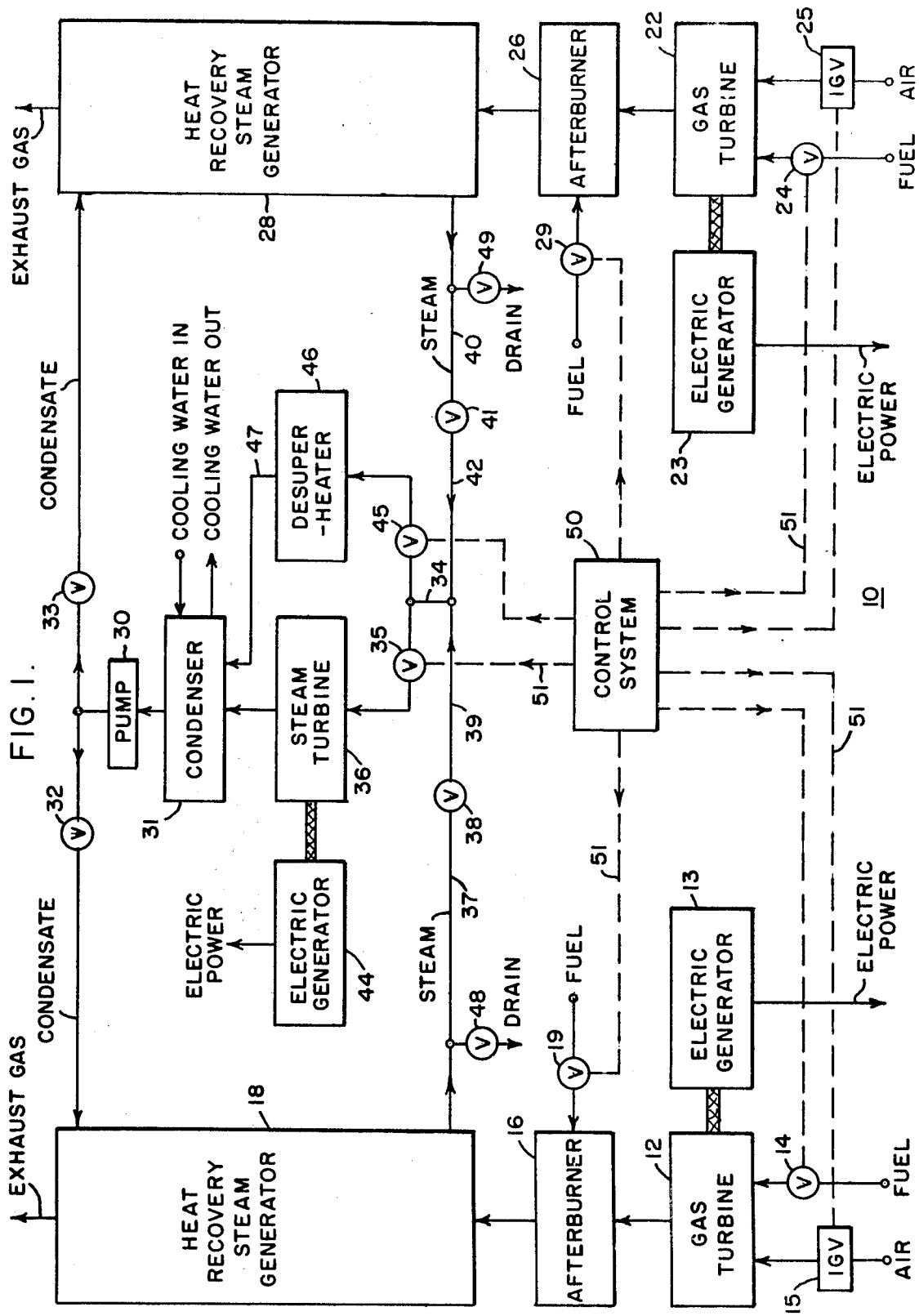
FIG. 1 shows a schematic view of a combined cycle electric power plant in which there is employed a heat recovery steam generator in accordance with the principles of this invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 inclues a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

Figure 2:
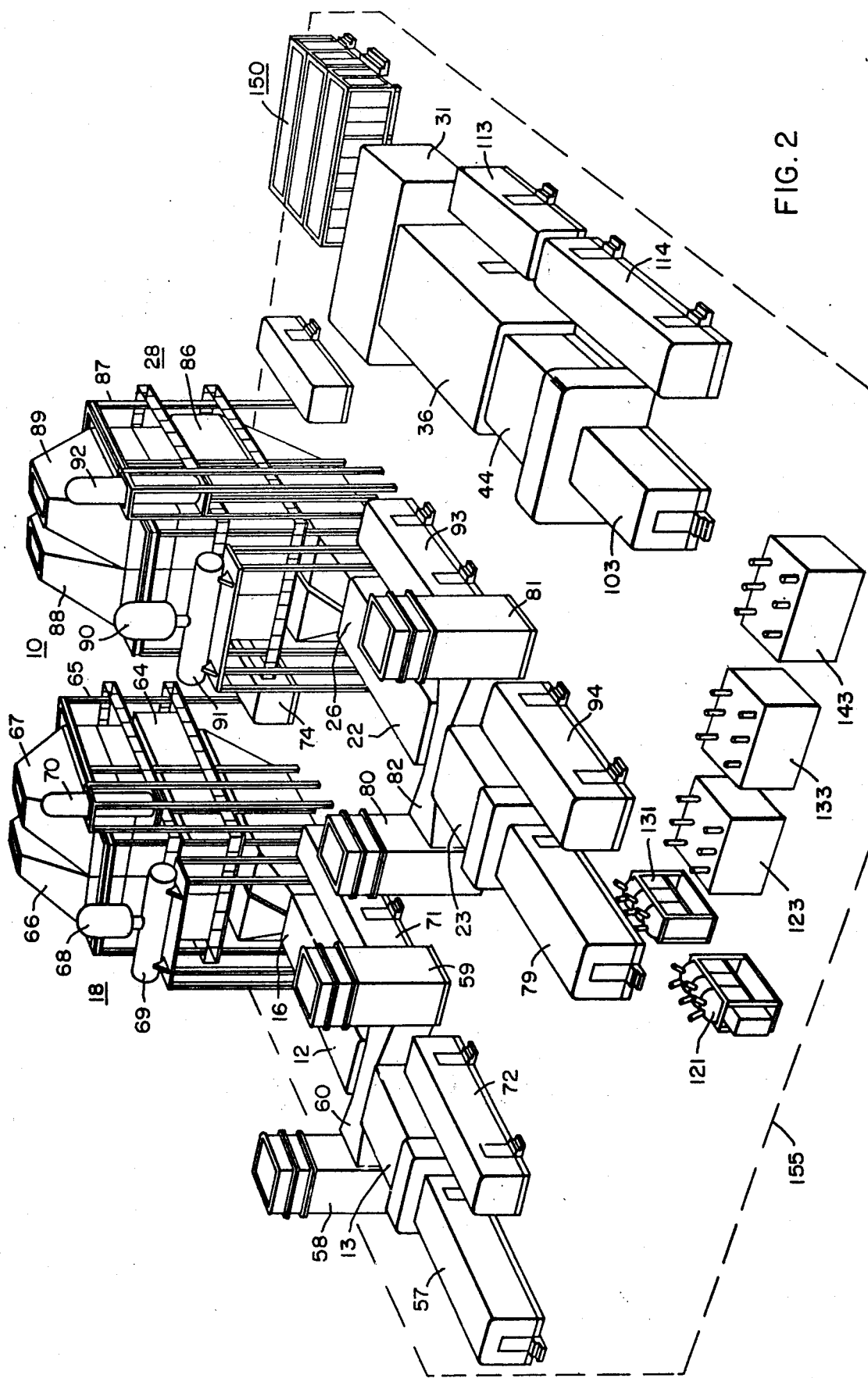
FIGS. 2 and 3 are, respectively, a perspective and top plan view of the arrangement of the combined cycle electric power plant as shown in FIG. 1.
Figure 3:
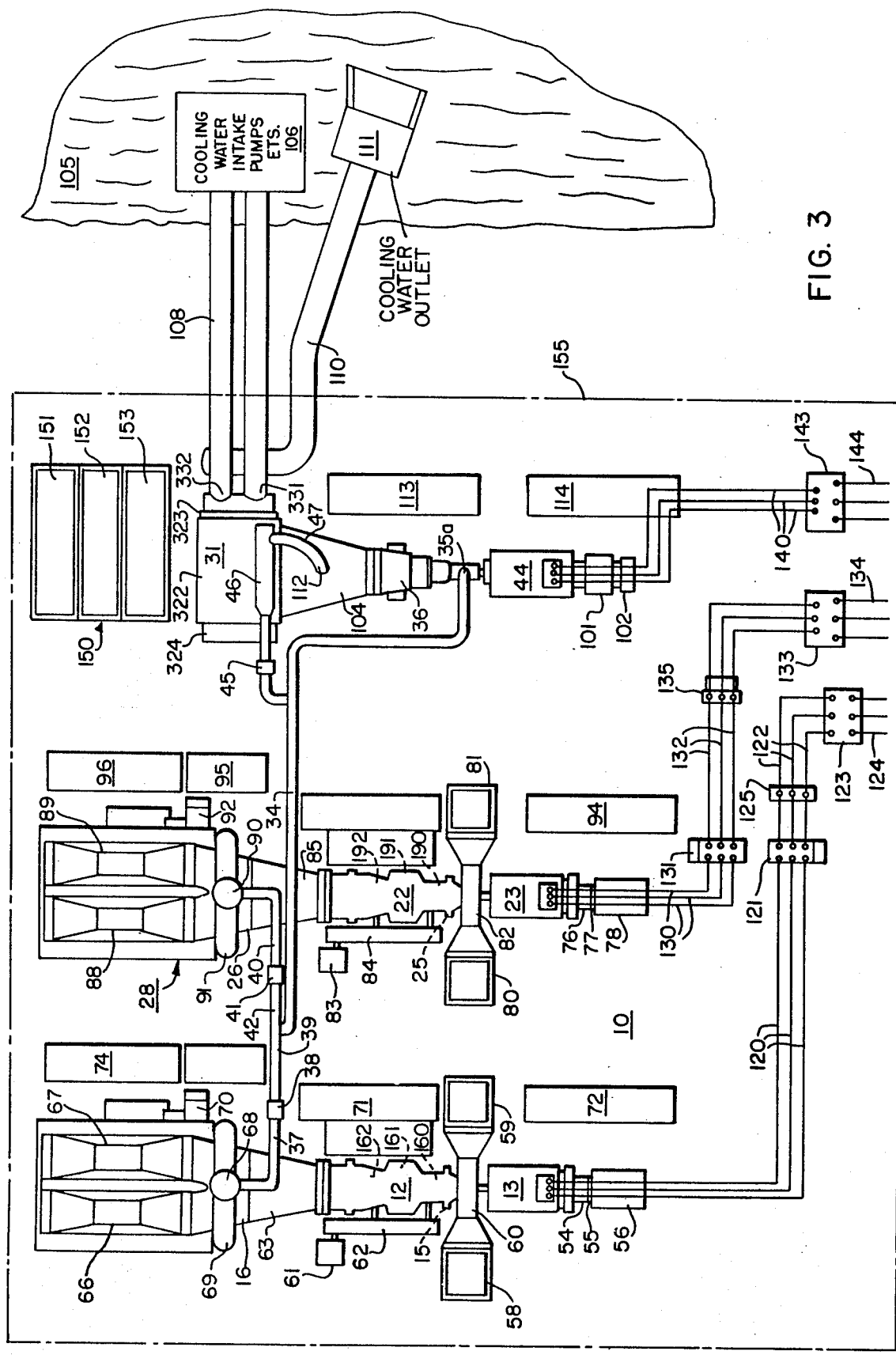

Referring now to FIGS. 2 and 3, there is shown the physical layout and overall structural nature of the apparatus included in the combined cycle electric power generating plant 10. FIG. 2 is a perspective view of the plant 10 and FIG. 3 is a plan view of the plant 10. FIG. 3 is somewhat more detailed and shows some additional structures not shown in FIG. 2. Thus, in the following description, reference will more frequently be had to FIG. 3.

As indicated in FIG. 3, the electric generator 13 is located in line with the gas turbine 12, the rotary shaft of the generator 13 being connected in tandem with the rotary shaft of the gas turbine 12. Also connected in tandem with the generator 13 on the end opposite turbine 12 is an exciter unit 54, a disengaging coupler or clutch mechanism 55 and an electrical starting motor 56. Units 54–56 are located inside the enclosure 57 shown in FIG. 2. In the present embodiment, the electric generator 13 is of the three-phase alternating-current hydrogen-cooled type and is capable of generating better than 80 megawatts of electrical power at a voltage of 13.8 kilovolts. The rated speed of generator 13 is 3,600 rpm.

The physical structure associated with the gas turbine 12 includes a pair of vertically extending air intake ducts 58 and 59 which are open at the top and which communicate at their lower ends with a horizontal air intake duct 60. The duct 60, in turn, communicates with the air intake end of the compressor section of the gas turbine 12. In geographical locations having high ambient temperatures, evaporative coolers (not shown) are located in the vertical air intake ducts 58 and 59. The inlet guide vane mechanism 15 is located in the opening at the inlet end of the compressor section of the gas turbine 12. An air-to-air heat exchanger or air cooler 61 is located alongside of the gas turbine 12 and serves to cool some air which is extracted from an intermediate stage of the gas turbine compressor and then returned to the turbine section for purposes of cooling some of the turbine blades. Air cooler 61 is coupled to the gas turbine 12 by way of cooling pipes located in an enclosure 62.

The exhaust end of the gas turbine 12 is connected by way of duct work 63 to the afterburner unit 16 which is, in turn, coupled to the intake or inlet opening of the No. 1 heat recovery steam generator 18. The steam generator 18 includes a stack structure 64 (FIG. 2) having a heavy outer steel casing, such stack structure 64 being tied to and supported by a structural steel framework 65 (FIG. 2). Located at the top of the stack structure 64 are a pair of exhaust sections 66 and 67 which serve to exhaust into the atmosphere the hot gas supplied to the steam generator 18 by the gas turbine 12. The steam generator 18 further includes a deaerator unit 68, a low pressure feedwater storage tank 69 and a vertical high pressure steam drum 70. The overall height of the steam generator 18 is approximately 52 feet or some 5 stories.

Located alongside of the gas turbine 12, the electric generator 13 and the steam generator 18 are a number of auxiliary equipment enclosures 71, 72, 73 and 74. For simplicity of illustration, enclosure 73 is not shown in FIG. 2. Enclosure 71 is a gas turbine mechanical auxiliary equipment enclosure which houses, among other things, the fuel valves, fuel pumps, pressure regulators and the like for the fuel system which supplies the fuel to the gas turbine 12, the lube oil and seal oil equipment for the gas turbine 12 and various control system components such as actuators, control relays, sensors, signal transmitters and the like used in connection with the foregoing mentioned and other mechanisms associated with the gas turbine 12.

Enclosure 72 is a gas turbine and generator auxiliary equipment enclosure which, among other things, houses a motor control center for the gas turbine 12 and generator 13, a bank of storage batteries for providing emergency auxiliary power, a battery charger system for the storage batteries, hydrogen cooling equipment for the generator 13, lube and seal oil equipment for the generator 13 and various control system components such as actuators, control relays, sensors, signal transmitters and the like used in connection with the foregoing mentioned and other mechanisms associated with the gas turbine 12 and generator 13.

Enclosure 73 (FIG. 3) is an afterburner auxiliary equipment enclosure which, among other things, houses the fuel valves for the afterburner 16. Enclosure 74 is a steam generator auxiliary equipment enclosure which, among other things, houses a main boiler feed pump, a standby boiler feed pump, a chemical treatment system including storage tanks and pumps for phosphate, hydrazine and amine, a motor control center and various motors, valves and heater controls associated with the steam generator 18 and various control system components such as actuators, control relays, sensors, signal transmitters and the like used in connection with the foregoing mentioned and other mechanisms associated with the steam generator 18.

The second electric generator 23 is located in line with the second gas turbine 22, the rotary shaft of the generator 23 being connected in tandem with the rotary shaft of the gas turbine 22. Connected in tandem with the generator 23 at the opposite end thereof is an exciter unit 76, a disengaging coupler or clutch mechanism 77 and an electric starting motor 78. Units 76–78 are located in the enclosure 79 shown in FIG. 2. Electric generator 23 is of the three-phase alternating-current hydrogen-cooled type and is capable of generating in excess of 80 megawatts of electrical power at a voltage of 13.8 kilovolts. The rated speed of generator 23 is 3,600 rpm.

The structure associated with the second gas turbine 22 includes a pair of vertical air intake ducts 80 and 81 which are open at the top and which communicates at the bottom with a horizontal air intake duct 82. Duct 82, in turn, communicates with the intake opening of the compressor section of the gas turbine 22. Air cooler 83 and cooling pipes in enclosure 84 serve to cool some air which is extracted from the compressor section of gas turbine 22 and is used to cool some of the blades in the turbine section of the gas turbine 22. The exhaust end of gas turbine 22 is coupled by way of a duct work 85 and the No. 2 afterburner unit 26 to the inlet opening of the No. 2 recovery steam generator 28.

The second steam generator 28 is of the same construction as the first steam generator 18 and, as such, includes a stack structure 86 (FIG. 2) having a heavy outer steel casing which is tied to and supported by a structure steel framework 87 (FIG. 2). Located at the top of the stack structure 86 are a pair of exhaust sections 88 and 89 which are open at the top. Steam generator 28 further includes deaerator unit 90, a low pressure feedwater storage tank 91 and a vertical high pressure steam drum 92.

Located alongside of the gas turbine 22, electric generator 23 and steam generator 28 are a gas turbine mechanical auxiliary equipment enclosure 93, a gas turbine and generator auxiliary equipment enclosure 94, an afterburner auxiliary equipment enclosure 95 (not shown in FIG. 2) and a steam generator auxiliary equipment enclosure 96. These auxiliary equipment enclosures 93–96 include the same kinds of equipment as is included in the auxiliary equipment enclosures 71–74, respectively. The equipment, mechanisms and components housed in enclosures 93–96 are used in connection with the operation of gas turbine 22, electric generator 23, afterburner 26 and steam generator 28 in the same manner that the corresponding auxiliary equipment in enclosures 71–74 is used in connection with the operation of gas turbine 12, electric generator 13, afterburner 16 and steam generator 18.

Considering now the steam turbine 36 and its associated electric generator 44, these units are, as indicated in FIG. 3, located in line with one another, the rotary shaft of the generator 44 being connected in tandem with the rotary shaft of the steam turbine 36. Coupled in tandem at the opposite end of the generator 44 is an exciter unit 101 and a turning gear 102. Units 101 and 102 are located in the enclosure 103 shown in FIG. 2. Electric generator 44 is of the three-phase alternating-current hydrogen-cooled type and is capable of generating in excess of 100 megawatts of electrical power at a voltage of 13.8 kilovolts. The rated speed of generator 44 is 3,600 rpm.

Steam turbine 36 receives superheated steam from the two steam generators 18 and 28 by way of steam pipes 34, 37, 39, 40 and 42. The exhaust end of the steam turbine 36 is connected by way of duct work 104 to the steam inlet of the condenser 31. The resulting condensed steam or condensate is collected in a hotwell (not shown) located below the condenser 31, from whence it is pumped back to the steam generators 18 and 28 by way of condensate piping which, for sake of clarity, is not shown in FIGS. 2 and 3.

Cooling water or circulating water for the condenser 31 is obtained from a nearby body of water 105, such as a river or lake or the like, at which is located a water intake station 106. Water intake station 106 includes appropriate circulating water pumps, cooling water pumps, traveling screens, trash racks, strainers, and the like for obtaining the water needed by the condenser 31 as well as the water needed by an auxiliary cooling water system to be described hereinafter. The water intake station 106 pumps circulating water by way of pipes 107 and 108 to the condenser 31 which, as will be seen, is of the divided water box type. Incoming water flowing by way of pipe 108 passes through one set of condenser tubes in the condenser 31 and is returned by way of a discharge pipe 110 and a water outlet station 111 to the body of water 105. Water flowing to the condenser 31 by way of the pipe 107 passes through a second set of condenser tubes in the condenser 31 and is returned to the body of water 105 by way of the discharge pipe 110 and the water outlet station 111. Where the body of water 105 is a river, the outlet station 111 is located on the downstream side of the intake station 106.

As is seen in FIG. 3, the desuperheater 46 in the steam bypass path is located above the condenser 31, the discharge end of the desuperheater 46 being connected by way of pipe 47 to a bypass inlet 112 in the duct work 104.

Located alongside of the steam turbine 36 is a steam turbine mechanical auxiliary equipment enclosure 113 which, among other things, houses a hydraulic system for the steam turbine valves, a lube oil system for the steam turbine 36 including a lube oil cooler and controller, a gland steam condenser, air ejector apparatus for the condenser 31 and various control system components such as actuators, control relays, sensors, signal transmitters and the like used in connection with the steam turbine 36 and the condenser 31. Located alongside of the electric generator 44 is a steam turbine and generator auxiliary equipment enclosure 114 which, among other things, houses a motor control center for the steam turbine 36 and generator 44, a bank of storage batteries for providing emergency auxiliary power, a battery charging system for the storage batteries, hydrogen cooling equipment for the generator 44, seal oil equipment for the steam turbine 36 and generator 44 and various control system components such as actuators, control relays, sensors, signal transmitters and the like used in connection with the foregoing mentioned and other mechanisms associated with the steam turbine 36, generator 44 and condenser 31.

Three-phase alternating-current electrical power is taken from the armature windings of the three-phase alternating-current generator 13 by means of power conductors 120 which run to oil-type circuit breakers 121. The output sides of circuit breakers 121 are connected by power conductors 122 to the primary windings of a three-phase main power transformer 123. The secondary windings of the main power transformer 123 are connected by means of power conductors 124 to an adjacent high-voltage transmission substation (not shown) of the electric utility system which receives the electricity generated by the electric power generating plant 10. An auxiliary transformer 125 is connected to the power conductors 122 and is used to tap off some of the electrical power produced by the generator 13 for use in operating the various electrical equipment and apparatus included in the plant 10.

Three-phase alternating-current power is taken from the armature windings of the second three-phase alternating-current generator 23 by means of power conductors 130 which run to oil-type circuit breakers 131. The output sides of circuit breakers 131 are connected by power conductors 132 to the primary windings of a second three-phase main power transformer 133. The secondary windings of the main power transformer 133 are connected by means of power conductors 134 to the adjacent high-voltage transmission substation (not shown) of the electric utility system which receives the power generated by the combined cycle plant 10. An auxiliary transformer 135 is connected to the power conductors 132 and is used to tap off some of the electrical power produced by the generator 23 for use in energizing the various electrical equipment and apparatus included in the plant 10.

Three-phase alternating-current power is taken from the armature windings of the third three-phase alternating-current generator 44 by means of power conductors 140 which run to the primary windings of a third three-phase main power transformer 143. The secondary windings of the main power transformer 143 are connected by means of power conductors 144 to the adjacent high-voltage transmission substation of the electric utility system which receives the power from the plant 10.

The adjacent high-voltage transmission substation (not shown) which is connected to the secondary windings of the three main power transformers 123, 133 and 143 via conductors 124, 134 and 144 is, in turn, connected to the electric power transmission system which is used to carry the electrical power generated by the plant 10 to the various industrial, commerical and residential customers of the electric utility system. By way of example only, the magnitude of the voltage generated by each of the generators 13, 23, and 44 may have a value of, for example 13.8 kilovolts and the magnitude of the voltage appearing across the secondary windings of each of the main power transformers 123, 133 and 143 may have a value of, for example, 230 kilovolts.

B. Heat Recovery Steam Generator Mechanical Structure

Figure 4:
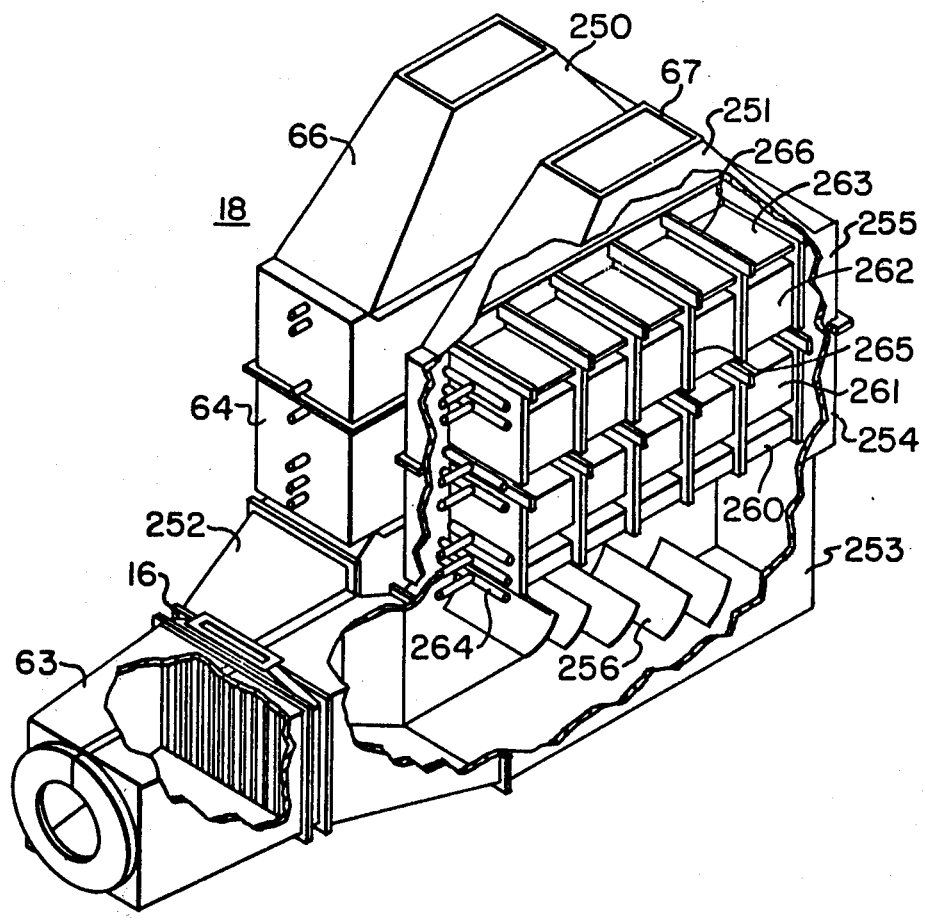
FIG. 4 shows a perspective view of a heat recovery steam generator as incorporated into the combined cycle electric power plant of FIG. 1.

Referring now to FIG. 4, there is shown in greater detail the manner of construction of the first heat recovery steam generator 18. FIG. 4 is a partially broken away perspective view of the main body portion or stack structure 64 of the steam generator 18. As there seen, the stack structure 64 is split into two separate parallel structures 250 and 251, this being done to facilitate shop assembly and transportability to the plant site. A Y-shaped diffuser duct 252 directs the hot gas from the afterburner 16 into the lower portions of each of the stack structures 250 and 251. Each of the stack structures 250 and 251 includes a turning vane module 253, a lower tube module 254, an upper tube module 255 and an exhaust transition section, the exhaust transition section for the stack structure 250 being item 66 and that for the stack structure 251 being item 67.

Located in each of the two turning vane modules 253 is a number of curved turning vanes 256 which serve to turn the hot gas flow upwardly through the remainder of the stack structure. Located inside each of the lower tube modules 254 are two separate sets or bundles of boiler tubes 260 and 261, the lower set 260 being a superheater section and the higher set 261 being a high-pressure evaporator section. The upper tube module 255 also includes two bundles or sets of boiler tubes 262 and 263, the lower set 262 being an economizer section and the upper set 263 being a low-pressure evaporator section. A typical one of the various headers for the tube sets is indicated at 264, this being the outlet header for the superheater section 260.

The tubes in all four sections 260–263 are of the serrated fin type wherein the fin is in the form of a slotted metal strip which is continuously welded to the tube. The tubes in the superheater and high-pressure evaporator sections 260 and 261 are approximately two inches in diameter, while the tubes in the economizer and low-pressure evaporator sections 262 and 263 are approximately 1.5 inches in diameter. The tubes and tube fins in the high-pressure evaporator section 261, the economizer section 262 and the low-pressure evaporator section 263 are made of carbon steel, while the tubes and tube fins in the superheater section 260 are made of chromium stainless steel. All the tubes in each of the modules 254 and 255 are supported in interlocking tube supports 265. These tube supports 265 are hung from carbon steel I-beams 266 located across the top of each of the modules 254 and 255. These I-beams 266 protrude through the module walls and are bolted to the structural steel framework 65 (FIG. 2) during plant erection.

The hot exhaust gas from the gas turbine 12 passes through the afterburner 16, is turned upwardly by the turning vanes 256 and passes through the various tube bundles 260–263. During this passage, the steam and water in the various tubes absorbs most of the heat from the turbine exhaust gas. The turbine exhaust gas is thereafter exhausted to the atmosphere by way of the exhaust transition sections 66 and 67. The temperature of the hot gas leaving the afterburner 16 and entering the steam generator 18 may, under peak load conditions, be as high as 1200° Fahrenheit, in which case, the temperature of the gas exhausted to the atmosphere by way of exhaust sections 66 an 67 will, under normal operating conditions, be on the order of approximately 340° Fahrenheit.

The exhaust openings at the tops of the transition sections 66 and 67 are provided with stack covers (not shown) having adjustable louvers which may be closed when the steam generator 18 is not in use. The diffuser duct 252 and the outer shell of each of the modules 253, 254 and 255 and the exhaust transition sections 66 and 67 are constructed of carbon steel and are internally lined with insulation material made of hydrous calcium silicate bonded with asbestos fibers. This insulation material is covered with metal lagging to prevent erosion.

A primary purpose of the turning vanes 256 is to provide a uniform distribution of gas flow through the tube bundles 260–263 and to dissipate hot spots in the gas steam caused by the afterburner 16. A further advantage is to produce an arrangement where the superheater tubes 260 absorb almost no heat by direct radiation. This latter feature enables superheater performance and tube metal temperatures to be more acurately controlled.

The construction of the steam generator 18 is such that it can be drained and vented without shutting down the gas turbine 12 and operated dry for extended periods of time with no adverse effect on the equipment. The steam generator 18, like other components in the combined cycle plant 10, is prepackaged and shipped to the plant site as factory assembled modules. In other words, each of the modules 253, 254 and 255, as well as the diffuser duct 252 and the exhaust sections 66 and 67, are completely preassembled at the factory and are individually shipped by rail or the like to the plant erection site. These various modules and sections are then bolted or welded together at the plant site to provie the complete steam generator structure. This modular approach considerably reduces the overall cost of the steam generator and holds the field erection work to a minimum.

The second heat recovery steam generator 28 is of the same construction as shown in FIG. 4 for the first heat recovery steam generator 18.

C. Detailed Plant Description

Referring now to FIGS. 5G and 5A–5F, FIG. 5G is a key diagram showing the manner in which FIGS. 5A–5F are to be arranged to form a complete view. FIGS. 5A–5F, when arranged in the manner indicated in FIG. 5G, constitute a detailed flow or piping and instrumentation diagram for the combined cycle electric power generating plant 10 of FIG. 3. As such, FIGS. 5A–5F show in greater detail the various valves, pumps, measurement devices and other items associated with the heat recovery steam generators 18 and 28, the condenser 31 and the steam turbine 36, as well as the various fluid pipes and lines which interconnect these units and their associated items. FIGS. 5A–5F also show in considerable detail the piping, valves, pumps and so forth for the fuel systems for the gas turbines 12 and 22 and the afterburners 16 and 26. At times herein, the composite figure formed by FIGS. 5A–5F will simply be referred to as FIG. 5G.

The same reference numerals used in the earlier figures will be used in FIGS. 5A–5F for elements previously described in these earlier figures. In some cases, an item previously described as a single element will be described in FIGS. 5A–5F as two or more identical elements performing the same function, usually in parallel with one another. In such cases, the same reference numeral will be used but with suffix letters a, b, c, etc. added thereto to distinguish the different ones of the identical multiple elements. For example, there is shown in FIG. 1 a single condensate pump 30 whereas, in FIG. 5B, there is shown a pair of condensate pumps 30a and 30b. During normal operation, the two pumps 30a and 30b are equivalent to the single pump 30.

Figure 5A:
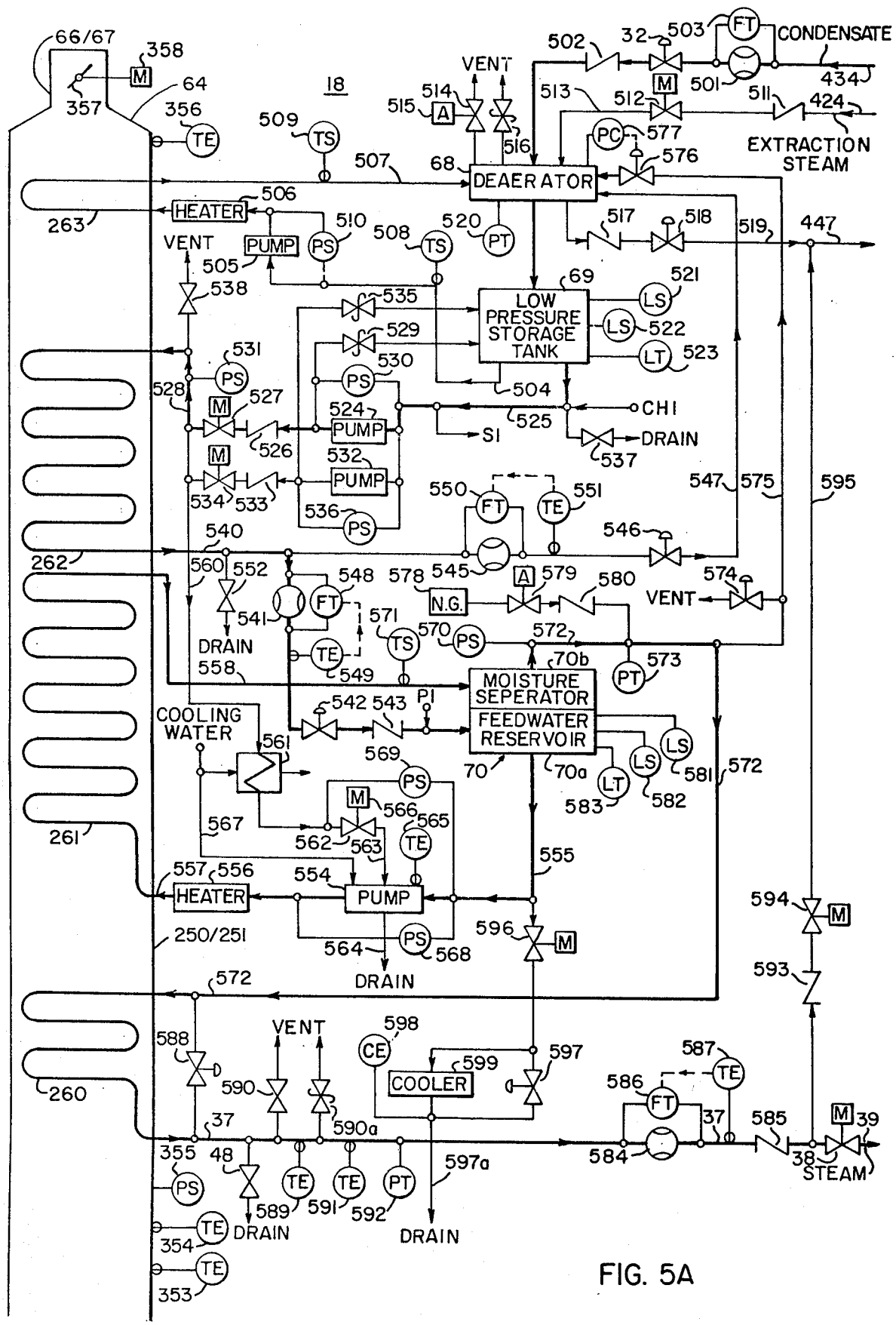
FIGS. 5A to 5F show schematically in detail the fluid interconnections between the gas turbines, the steam turbine and the steam generators as generally shown in FIG. 1.

In other instances, items shown as multiple elements in earlier figures will, for simplicity of illustration, be shown as single elements in FIGS. 5A–5F. For example, in FIG. 4, the stack structure 64 of the first steam generator 18 is shown as being comprised of a pair of parallel stack structures 250 and 251. In FIG. 5A, only a single stack structure 64 is shown, it being understood that this single structure in FIG. 5A represents, in a schematic manner, the two parallel structures 250 and 251 of FIG. 4. Thus, the superheater tubes 260 shown in FIG. 5A comprise and include the superheater tubes 260 in both of the parallel stack structures 250 and 251. The superheater tubes 260 in the two structures 250 and 251 are, in fact, operated in parallel to function, from a process flow standpoint, as a single set of tubes. This same consideration applies to the other tube sets 261, 262 and 263 included in the stack structures 250 and 251 of FIG. 4.

Various elements in FIGS. 5A–5F are identified by letter symbols. The meanings of these letter symbols are set forth in the following table:

| LETTER SYMBOL | ELEMENT DESCRIPTION |
| --- | --- |
| A | Actuator |
| C | Clutch |
| CC | Conductivity Controller |
| CE | Conductivity Element |
| CT | Conductivity Transmitter |
| E | Exciter |
| F | Filter |
| FC | Flow Controller |
| FE | Flow Element |
| FT | Flow Transmitter |
| LC | Level Controller |
| LS | Level Switch |
| LT | Level Transmitter |
| M | Motor |
| NG | Nitrogen Gas Supply |
| PC | Pressure Controller |
| PS | Pressure Switch |
| PT | Pressure Transmitter |
| S | Speed Transducer |
| TC | Temperature Controller |
| TE | Temperature Element |
| TG | Turning Gear |
| TS | Temperature Switch |
| TT | Temperature Transmitter |

The various conductivity elements (CE), conductivity transmitters (CT), flow transmitters (FT), level switches (LS), level transmitters (LT), pressure switches (PS), pressure transmitters (PT), speed transducers (S), temperature elements (TE), temperature switches (TS) and temperature transmitters (TT) shown in FIG. 5G develop various electrical signals which provide measurements of various parameters and which, in most cases, are transmitted to the digital and analog control system equipment located in the plant control center building 150 (FIG. 3) for turbine and plant control and monitoring purposes. The actuators (A), motors (M) and most of the valves shown in FIG. 5G, on the other hand, are responsive to and are controlled by control signals which, for the most part, are produced by the digital and analog control system equipment located in the plant control center building 150.

It is noted at this point that most of the valves shown in FIG. 5G are diaphragm valves of either the pneumatic of the hydraulic type. The pneumatic valves are actuated by pressurized air obtained from the plant instrument air supply. They are controlled, however, by electrical signals which are applied to electrical-to-pneumatic converters associated with the valve pneumatic mechanisms. Most of the valves associated with the heat recovery steam generators 18 and 28 and the gas turbines 12 and 22 are of the pneumatic type. On the other hand, most of the valves associated with the steam turbine 36 are hydraulic valves which are operated by electrohydraulic controls. In this case, the valve actuating fluid is high pressure oil with the hydraulic actuator mechanism being controlled by an electrical control signal. For simplicity of illustration and description, the pneumatic and hydraulic mechanisms will, for the most part, not be shown or described herein and the valves will be spoken of more or less as though they were being driven directly by the electrical control signals.

Reference is made to a printed technical paper entitled "Electro-Hydraulic Control For Improved Availability and Operation of Large Steam Turbines," presented by M. Birnbaum and E. G. Noyes at the ASME-IEEE National Power Conference at Albany, New York during Sept. 19–23, 1965, for further description of typical hydraulic valves and electrohydraulic actuators.

Considering now the No. 1 gas turbine 12 (FIG. 5D), there is associated therewith, in addition to the other elements previously considered, a turning gear 349 which is coupled to the rotary shaft structure 165 and which is used to rotate such gas turbine structure at a speed of approximatey 5 rpm just prior to a gas turbine startup and during the cool down period following a gas turbine shutdown. A speed pick-up device or speed transducer 350 is also coupled to the rotary shaft structure 165 and produces an electrical signal indicative of the speed of rotation (rpm) of the gas turbine 12 and the electric generator 13. During normal operation under load conditions, the gas turbine speed will be the synchronous value of 3,600 rpm and, during startup, it will normally be a controlled value as the turbine is accelerated to synchronous speed. Further, there is coupled to the turbine combustor shell 166 which surrounds the 16 combustors 167a-167p a pressure transmitter 351 which produces an electrical signal indicative of the magnitude of the pressure within the combustor shell. There is located in the turbine section 162 in the gas flow path at a point immediately following the last row of turbine blades an array of 16 temperature sensors or temperature elements 352a which provide signals indicative of the gas turbine blade path temperature. There is also located in the exhaust duct 63 leading from the turbine section 162 to the afterburner 16 an array of 16 temperature sensors or temperature elements 352b which provide signals indicative of the gas turbine exhaust temperature. Under peak load conditions, this exhaust temperature will be somewhere on the order of 900° to 1000° Fahrenheit.

As shown in FIG. 5A, there are located at the lower end of the stack structure 64 of the first steam generator 18 a plurality of temperature elements, including temperature elements 353 and 354, which provide indications of the steam generator inlet gas temperature. Under typical peak load conditions, this temperature will be on the order of approximately 1200° Fahrenheit as a result of added afterburner heat. A pressure switch 355 monitors the steam generator inlet gas pressure and produces a warning signal if such pressure exceeds a desired limit. Located at the top of the stack structure 64 is a further temperature element 356 which produces a signal indicative of the gas top temperature at the top of the stack. Under typical peak load conditions, this temperature will be approximately 340° Fahrenheit. Thus, under typical peak load conditions, the gas temperature varies from about 1200° Fahrenheit at the bottom of the stack 64 (temperature element 353) to about 340° Fahrenheit at the top of the stack 64 (temperature element 356). The gas temperature intermediate the superheater tubes 260 and the high pressure evaporator tubes 261 is about 1000° Fahrenheit. The gas temperature intermediate the high pressure evaporator tubes 261 and the economizer tubes 262 is about 600° Fahrenheit. The gas temperature intermediate the economizer tubes 262 and the low pressure evaporator tubes 263 is about 360° Fahrenheit.

Located at the top of the stack structure 64 is a stack cover louver structure 357 which can be closed when the gas turbine 12 is not in service. This stack cover mechanism 357 is operated by a motor 358. In passing, it is noted that there are actually two of these stack cover mechanisms 357, one being located at the top of each of the two parallel stack structures 250 and 251 (FIG. 4).

Considering now the second heat recovery steam generator 28 (FIG. 5C), there is located within the stack structure 86 thereof superheater tubes 360, high pressure evaporator tubes 361, economizer tubes 362 and low pressure evaporator tubes 363. These tubes 360-363 correspond in purpose and function to the tubes 260-263, respectively, located in the stack structure 64 of the first steam generator 18. Located at the lower end of the second stack structure 86 (FIG. 5F) are turning vanes 366 which turn the turbine exhaust gas upwardly through the tube sections 360-363.

Figure 5B:
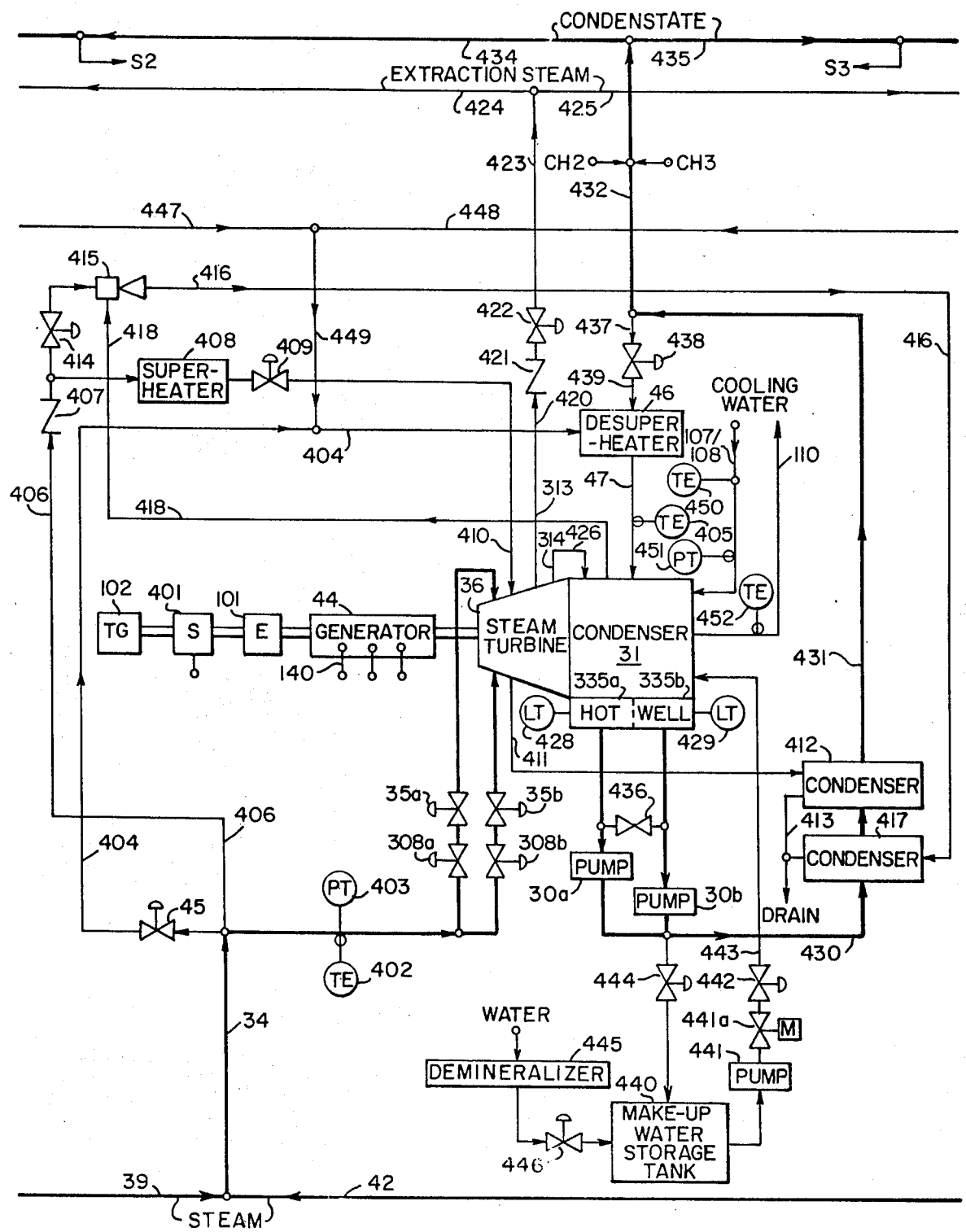
Figure 5C:
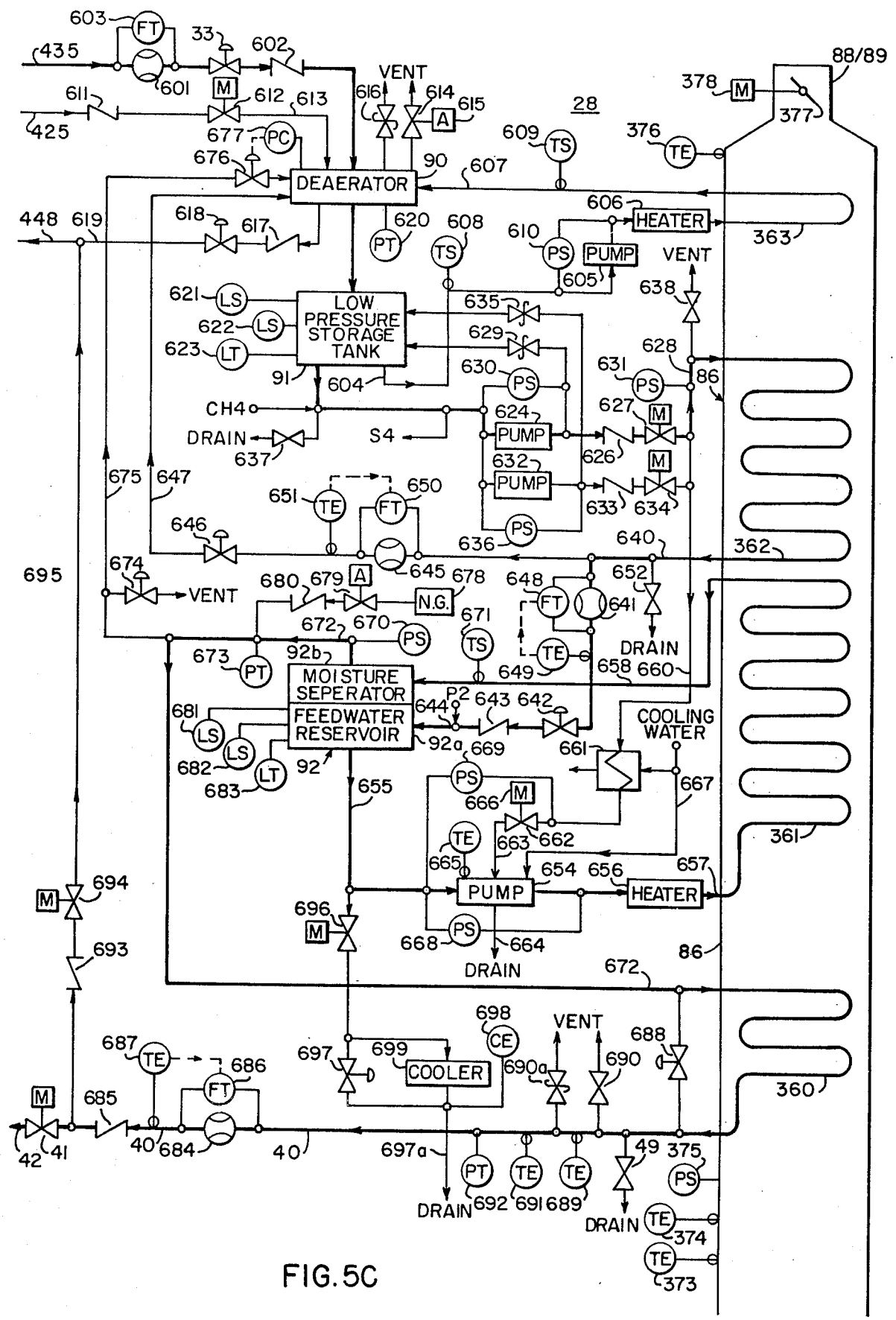
Figure 5D:
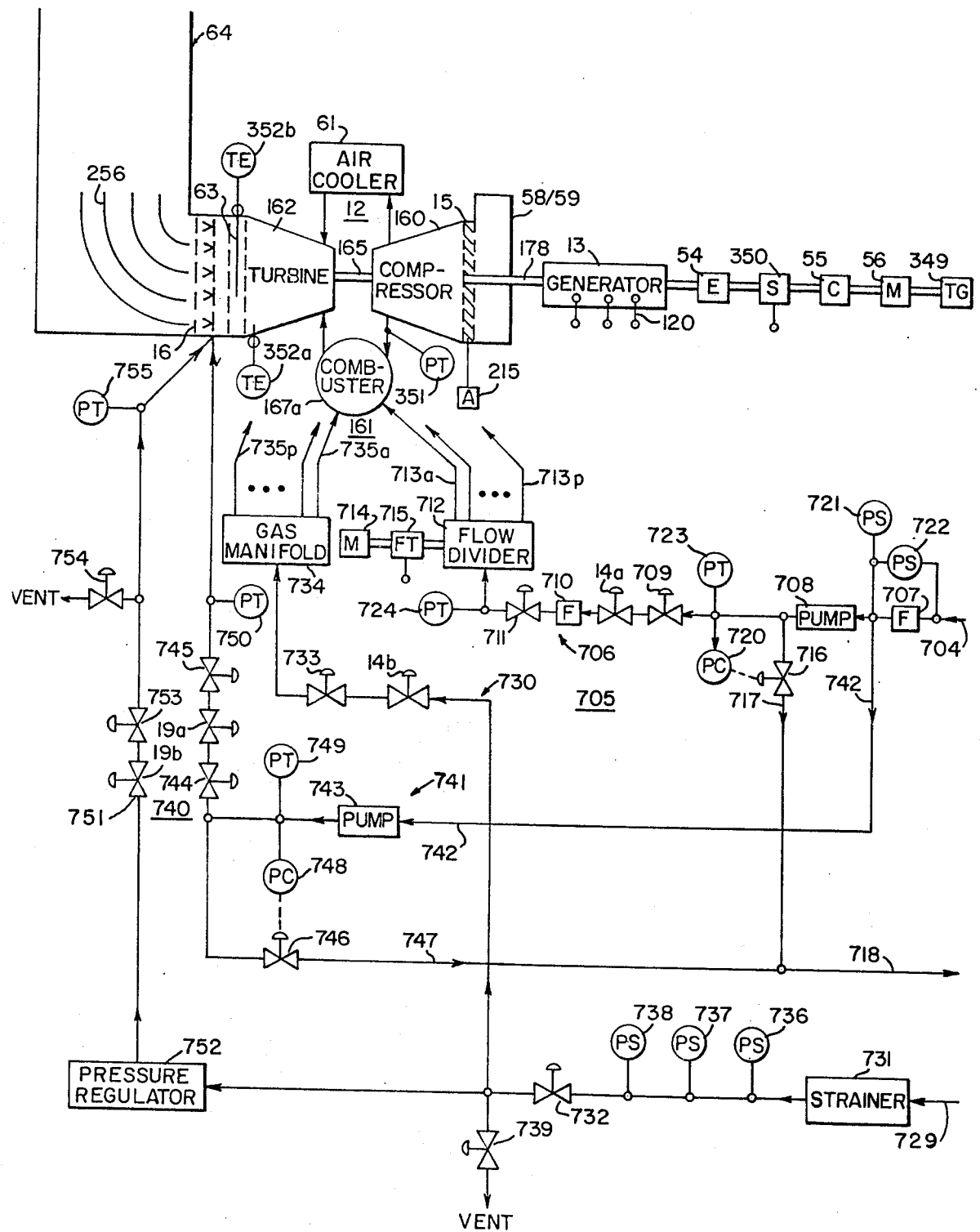
Figure 5E:
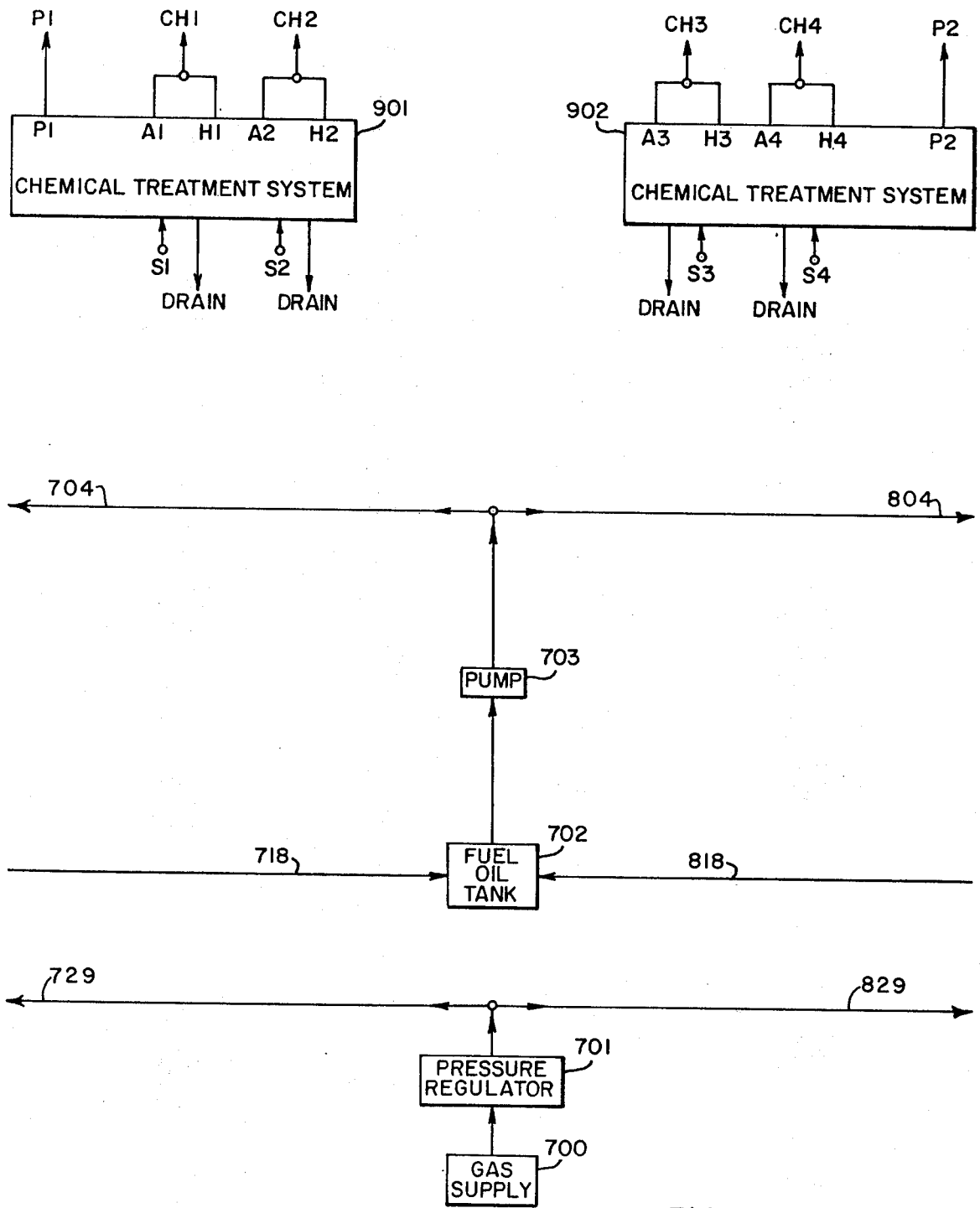
Figure 5F:
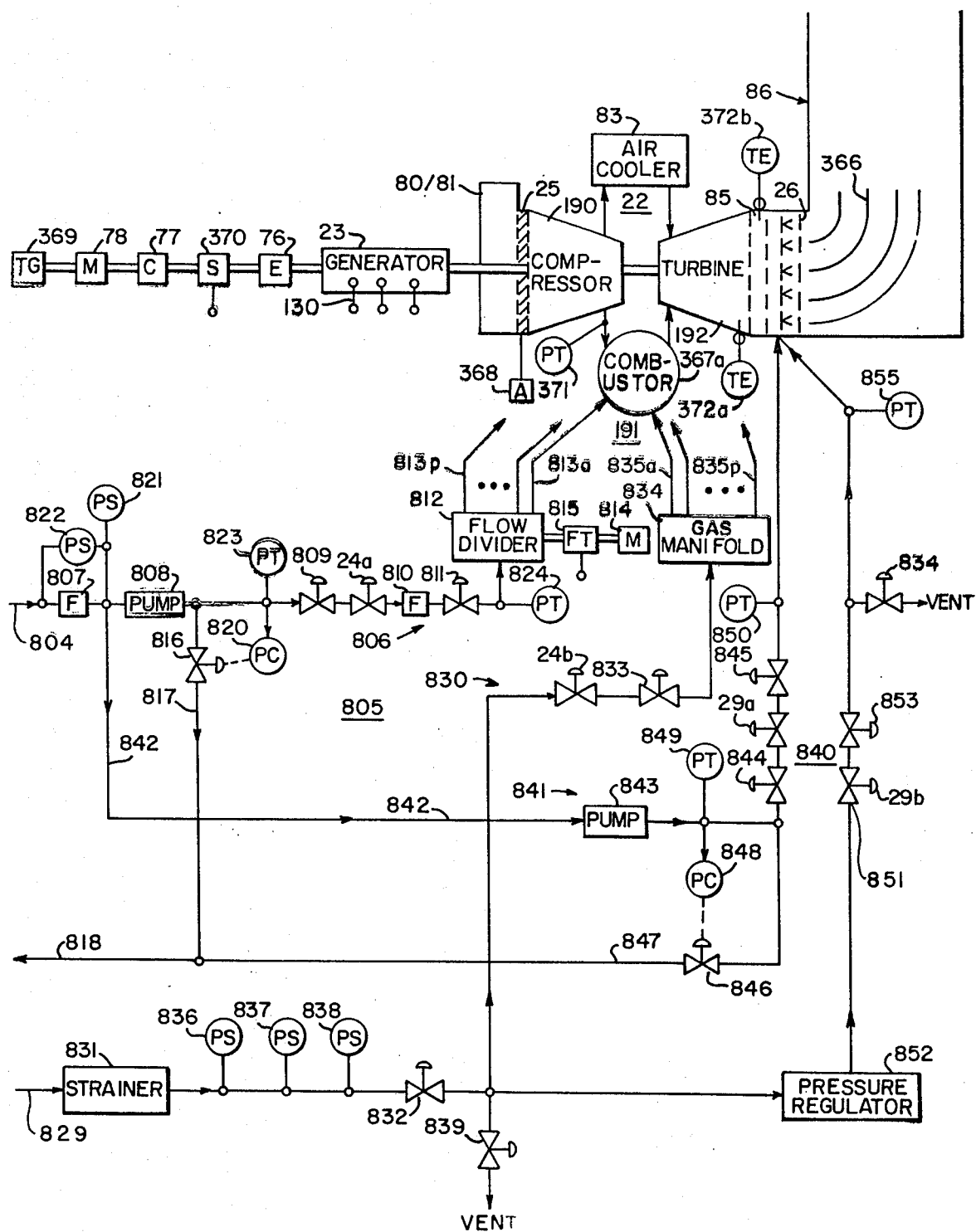

The combustion section 191 of the second gas turbine 22 (FIG. 5F) includes a concentric array of 16 combustors 367a-367p with only the combustor 367a being shown in FIG. 5F. The inlet guide vane mechanism 25 associated with the second gas turbine 22 is controlled by an actuator mechanism 368. A turning gear 369 is coupled to the rotary shaft structure of the electric generator 23 for turning the gas turbine rotor structure at a speed of approximately 200 rpm just prior to a gas turbine startup and during the cool down period following a gas turbine shutdown. A speed transducer 370 is coupled to the rotary shaft structure of the electric generator 23 and produces an electrical signal which indicates the speed of rotation or rpm of the rotary structures of generator 23 and gas turbine 22. A pressure transmitter 371 produces an electrical signal which indicates the magnitude of the pressure within the combustor shell which forms the outer housing of the gas turbine combustion section 191.

An array of 16 temperature elements 372a measure the blade path temperature at the outlet of the blade section in turbine portion 192 of the gas turbine 22. An array of 16 temperature elements 372b measure the exhaust gas temperature of the gas turbine 22. As shown in FIG. 5C, temperature elements 373 and 374 measure the inlet gas temperature for the stack structure 86, while a pressure switch 375 monitors the inlet gas pressure. A temperature element 376 measures the stack top gas temperature for the stack structure 86. Typical temperature values are the same as for the first stack structure 64. An adjustable louver type stack cover mechanism 377 is located at the top of the stack structure 86 (there being one of these mechanisms for each of the exhaust sections 88 and 89) and it is controlled by a motor 378.

Considering now the steam turbine 36, electric generator 44 and condensor 31 (FIG. 5B) in greater instrumentation detail, a speed transducer 401 is coupled to the rotary shaft structure of the generator 44 and produces an electrical signal indicating the rotary speed or rpm of the rotor structures of the steam turbine 36 and generator 44. Under normal load conditions, the steam turbine speed will be the synchronous value of 3,600 rpm and, during startup, the steam turbine speed will normally be a controlled value as the turbine accelerates to synchronous speed. A temperature element 402 and a pressure transmitter 403 generate electrical signals which indicate the throttle temperature and the throttle pressure of the steam entering the inlet of the steam turbine 36. Under typical peak load conditions, the turbine inlet steam temperature will be approximately 952° Fahrenheit and the turbine inlet steam pressure will be approximately 1,277 pounds per square inch (absolute). The outlet side of the steam turbine bypass valve 45 is connected to the desuperheater 46 by way of a steam pipe 404. A temperature element 405 generates an electrical signal which indicates the temperature of any steam flow from the desuperheater 46 to the condenser 31 by way of steam pipe 47. Under typical load conditions with both of the gas turbines 12 and 22 in operation, the bypass valve 45 is fully closed and no steam flows to the desuperheater 46.

Some of the steam in the incoming main steam pipe 34 is removed by way of a steam pipe 406 and supplied by way of a check valve 407, a superheater 408, a control valve 409 and a steam pipe 410 to the gland seals inside the steam turbine 36 to provide the desired sealing action therein. Superheater 408 is an electric heater having a rating of, for example, 45 kilowatts and is included in the steam turbine motor control center located in the auxiliary equipment enclosure 114 (FIG. 2). After passage through the gland seal structure, this gland steam is removed by way of a pipe 411 and passed to a gland steam condenser 412, the resulting condensate being passed to a drain tank (not shown) by way of a drain line 413.

Some of the steam in main steam line 34 is also supplied by way of a control valve 414 to an air ejector mechanism 415. Air ejector mechanism 415 is a Venturi type air ejector which is used to evacuate the condenser 31. The steam leaving the air ejector 415 passes by way of a steam line 416 to an air ejector steam condenser 417, the resulting condensate being passed to the drain line 413. Air is removed from the condenser 31 by way of a line 418 which runs to the air ejector 415. The Venturi effect occurring in the air ejector 415 serves to suck the air out of the condenser 31 by way of the air line 418. Under typical operating conditions, this evacuates the condenser 31 to a pressure of approximately 2 inches of mercury.

Extraction steam for feedwater heating purposes is removed from the steam turbine 36 between the tenth and eleventh stages thereof by way of turbine outlet 313 and is supplied by way of a steam pipe 420, a check valve 421, a control valve 422 and steam pipe 423 to a pair of branch steam pipes 424 and 425. The branch steam pipe 424 supplies extraction steam to the deaerator 68 included in the first steam generator 18 (FIG. 5A), while the branch steam pipe 425 supplies extraction steam to the deaerator 90 included in the second steam generator 28 (FIG. 5C). The "internal water removal" steam removed between the 12th and 13th stages via the steam turbine outlet 314 is supplied by way of steam pipe 426 to the condenser 31. Level transmitters 428 and 429 produce electrical signals which indicate the water levels in hotwell portions 335a and 335b, respectively.

Condensate is pumped from the two hotwell portions 335a and 335b of the divided hotwell 335 by means of condensate pumps 30a and 30b, respectively. The inlet side of pump 30a is connected to the hotwell condensate outlet, while the inlet side of pump 30b is connected to the hotwell condensate outlet. The condensate pumped by pumps 30a and 30b is supplied by way of a condensate pipe 430, the air ejector steam condenser 417, the gland steam condenser 412, a condensate pipe 431 and a condensate pipe 432 to a pair of branch condensate pipes 434 and 435. Branch condensate pipe 434 runs to the deaerator 68 located in the first steam generator 18, while the second branch condensate pipe 435 runs to the deaerator 90 located in the second steam generator 28. The condensate as it leaves the pumps 30a and 30b is at a temperature of approximately 110° Fahrenheit. This condensate flows through the coolant tubes in the air ejector condenser 417 and the gland steam condenser 412 to provide the cooling action which occurs in these condensers 417 and 412. A normally-open manual crossover valve 436 is connected between the two hotwell outlets and can be closed if half the condenser 31 is shut down for maintenance purposes or the like. Each of the condensate pumps 30a and 30b has sufficient capacity to enable either pump alone to carry the full flow load in the event the other pump should fail.

Some of the condensate flowing in the pipe 431 is also supplied by way of a pipe 437, a desuperheater control valve 438 and a pipe 439 to the desuperheater 46. This condensate provides the cooling medium in the desuperheater 46. The desuperheater 46 is of the water spray type such that the relatively cool condensate entering by way of pipe 439 is sprayed into the relatively hot steam flow entering by way of the pipe 404. Under typical conditions for such steam flow, this lowers the steam temperature to about 350° Fahrenheit. The temperature signal produced by the temperature element 405 coupled to the desuperheater outlet pipe 47 is supplied by way of a temperature transmitter (not shown) and a temperature controller (not shown) to the desuperheater control valve 438 for purposes of regulating same to hold the temperature of the desuperheater outlet steam in pipe 47 fairly constant.

If the condensate level in the hotwell portions 335a and 335b becomes too low, then makeup water from a makeup water storage tank 440 is supplied to the hotwell portions 335a and 335b by means of a makeup water pump 441, a makeup block valve 441a, a makeup control valve 442 and a makeup water pipe 443 which runs to the makeup water inlet 340 on the condenser 31. Conversely, if the condensate level in hotwells 335a and 335b becomes too high, then condensate is returned to the makeup water storage tank 440 by way of a condensate return valve 444. In other words, the pump 441 is operated and the valves 442 and 444 are opened and closed as needed in order to hold the condensate level in hotwells 335a and 335b fairly constant. This is accomplished by means of level sensing switches (not shown) associated with the hotwells 335a and 335b which operate the appropriate control circuits (not shown) to control the pump 441 and the valves 442 and 444. Block valve 441a is fully open during normal operation. When needed, additional water is supplied to the makeup water storage tank 440 from an external water source by way of a demineralizer 445 and a control valve 446.

A pair of auxiliary steam bypass lines 447 and 448 are connected by way of a common bypass line 449 to the bypass steam pipe 404 which runs to the desuperheater 46. Bypass line 447 enables steam from the first steam generator 18 (FIG. 5A) to be passed directly to the desuperheater 46 under certain operating conditions, while the bypass line 448 does likewise for the second steam generator 28 (FIG. 5C).

As previously indicated in connection with FIG. 3, cooling water or circulating water is taken from the river or lake 105 (FIG. 3) and supplied to the condenser tubes in the condenser 31 by way of circulating water intake pipes 107 and 108. Circulating water pumps located at the intake station 106 (FIG. 3) serves to move the water through the intake pipes 107 and 108. Temperature elements 450 and pressure transmitters 451 generate electrical signals which serve to monitor the temperature and pressure of the incoming circulating water. The circulating water leaves the condenser 31 by way of the outlet pipe 110 and is returned to the river or lake 105. A further temperature element 452 generates an electrical signal to monitor the temperature of the outgoing circulating water.

Various additional temperature elements, pressure transmitters, level transmitters and other measurement devices are associated with the condenser 31 and the steam turbine 36, these items being omitted from FIG. 5B for sake of simplicity.

Considering now the details of the first heat recovery steam generator 18 (FIG. 5A), condensate from the condenser hotwells 335a and 335b is supplied to the deaerator 68 by way of the condensate pipe 434, a flow element 501, the condensate control valve 32 (Cf. FIG. 1) and a check valve 502. A flow transmitter 503 cooperates with the flow element 501 to provide an electrical signal which indicates the value of the condensate flow rate through the flow element 501. Flow element 501 provides a restriction in the flow path and flow transmitter 503 measures the pressure difference across the restriction. As is well known, this pressure difference is indicative of the flow rate. Thus, flow element 501 and flow transmitter 503 constitute a well-known type of flowmeter for measuring fluid flow.

Deaerator 68 provides a feedwater heating action as well as a deaerating action, and it is of the spray tray or jet tray type. The condensate entering from check valve 502 is sprayed by way of spray nozzles into a tray structure which also receives steam from the low pressure evaporator tubes 263. More particularly, the water or condensate collected in the deaerator 68 flows to a low pressure feedwater storage tank 69 which, among other things, serves as a storage reservoir for the deaerator 68. Water from this storage tank 69 flows by way of a pipe 504, a low pressure circulation pump 505, a standby electric heater 506, the low pressure evaporator tubes 263 and a pipe 507 to a steam inlet into the tray structure inside the deaerator 68. Low pressure circulation pump 505 provides the desired fluid flow and the low pressure evaporator tubes 263 in the stack structure 64 serve to convert the water into steam. This steam is supplied to the deaerator 68 by way of pipe 507 to heat the condensate entering the deaerator 68 from check valve 502. This provides a substantial portion of the desired feedwater heating.

Electric heater 506 is used for standby heating purposes when the gas turbine 12 is not in service. If the gas turbine 12 is not in operation and if it is desired to maintain the steam generator 18 in a hot standby condition, then the heater 506 is controlled by a temperature switch 508 so as to maintain the temperature of the water in the storage tank 69 at a value of approximately 250° Fahrenheit. If, on the other hand, it is desired that the steam generator 18 be shut down for an extended period of time but not drained, then electric heater 506 is used to provide freeze protection. In this latter case, the heater 506 is controlled by a temperature switch 509 so as to prevent the temperature of the water in this part of the system from falling below a value of 40° Fahrenheit. In both of these cases, the low pressure circulation pump 505 must be turned on and operating. A pressure switch 510 monitors the operation of the pump 505 and produces a warning signal if the pressure differential across the pump 505 becomes too low.

For total plant loads above approximately 80% of the total plant capacity, supplemental feedwater heating is provided by the extraction steam taken from the steam turbine 36. This extraction steam is supplied to the deaerator 68 by way of the extraction steam pipe 424, a check valve 511, a motor operated isolation valve 512 and a steam pipe 513. The extraction steam control valve 422 is opened for plant loads above the 80% figure. Below this figure, the steam used for feedwater heating is obtained from the low pressure evaporator tubes 263 and the economizer recirculation flow.

Deaerator 68 is provided with a low pressure vent valve 514 which is controlled by an actuator 515. Actuator 515 is of the solenoid type and is controlled by an appropriate control signal from the main operator control board in the plant control center building 150 (FIG. 3). During normal operation, the vent valve 514 is kept fully open to allow air to escape from the deaerator 68. The deaerator 68 is also provided with a pressure safety valve 516. Deaerator 68 is provided with a further pressure release mechanism which includes a check valve 517 and a dump valve 518, the outlet side of the latter being connected by way of a pipe 519 to the auxiliary steam bypass pipe 447 by way of which steam may be returned to the desuperheater 46 and condenser 31. If the pressure within the deaerator 68 exceeds 160 pounds per square inch, dump valve 518 opens to dump steam in the deaerator 68 back to the condenser 31. Among other things, this prevents a popping of the safety valve 516.

A pressure transmitter 520 senses the pressure within the deaerator 68 and provides a signal indicative of the value thereof. Level switches 521 and 522 monitor the water level within the low pressure storage tank 69, switch 521 producing an electrical warning signal if the water level is too high and switch 522 producing an electrical warning signal if the water level is too low. A level transmitter 523 produces an electrical signal indicative of the actual water level in the tank 69.

Boiler feedwater stored in the low pressure storage tank 69 is pumped through the economizer tubes 262 in the stack structure 64 by means of a main boiler feed pump 524. The intake side of boiler feed pump 524 is connected to the storage tank 69 by means of a feedwater pipe 525. The outlet side of boiler feed pump 524 is connected to the inlet side of economizer tubes 262 by means of a check valve 526, a motor operated block valve 527 and a feedwater pipe 528. Valve 527 is open during normal operation. The electric motor which runs the boiler feed pump 524 has a nominal rating of 1250 horsepower. A pressure safety valve 529 is connected between the outlet side of pump 524 and the low pressure storage tank 69. A pressure switch 530 monitors the pressure difference across the boiler feed pump 524 and produces an electrical warning signal if such pressure difference falls below a desired lower limit. A further pressure switch 531 monitors the pressure in the feedwater pipe 528 and produces an electrical warning signal if such pressure falls below a desired lower level.

A standby boiler feed pump 532 is connected in parallel with the main boiler feed pump 524 and the valves 526 and 527, the outlet side of this standby pump 532 being connected by way of a check valve 533 and a motor-operated block valve 534 to the feedwater pipe 528 which runs to the inlet of the economizer tubes 262. During normal operation of the steam generator 18, the standby pump 532 is turned off and the block valve 534 is closed. The electric motor which runs the standby pump 532 has a nominal rating of 25 horsepower. The standby pump 532 is used when the steam generator 18 is in either the hot standby mode or the freeze protection mode. At such time, the main boiler feed pump 524 is turned off and its block valve 527 is closed. A pressure safety valve 535 is connected to the outlet side of the standby pump 532 and is connected back to the low pressure storage tank 69. A pressure switch 536 monitors the pressure difference across the standby boiler feed pump 532 and produces an electrical warning signal when the pressure difference is too low.

A manually operated drain valve 537 is provided for draining the deaerator 68 and low pressure storage tank 69 when the steam generator 18 is to be shut down for maintenance purposes or other desired reasons. A manually operated vent valve 538 is connected to the economizer feedwater pipe 528 for venting air from the system when the steam generator 18 is being shut down and the system filled with a nitrogen blanket. During normal operation, the drain valve 537 and the vent valve 538 are closed.

During normal load operation, the main boiler feed pump 524 pumps boiler feedwater through the economizer tubes 262, such feedwater being obtained from the low pressure storage tank 69. Under typical peak load conditions, the feedwater leaving the storage tank 69 will be at a temperature of approximately 250° Fahrenheit. As this feedwater flows through the economizer tubes 262, it is heated to within 5° Fahrenheit of the saturation temperature, that is, the temperature at which it will boil at the pressure at hand. Under typical peak load conditions, the feedwater leaving the economizer tubes 262 will be at a temperature of approximately 570° Fahrenheit.

The hot feedwater leaving the economizer tubes 262 goes to two different places. Firstly, some of this feedwater flows by way of a pipe 540, a flow element 541, a feedwater control valve 542, a check valve 543 and a pipe 544 to the feedwater reservoir section 70a of the vertical steam drum 70. The remainder of the hot feedwater leaving economizer tubes 262 flows by way of pipe 540, a flow element 545, a recirculation control valve 546 and a pipe 547 back to the deaerator 68, wherein it serves to provide some of the heating of the condensate entering the deaerator 68.

During normal load operation, the feedwater control valve 542 and the recirculation control valve 546 are automatically controlled in a coordinated manner to keep constant the water flow rate through the economizer tubes 262. For example, if less water is required by the feedwater reservoir 70a (lower load level), then more water is recirculated back by way of the valve 546 to the deaerator 68, the proportions being such as to hold constant the water flow in the pipe 540. As the power generated by steam turbine 36 increases, more economizer water flow is directed to the feedwater reservoir 70a.

Constant water flow through the economizer tubes 262 is important in order to minimize steaming and prevent stagnation in some of the economizer tubes 262 at part loads. If the flow rate were not constant but instead were allowed to vary with load, then the flow rate would decrease as the load decreased. At the lower flow rates, the likelihood of steaming would be greater. The problem with steaming is that it produces an increased pressure drop in the tube wherein it is occurring. This leads to less flow and more steaming and ultimately stagnation or a complete absence of flow in such tube.

In the present embodiment, the flow rate is maintained constant at a relatively high value such that the same high water velocities are provided in the various economizer tubes at all load levels. Thus, the pressure drop across the entire economizer section 262 is relatively high at all load levels. Consequently, any increase in pressure drop caused by steaming in certain tubes is small compared to the total pressure drop, resulting in insignificant changes in water flow and thereby preventing stagnation in any of the economizer tubes 262. In addition, the higher pressure drops produced by the higher water velocities through the economizer tubes 262 promotes a more uniform distribution of water flow through the economizer tubes which, among other things, results in higher heat transfer coefficients on the inside of the tubes.

A further advantage of the constant water flow rate through the economizer tubes 262 is that the main boiler feed pump 524 operates at a constant and optimum rate in terms of pump efficiency for all plant load levels.

A flow transmitter 548 and a temperature element 549 are associated with the feedwater flow element 541, with the flow transmitter 548 providing an electrical signal indicative of the feedwater flow rate through the flow element 541 and the temperature element 549 providing temperature compensation for the flow rate signal. Similarly, a flow transmitter 550 and a temperature element 551 are associated with the recirculation path flow element 545, with the flow transmitter 550 providing an electrical signal indicative of the value of the flow rate of the water flowing back to the deaerator 68 and the temperature element 551 providing temperature compensation for the flow rate signal. A manually operated drain valve 552 is connected to the feedwater pipe 540 for purposes of draining the economizer tubes 262 when the steam generator 18 is to be shut down. During normal operation, the drain valve 552 is closed.

The hot, nearly boiling feedwater in the feedwater reservoir 70a is pumped through the high pressure evaporator tubes 261 by a high pressure circulation pump 554. The electric motor associated with this pump 554 has a nominal rating of 60 horsepower. The inlet side of the pump 554 is connected to the feedwater reservoir 70a by way of pipe 555. The outlet side of pump 554 is connected to the high pressure evaporator tubes 261 by way of a standby electric heater 556 and a pipe 557. As the hot feedwater flows through the high pressure evaporater tubes 261 it is converted into steam which is then supplied by way of a pipe 558 to the moisture separator section 70b of the steam drum 70. Under typical peak load conditions, the steam leaving the high pressure evaporator tubes 261 will be at a temperature of approximately 575° Fahrenheit.

The high pressure circulation pump 554 is of a type which employs floating ring type seals. The water required for these seals is obtained from the economizer inlet pipe 528 by way of a pipe 560, a water-to-water heat exchanger or cooler 561, a motor-operated control valve 562 and a pipe 563. Heat exchanger 561 cools the 250° Fahrenheit water coming from the feedwater pipe 528 to a temperature of approximately 150° Fahrenheit. The water leaving the pump seals is carried to a drain by way of a pipe 564.

With floating ring type seals, it is necessary to control the flow of water through the seals such that flashing will not occur since flashing of the water through the seals would result in erosion of the labyrinth elements in the seals. To this end, a temperature element 565 is located in the atmospheric collection chamber at the exit of the seals to sense the temperature of the seal water leaving the seals. This temperature element 565 produces an electrical signal which is supplied to a temperature transmitter (not shown) which drives a temperature controller (not shown) which, in turn, controls the motor 566 which operates the seal water control valve 562. This control loop modulates the control valve 562 to assure that only the required amount of water is provided to the pump seals.

Water for the stuffing box in the high pressure circulation pump 554 is supplied thereto from the cooling water source for heat exchanger 561 by way of a pipe 567. The stuffing box water is drained by way of the drain pipe 564. A pressure switch 568 monitors the pressure difference across the pump 554 and produces an electrical warning signal if this pressure becomes too low. A further pressure switch 569 monitors the differential pressure across the seals in pump 554 to provide an electrical warning signal if this pressure differential becomes too low.

The electric heater 556 is used for standby and freeze protection purposes when the gas turbine 12 is not in service. When the gas turbine 12 is not in operation and the steam generator 18 is in the hot standby mode, the heater 556 is controlled by a pressure switch 570 to maintain the proper steam pressure in the steam drum 70. In other words, pressure switch 570 turns on the heater 556 if the steam drum pressure falls below the desired minimum value. On the other hand, if the plant 10 is shut down for an extended period of time and the plant operator chooses not to generate steam in the steam generator 18, then the heater 556 is controlled by a temperature switch 571 to maintain the water in the steam drum 70 above the freezing point. The high pressure circulation pump 554 must be kept on and operating during either of these operating modes for the heater 556.

The moisture separator section 70b of the steam drum 70 receives the wet steam from the high pressure evaporator tubes 261 and removes practically all of the remaining water from such steam. The resulting dry steam leaves the moisture separator 70b and is supplid by way of a steam pipe 572 to the superheater tubes 260 located in the stack structure 64. Under typical peak load conditions, the dry steam leaving the moisture separator 70b is at a temperature of approximately 575° Fahrenheit and a pressure of approximately 1300 pounds per square inch (absolute).

A pressure transmitter 573 generates an electrical signal which indicates the steam pressure at the outlet of the moisture separator 70b. A high pressure vent valve 574 is connected to the steam line 572 for purposes of, among other things, venting some of the steam if it appears that the steam pressure inside the steam drum 70 is becoming too large. During normal operation, the vent valve 574 is closed. The steam drum 70 is also provided with one or more pressure safety valves which for simplicity of illustration, are not shown.

A steam line 575 is connected from the main steam pipe 572 to a deaerator pressure control valve 576 which is, in turn, connected to an additional steam inlet of the deaerator 68. The control valve 576 is controlled by a pressure controller 577 which is responsive to the pressure within the deaerator 68. Pressure controller 577 and control valve 576 function to maintain the desired steam pressure in the deaerator 68 at part loads for the plant 10. If the steam pressure within the deaerator 68 falls below the desired value, then pressure controller 577 opens the valve 576 to bring the pressure back up to the desired value. This is most likely to occur at part loads of less than about 80% because, in such cases, the extraction steam control valve 422 (FIG. 5B) is closed and no extraction steam is being supplied to the deaerator 68.

A nitrogen gas supply 578 is connected to the main steam pipe 572 by way of an actuator-operated nitrogen admission valve 579 and a check valve 580. During normal operation, the nitrogen admission valve 579 is closed and no nitrogen is admitted into the steam system. Valve 579 is opened during the process of draining and venting the steam generator 18 and transferring it to a dry status. The nitrogen valve 579 is opened as more or less the final step in this process. The nitrogen gas is admitted into the steam system for purposes of replacing steam which condenses in the system during the draining and venting process. Among other things, this minimizes subsequent rusting or scaling in the steam drum 70 and the evaporator and superheater tubes 261 and 260. As mentioned elsewhere herein, the gas turbine 12 can be operated for prolonged periods of time with the steam generator 18 in a dry conditions without causing serious damage to the boiler tubes 260–263 and other parts of the steam generator 18.

The feedwater reservoir section 70a of the steam drum 70 is provided with a high-indicating level switch 581, a low-indicating level switch 582 and a level transmitter 583. Switch 581 produces an electrical warning signal when the water level in the reservoir 70a gets too high, while switch 582 produces an electrical warning signal when the water level gets too low. Level transmitter 583 produces an electrical signal indicating the actual water level in the reservoir 70a. The water level signal from the transmitter 583 is supplied to a controller (not shown) which controls the feedwater control valve 542 to maintain a fairly constant water level in the feedwater reservoir 70a.

As the dry steam from the steam drum 70 flows through the superheater tubes 260, it is further heated to raise its temperature another 300° to 400° Fahrenheit. Under typical peak load conditions, the superheated steam flowing in the main steam outlet line 37 is at a temperature of 952° Fahrenheit and a pressure of approximately 1277 pounds per square inch (absolute). During normal operation of the plant 10, this superheated steam flows by way of main steam outlet line 37, isolation valve 38, steam pipe 34 and steam turbine valves 35a, 35b, 308a and 308b to the main steam inlet of the steam turbine 36 (FIG. 5B). Connected in series in the main steam outlet line 37 are a flow element 584 and a check valve 585. A flow transmitter 586 and a temperature element 587 (for temperature compensation of flow transmitter 586) are associated with the flow element 584, the flow transmitter 586 producing an electrical signal indicating the value of the output steam flow rate for the steam generator 18. During normal load operation, the main steam isolation valve 38 is, of course, fully open.

The final output steam temperature for the steam generator 18 is the temperature of the superheated steam flowing in the steam generator outlet line 37. This temperature is primarily determined by the temperature rise of the steam in the superheater tubes 260, this temperature rise being dependent on the temperature of the exhaust gas leaving gas turbine 12 and the amount of supplemental heat added to the turbine exhaust gas by the afterburner 16. The final steam temperature in outlet line 37 is also controlled in part by means of superheater bypass valve 588 which is connected between the inlet and outlet of the superheater tube section 260. More specifically, the outlet side of bypass valve 588 is connected to the superheater outlet header 264 (FIG. 4) to which is connected the steam generator outlet line 37.

Superheater bypass valve 588 controls the output steam temperature by bypassing some of the lower temperature steam coming from the steam drum 70 around the superheater tubes 260 and then mixing this lower temperature bypassed steam with the higher temperature superheated steam emerging from the superheater tubes 260. Other things being constant, the greater the degree of opening of the bypass valve 588, the greater the amount of the lower temperature steam which is bypassed and, hence, the lower the temperature of the steam flowing to the steam turbine 36. The maximum amount of steam that can be bypassed by the bypass valve 588 is about 20% of the total steam flow from the steam drum 70.

The superheater bypass valve 588 is the final control element in a temperature control loop which is used to regulate the output steam temperature to hold it fairly constant at a predetermined setpoint value. In the present embodiment, this predetermined setpoint value is 952° Fahrenheit. Also included in this temperature control loop is a temperature element 589 which senses the temperature of the steam flowing in the outlet steam line 37 downstream of the bypass valve 588. Temperature element 589 cooperates with a temperature transmitter (not shown) to produce an electrical signal which is transmitted to a temperature controller (not shown) which controls the degree of opening of the superheater bypass valve 588. If the steam temperature in the outlet line 37 is greater than the 952° Fahrenheit setpoint value, then the temperature controller sends a signal to the bypass valve 588 to increase the degree of opening of such valve. This reduces the steam temperature in outlet line 37 to bring it back to the 952° value. Conversely, if the steam temperature in the outlet line 37 is less than 952° Fahrenheit, the temperature controller decreases the degree of opening of the bypass valve 588. This causes more steam to pass through the superheater tubes 260 and thus increases the temperature of the steam in the outlet line 37.

This type of temperature control system has several advantages. It is superior to a system in which water is injected into the superheated steam to cool it because such a system could also send slugs of water into the steam turbine if its control valve failed. Since the present system injects dry steam, this is not a problem. The present system is also better than a system which controls steam temperature by varying the after burner firing rate because it will respond more rapidly to load changes.

There is also connected to the main steam outlet line 37 a normally-closed manually-operated vent valve 590, a pressure safety valve 590*a*, a temperature element 591 and a pressure transmitter 592. During normal operation, the vent valve 590 and the previously considered drain valve 48 are closed. Temperature element 591 and pressure transmitter 592 generate electrical signals which indicate the temperature and pressure of the steam in the outlet line 37 and transmit such signals to the plant control center building 150.

In certain situations, the main steam isolation valve 38 is closed and the steam produced by the steam generator 18 is bypassed to the condenser 31 by way of an auxiliary steam bypass path which includes a check valve 593, a motor-operated block valve 594 and a steam line 595 which runs to and connects with the auxiliary steam bypass line 447 which communicates with the desuperheater 46 by way of pipes 449 and 404 (FIG. 5B). This particular arrangement wherein the main steam isolation valve 38 is closed and the auxiliary bypass block valve 594 is open is employed, for example, to drain the outlet steam line 37 of water when the No. 1 steam generator 18 is to be started up after the No. 2 steam generator 28 has already been put into operation and is busy supplying steam to the steam turbine 36.

The steam generator 18 further includes an automatic "blowdown" mechanism for minimizing the buildup of mineral deposits on the inner walls of the high pressure evaporator tubes 261. This blowdown mechanism includes a motor-controlled blowdown block valve 596 and a blowdown control valve 597 which are connected in series between the feedwater outlet pipe 555 of the steam drum 70 and an appropriate drain or sewer outlet 597*a*. During normal operation, the block valve 596 is full open.

The blowdown control valve 597 is controlled by a signal developed by a conductivity element 598 which continuously measures the conductivity of a sample portion of the steam drum feedwater, which sample portion flows by way of the block valve 596 and a cooler 599 to the drain outlet 597*a*. Conductivity element 598 is connected to the outlet side of the cooler 599, the function of the cooler 599 being to cool the feedwater sample to a temperature suitable for the conductivity element 598. The conductivity element 598 cooperates with a conductivity transmitter (not shown) to generate an electrical signal indicative of conductivity, which signal is transmitted to a conductivity controller (not shown) which controls the blowdown control valve 597.

The conductivity element 598 provides an electrical signal which indicates the electrial conductivity of the feedwater flowing in the steam drum outlet pipe 555. The "hardness" or mineral content of the feedwater in the steam drum outlet pipe 555 determines the conductivity of this feedwater. The greater the "hardness" or mineral content, the greater the conductivity.

The conductivity element 598 and its associated conductivity controller operate to adjust the degree of opening of the blowdown control valve 597 so as to keep the feedwater mineral content below a desired limit. If the feedwater mineral content increases above the desired limit, then the blowdown control valve 597 is opened to a greater degree to dump a greater amount of the steam drum feedwater into the drain outlet 597*a*. This tends to lower the water level in the system. This, in turn, signals the makeup water pump 441 and the makeup water valve 442 (FIG. 5B) to add fresh demineralized water to the system. This brings the mineral content of the water in the system back down to the desired level.

As seen from the foregoing description, the heat recovery steam generator 18 includes not only the stack structure 64 and the various boiler tubes 260–263 located therein, but also the deaerator 68, the low pressure storage tank 69, the steam drum 70 and the various other items 501–599 considered in connection therewith.

The normal operation of the heat recovery steam generator 18 will now be briefly summarized for the case where the combined cycle plant 10 is operating under typical peak load conditions. In this case, both of the gas turbines 12 and 22, both of the afterburners 16 and 26, both of the heat recovery steam generators 18 and 28 and the steam turbine 36 are in operation. The condensate pumps 30a and 30b pump condensate at a temperature of approximately 110° Fahrenheit from the condenser hotwell sections 335a and 335b via pipes 430, 431, 432 and 434 to the deaerator 68 wherein such condensate is deaerated and heated to a temperature of approximately 250° Fahrenheit by heat from the steam from the low pressure evaporator tubes 263, the extraction steam from the steam turbine 36 (via steam pipe 424) and the hot water being recirculated from the economizer tubes 262 by way of the recirculation control valve 546 and the pipe 547. This heated 250° water is supplied to the low pressure storage tank 69. At this point, the water is referred to as boiler feedwater.

The boiler feedwater in the storage tank 69 is pumped through the economizer tubes 262 by the main boiler feed pump 524. As this feedwater flows through the economizer tubes 262, heat from the turbine exhaust gas raises its temperature to within 5° Fahrenheit of the saturation temperature, that is, the temperature at which it will boil at the particular pressure at hand. Typically, the hot feedwater leaving the economizer tubes 262 will be at a temperature of approximately 570° Fahrenheit. This hot feedwater flows to the feedwater reservoir 70a of the steam drum 70, the water level in the reservoir 70a being controlled by the feedwater control valve 542.

The hot feedwater in the reservoir 70a is pumped through the high pressure evaporator tubes 261 by the high pressure circulation pump 554. As the feedwater flows through the high pressure evaporator tubes 261, more heat from the turbine exhaust gas converts it into steam having a temperature of approximately 575° Fahrenheit. This steam is supplied to the moisture separator 70b which serves to remove practically all of the remaining moisture from such steam.

The resulting dry steam leaving moisture separator 70b flows by way of steam pipe 572 to the superheater tubes 260. As this steam flows through the superheater tubes 260, heat from the turbine exhaust gas at the gas entry end of the stack structure 64 raises its temperature to a value of approximately 952° Fahrenheit. The resulting superheated steam leaving superheater tubes 260 flows by way of steam generator outlet line 37 and steam pipes 39 and 34 to the steam turbine 36, wherein it is used to drive the rotor blades of the steam turbine 36. At the same time, the second steam generator 28 (FIG. 5C) is similarly making superheated steam which is also flowing to the steam turbine 36 by way of steam pipes 42 ad 34, this steam combining with the steam from the first steam generator 18 to produce the total driving force for the steam turbine 36.

As will be considered in greater detail hereinafter, when the combined cycle plant 10 is operating above a minimum load level with both steam generators 18 and 28 in operation, the steam turbine 36 is operated in a pure turbine following mode. In this mode, the steam turbine bypass valve 45 (FIG. 5B) is fully closed and the steam turbine governor or control valves 35a and 35b and throttle or stop valves 308a and 308b are all fully open. In this case, the power developed by the steam turbine 36 is determined entirely by the steam generated by the steam generators 18 and 28 which is, in turn, determined by the operating levels of the gas turbines 12 and 22 and the afterburners 16 and 26.

The hot gas produced by the gas turbine 12 and the afterburner 16 (FIG. 5D) flows vertically upward in the stack structure 64 (FIG. 5A). On the other hand, the fluid in the superheater tubes 260 and the economizer tubes 262 flows in a downward direction, counter to the direction of gas flow. This downflow or counterflow in the superheater and economizer sections 260 and 262 provides better heat transfer for the steam and water moving through these sections. In the evaporator sections, namely, the high pressure evaporator 261 and the low pressure evaporator 263, the water and steam flow is in the upward direction which is the same direction as that of the hot gas flow. This is of particular importance with respect to the high pressure evaporator 261. Since the process of evaporation is isothermal, the temperature advantage is the same for either an upflow or a downflow design. The upflow design used for the high pressure evaporator section 261 is, however, more advantageous in that it permits operation at part loads by means of natural circulation should there be a failure of the high pressure circulation pump 554.

Considering now the No. 2 heat recovery steam generator 28 (FIG. 5C), it is noted that this steam generator 28 includes, in addition to the elements previously considered, various elements bearing reference numerals 601 through 699, inclusive. These elements 601–699 are the same as elements 501–599, respectively, previously considered for the first steam generator 18 (FIG. 5A). These elements 601–699 serve the same purposes and function in the same manner as do the corresponding ones of counterpart elements 501–599 in the first steam generator 18. Thus, the second steam generator 28 is of the same construction as and operates in the same manner as does the first steam generator 18. For this reason, a detailed description of the second steam generator 28 will not be given herein.

As shown in FIGS. 5D–5F, the combined cycle plant 10 further includes means for supplying fuel to the two gas turbines 12 and 22 and to the two afterburners 16 and 26. In the present embodiment, this fuel may be either natural gas or distillate type No. 2 grade fuel oil. Natural gas is obtained from a gas supply 700 (FIG. 5E) which may be, for example, a gas distribution line tied to a natural gas utility system. This gas is supplied to the combined cycle plane 10 by way of a gas pressure regulator 701. The fuel oil, on the other hand, is obtained from a fuel oil storage tank 702 located off of but immediately adjacent to the plant site 155. This fuel oil is pumped to the plant site 155 proper by means of a fuel forwarding pump 703. Appropriate control mechanisms are provided so that the plant operator may readily select the particular fuel to be used.

Associated with the first gas turbine 12 is a fuel system 705 (FIG. 5D) for supplying the gas and oil fuels thereto. The gas turbine fuel system 705 includes an oil delivery system 706 which is connected between the outlet of the fuel forwarding pump 703 and the combustion section 161 of the gas turbine 12. As previously indicated, the combustion section 161 includes an array of 16 combustion chambers of combustors 167a–167p. For simplicity of illustration, only the combustor 167a is shown in FIG. 5D. Starting with the fuel forwarding pump 703, the oil fuel system 706 includes, in the order named, a low pressure filter 707, a main fuel pump 708, an overspeed trip valve 709, an oil throttle valve 14a, a high pressure filter 710, an isolation valve 711 and a fuel distributor or flow divider 712. Connected to the 16 outlets of the flow divider 712 are 16 outlet lines 713a–713p which run to the different individual combustors 167a–167p, respectively. During normal operation on oil fuel, the overspeed trip valve 709 and the isolation valve 711 are full open.

Flow divider 712 includes a rotary mechanism which serves to divide and distribute the oil fuel in an equal manner to the 16 outlet lines 713a–713p. During normal operation, the flow divider 712 operates under its own power, so to speak, the flow of the high pressure oil through the flow divider 712 serving to cause the rotation of the rotary distributor mechanism therein. An electric starting motor 714 is coupled to the rotary shaft of the flow divider 712 for purposes of insuring a proper initial startup of the flow divider 712. Once the oil flow exceeds a predetermined relatively low value such as, for example, 4%, the starting motor 714 is turned off and the flow divider 712 operates on its own.

Also coupled to the rotary shaft of the flow divider 712 is a speed pick-up device or speed transducer 715 which produces an electrical signal indicative of the rotary speed of the flow divider 712. Since this rotary speed is proportional to the fuel flow rate through the divider 712, the signal generated by the transducer 715 is also indicative of the fuel flow rate. For this reason, the transducer 715 will hereinafter be referred to as a flow transmitter and will be thought of as providing a signal indicative of the fuel flow rate.

The inlet side of a pressure regulating valve 716 is connected to the oil line intermediate the main fuel pump 708 and the overspeed trip valve 709, the outlet side of this valve 716 being connected by way of oil return lines 717 and 718 to an oil return inlet on the fuel oil tank 702. A pressure controller 720 measures the oil pressure on the output side of the main fuel pump 708 and adjust the pressure regulating valve 716 in accordance therewith so as to hold the oil pressure at this point in the system substantially constant.

A pressure switch 721 monitors the oil pressure on the output side of the low pressure filter 707, while a differential pressure switch 722 monitors the pressure difference across the low pressure filter 707. Pressure switch 722 produces an electrical warning signal when the pressure difference becomes too high. A pressure transmitter 723 produces a signal indicative of the oil pressure on the output side of the main fuel pump 708. A further pressure transmitter 724 generates a signal indicative of the oil pressure of the oil being supplied to the flow divider 712.

The gas turbine fuel system 705 further includes a gas delivery system 730 for supplying natural gas from the gas supply 700 to the turbine combustors 167a–167p. Starting with the pressure regulators 701 (FIG. 5E), this gas system 730 includes, in the order named, a strainer 731, an overspeed trip valve 732, a gas throttle valve 14b, an isolation valve 733 and a gas manifold 734. The 16 outlets of the gas manifold 734 are connected by way of fuel outlet lines 735a–735p to different individual ones of the 16 combustors 167a–167p, respectively. During normal operation on natural gas, the overspeed trip valve 732 and the isolation valve 733 are fully open, the flow of the gas fuel being controlled by the degree of opening of the throttle valve 14b.

Electrical type pressure switches 736, 737 and 738 are connected to the gas delivery line intermediate the strainer 731 and the overspeed trip valve 732 and are used to monitor the gas pressure at this point in the system. Pressure switch 736 is closed if the gas pressure is above a predetermined value, while pressure switches 737 and 738 are open if the pressure is above a predetermined value. A vent valve 739 is connected to the gas delivery line on the outlet side of the overspeed trip valve 732. This valve 739 is closed during normal operation but can be opened to vent the system when the overspeed trip valve 732 is closed.

A further fuel system 740 is provided for the afterburner 16. This fuel system 740 includes an oil delivery system 741 for supplying fuel oil from the tank 702 to the burner elements in the afterburner 16. Starting with the fuel forwarding pump 703 (FIG. 5E), this afterburner oil system 741 includes, in the order named, the low pressure filter 707, a fuel delivery line 742, a main afterburner fuel pump 743, an overspeed trip valve 744, an oil throttle valve 19a and an isolation valve 745. A pressure regulating valve 746 is connected to the oil delivery line on the outlet side of the main fuel pump 743 to maintain a constant oil pressure at this point in the system. The outlet side of the pressure regulating valve 746 is connected by way of an oil return line 747 and the oil return line 718 to the return inlet on the fuel oil tank 702. Pressure regulating valve 746 is controlled by a pressure controller 748 which responds to the oil pressure in the oil delivery line coming from pump 743.

During normal operation on oil, the overspeed trip valve 744 and the isolation valve 745 are full open, the flow of oil to the afterburner 16 being controlled by the throttle valve 19a. A pressure transmitter 749 generates a signal indicative of the oil pressure in the delivery line from pump 743, while a further pressure transmitter 750 generates a signal indicative of the oil pressure at the inlet to the afterburner 16.

The afterburner fuel system 740 further includes a gas delivery system 751 for delivering natural gas from the gas suply 700 to the burner elements in the afterburner 16. Starting with the pressure regulator 701 (FIG. 5E), this afterburner gas system 751 includes, in the order named, the strainer 731, the overspeed trip valve 732, a pressure regulator 752, a gas throttle valve 19b and an isolation valve 753. It is noted that the gas overspeed trip valve 732 is common to both the turbine gas system 730 and the afterburner gas system 751. A vent valve 754 is connected on the outlet side of the isolation valve 753 for venting the latter portion of the system when the isolation valve 753 is closed. A pressure transmitter 755 senses the gas pressure at the inlet of the afterburner 16 and produces a signal indicative of the value thereof.

There is associated with the second gas turbine 22 a fuel system 805 (FIG. 5F) which is identical in construction to the fuel system 705 for the first gas turbine 12. This No. 2 gas turbine fuel system 805 includes items 806–839 which are identical in construction and purpose to the corresponding respective ones of items 706–739 in the No. 1 gas turbine fuel system 705. In a similar manner, there is associated with the second afterburner 26 a fuel system 840 (FIG. 5F) which is identical in construction to the fuel system 740 for the first afterburner 16. This No. 2 afterburner fuel system 840 includes items 841–855 which are identical in construction and purpose to the corresponding respective ones of items 741–755 in the No. 1 afterburner fuel system 740. The No. 2 gas turbine fuel system 805 and the No. 2 afterburner fuel system 840 are connected to the gas supply 700 and the fuel oil storage tank 702 in the same manner as the No. 1 gas turbine and afterburner fuel systems 705 and 740.

The second gas turbine and afterburner fuel systems 805 and 840 are operated independently of the first gas turbine and afterburner fuel systems 705 and 740. Thus, among other things, the second gas turbine 22 and the second afterburner 26 can be in operation while the first gas turbine 12 and the first afterburner 16 are out of service, or vice versa.

As shown in FIG. 5E, the combined cycle plant 10 further includes a pair of chemical treatment systems 901 and 902 for injecting various chemicals into the condensate/feedwater/steam systems associated with the first and second heat recovery steam generators 18 and 28 for minimizing corrosion and the buildup of mineral deposits in the boiler tubes, steam drums, storage tanks and the like. The first chemical treatment system 901 is primarily associated with the first steam generator 18 and the second chemical treatment system 901 is primarily associated with the second steam generator 28 though, as will be seen, there is some degree of overlap. The particular chemicals which are injected in the present embodiment are amine (or ammonia), hydrazine and phosphates. As used in FIG. 5E, the letter "A" denotes amine (or ammonia), the letter "H" denotes hydrazine and the letter "P" denotes phosphates.

The first chemical treatment system 901 takes a first fluid sample from a first sample outlet S1 (FIG. 5A) which is located on the feedwater pipe 525 coming from the low pressure storage tank 69, analyzes it and then automatically injects the proper amount of amine (A1) and hydrazine (H1) into the system via the chemical injection inlet CH1 (FIG. 5A) which is also located on the feedwater pipe 525, but upstream of the sample outlet S1. The first chemical treatment system 901 also takes a second fluid sample from the system by way of sample outlet S2 (FIG. 5B) which is connected to the condensate pipe 434 running to the deaerator 68, analyzes it and then automatically injects the appropriate amounts of amine (A2) and hydrazine (H2) into the system via the chemical injection inlet CH2 (FIG. 5B) which is connected to the condensate pipe 432 located immediately upstream of the condensate pipe 434. Phosphate (P1) is injected into the system by way of a phosphate injection inlet P1 (FIG. 5A) which is located on the feedwater pipe 544 at the inlet to the feedwater reservoir 70a of the steam drum 70. The phosphate injection control is manually in nature. The injection rate is adjusted at periodic intervals by the plant operator after studying the results of the chemical analyses which are automatically performed and recorded by equipment included in the chemical treatment system 901.

The second chemical treatment system 902 (FIG. 5E) is of the same construction as the first chemical treatment system 901. Sample outlet S3 (FIG. 5B) is located on the condensate pipe 435 running to the deaerator 90, while sample outlet S4 (FIG. 5C) is located on the feedwater pipe 625 coming from the storage tank 91. The chemical injection inlet CH3 is located on the condensate pipe 432 (FIG. 5B), while the chemical injection inlet CH4 is located on the feedwater pipe 625 (FIG. 5C). The phosphate injection inlet P2 is located on the feedwater pipe 644 at the inlet of the feedwater reservoir 92a (FIG. 5C).

D. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 6:
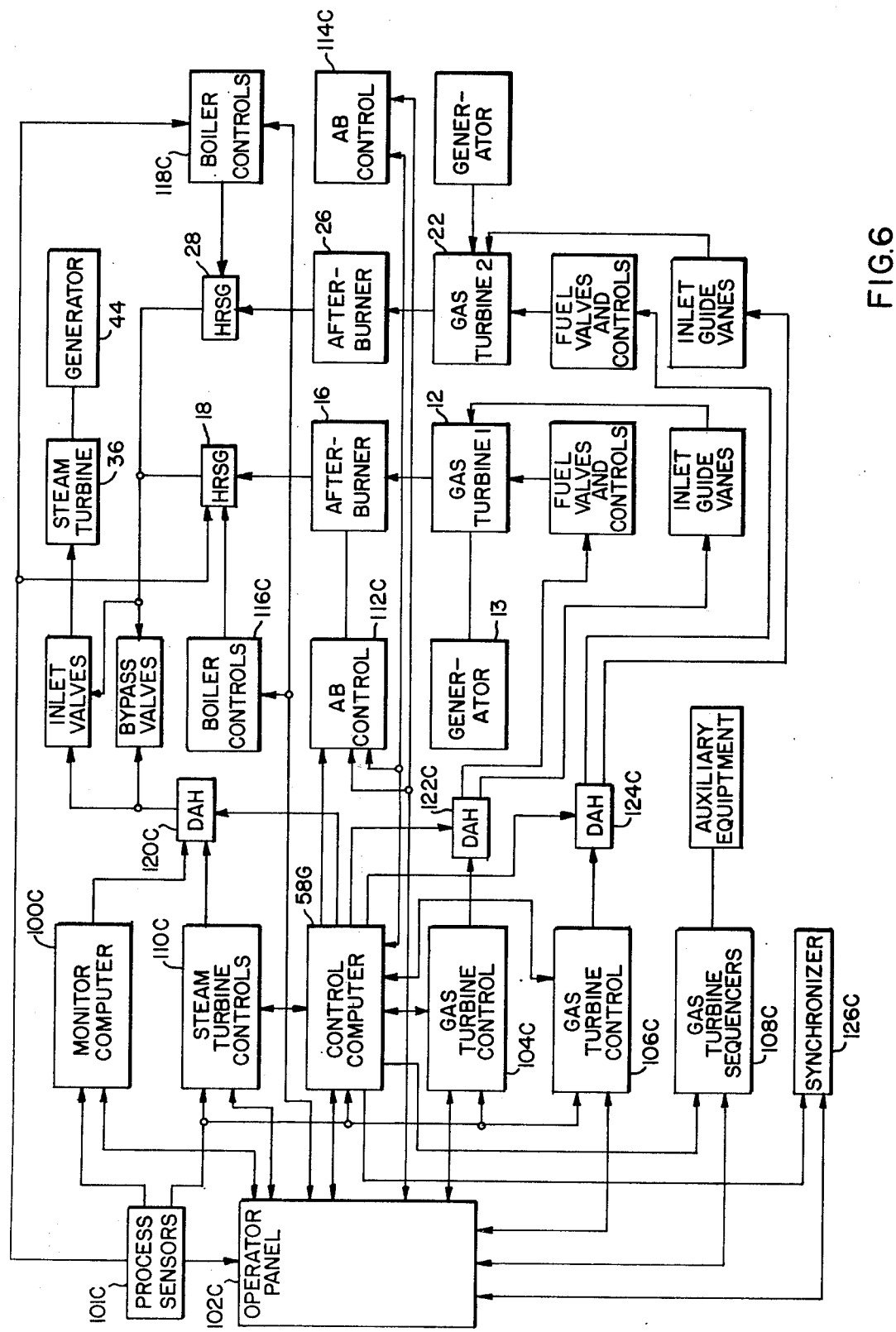
FIG. 6 shows a schematic view of a control system arranged to operate the combined cycle electric power plant of FIG. 1 in accordance with the principles of this invention.

As shown in FIG. 6, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

E. Superheated Steam Temperature Control

Figure 7:
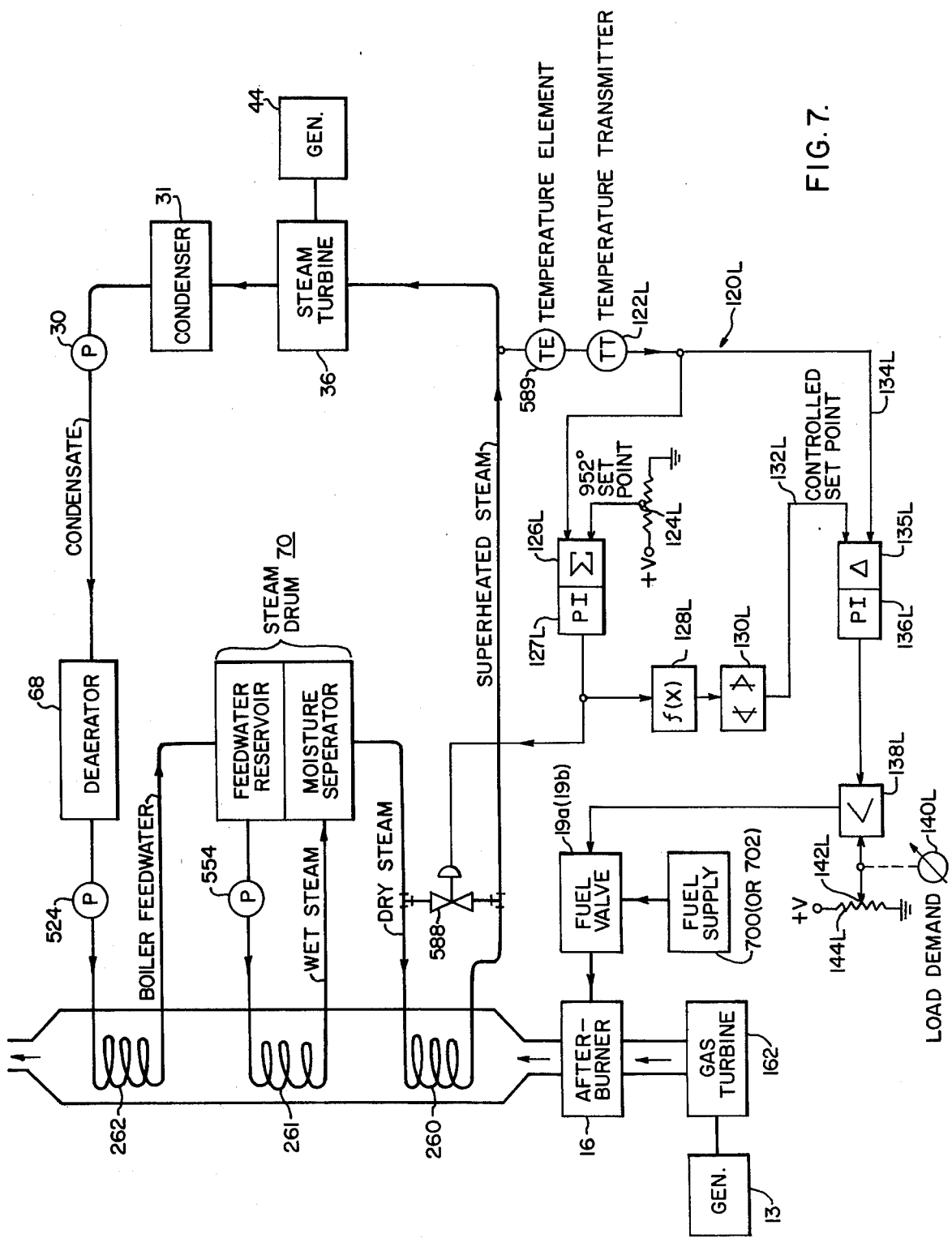
FIG. 7 is a simplified, schematic diagram illustrating selected parts of the combined cycle electric power system and the superheated steam temperature control system therefor.

As generally illustrated in FIG. 7, this invention is used in a "combined cycle" electric power plant including the steam turbine 36 and the heat recovery steam generator 18 to which condensate or feedwater is supplied to be heated into steam which is returned to drive the steam turbine. The electric generator 44 is coupled to the steam turbine 36 to provide electrical power. The combined cycle electric power plant further includes the gas turbine 162, which drives an electric power generator 13. The heated exhaust gases from the gas turbine 162 pass through the afterburner 16 and into the steam generator 18. The steam generator 18 includes three sets of boiler tubes, i.e. the superheater tube 260, the high-pressure evaporator tube 261 and the economizer tube 262, listed in the order in which the exhaust gases of the turbine 162 pass therethrough. As shown in FIG. 7, the superheated steam as derived from the superheater tube 260 is passed to and serves to drive the steam turbine 36. The subject invention relates to the manner in which the temperature of the superheated steam as supplied to the steam turbine 36 is controlled. In particular, a superheater bypass valve 588 is provided whereby a portion of the steam is diverted or bypassed from the superheater tube 260 and is passed directly to the steam turbine 36, thus serving to cool the superheated steam. A second control action is taken to control the superheated steam temperature by regulating the flow of fuel to the afterburner 16; in particular, a signal is developed and applied to either of the fuel valves 19a or 19b to control the fuel flow to the afterburner 16. As explained above, the afterburner 16 supplies supplemental heating to the gas turbine exhaust gases under conditions of relatively high load, whereat the temperatures of the gas turbine exhaust gases may be insufficient to heat the feedwater to supply the necessary steam to the steam turbine 36 as required to meet the load placed upon the electric generator 44.

Though the combined cycle electric power plant has been described in detail with respect to FIGS. 5A to 5F, significant portions thereof are shown in FIG. 7 as it particularly relates to the subject matter of this invention. To complete the description of the combined cycle electric power plant as it relates to this invention, the spent steam derived from the steam turbine 36 is passed to the condenser 31, whereby they are converted into condensate to be directed by the condensate recirculation pump 30 to the deaerator 68, which serves to remove air from the condensate as well as to preliminary heat it before it is passed to the economizer tube 262. In particular, the boiler feed pump 524 serves to pump the condensate water from the deaerator 22, through the economizer tube 262 and into the hot water storage section 70a of the steam drum 70. The boiler feedwater leaving the economizer tube 262 is at a temperature of approximately 550°F. The high-pressure circulation pump 554 serves to pump the hot water from the storage section 70a into the evaporator tube 261. In the evaporator tube 261, the hot water is converted into steam, the latter being supplied through the moisture separator section 70b of the steam drum 70 at a temperature of approximately 675°F. The drive steam from the moisture separator section 70b then enters the superheater tube 260, wherein it is superheated to a temperature in the order of 925°F. This superheated steam is supplied to the steam turbine 36 for driving its associated electric generator 44. The spent steam leaving the steam turbine 36 passes into the condenser, which converts it into water at a temperature of approximately 100°F. The recirculation path from the steam turbine 36 to the heat recovery steam generator 18 and back, is now complete.

This invention relates to the manner in which the superheater bypass valve 588 is controlled. For example, if the temperature of the superheated steam is indicated to be approaching or exceeding a desired value, e.g. 952°F, the superheated bypass valve 588 is opened, whereby more of the steam leaving the steam drum 70 bypasses the superheater tube 260 and flows directly to the steam turbine 36. As a result, the superheated steam temperature is lowered; in other words, the proportion of the lower-temperature steam as derived from the steam drum 70, e.g. its temperature being in the order of 675°F, is increased with respect to the portion of the superheated steam, e.g. its temperature being in the order of 952°F. Thus, the superheater bypass valve 588 provides one mechanism for controlling the temperature of the superheated steam supplied to the steam turbine 36.

FIG. 7 further illustrates a simplified electrical schematic of the control circuit for sensing the temperature of the superheated steam and for using such value first to control the valve position of the superheated bypass valve 588 and secondly, to control the fuel flow to the afterburner 16 by regulating the position of fuel valve 19a (19b). In other words, two control loops are used to achieve the desired control of the superheated steam temperature, the first being used to control the desired opening of the superheater bypass valve 588 and the second to control the position of the fuel valve.

Both control loops utilize a temperature sensor 589 for sensing the steam temperature and a temperature transmitter 122L for producing an electrical signal proportional to said steam temperature. The first control loop applies the transmitter output to a bypass valve controller comprised of a summing circuit 126L and a proportional plus integral block 127L. In particular, the summing circuit 126L takes the difference between the measured temperature and a desired value or setpoint, e.g. to 952°F, as set by a signal source 124L, illustratively taking the form of a voltage divider. Generally, the proportional plus integral block 127L operates as a differential amplifier with some integrating action.

The action of the first or bypass valve control loop is of an inverse nature. If the superheated steam temperature is greater than the setpoint, e.g. 952°F, then a difference signal is developed by the subtraction circuit 126L to be supplied to the superheater bypass valve 588 to increase the degree of opening thereof. As a result, the portion of the cooler bypassed steam is increased with respect to that of the hotter, superheated steam and therefore, the steam temperature is reduced to bring it back toward the setpoint value. Conversely, if the steam temperature is less than the setpoint, the subtraction circuit 126L provides an output to decrease the degree of opening of the superheater bypass valve 588, whereby more steam is permitted to pass through the superheater tube 260, thus increasing the temperature of the steam supplied to the steam turbine 36. The first or bypass valve control loop is the primary control loop in that the second control loop relating to the opening and closing of the fuel valve 19a, begins to function only after the effectiveness of opening and closing the superheater bypass valve 588 is lost. In particular, as the superheated steam temperature continues to rise, the output of the first control loop as derived from the proportional plus integral function block 127L drives the superheater bypass valve 588 towards it maximum position. At this point, it still may be necessary to effect some additional control action to reduce the temperature of the superheated steam. In particular, the second control loop begins to function, as now will be described with respect to FIG. 7.

The second temperature control loop includes an afterburner controller comprised of a subtraction circuit 135L and a proportional plus integral block 136L. The output of the proportional plus integral function block 136L is supplied by way of a low selector circuit 138L to set the position of the fuel valve 19a. Further, the output of the temperature transmitter 122L indicative of the superheated steam temperature is supplied along connector 134L to one input of the subtraction circuit 135L. The other input to the subtraction circuit 135L is a signal indicative of the variably-controlled setpoint as supplied thereto along connector 132L. In particular, the output of the proportional plus integral function block 127L, indicative of the desired position of the superheater bypass valve 588, is supplied by way of a function generator 128L and a high-low limiter circuit 130L.

Significantly, this setpoint is not fixed, but is variable in accordance with the operation of the superheater bypass valve 588. The function generator 128L produces an output which decreases in a linear manner as the amplitude of the output signal from the proportional plus integral function block 127L increases. The high-low limiter circuit 130L limits the signal from the function generator 128L so that the resultant signal supplied to the subtraction circuit 135L cannot fall below a first value corresponding to the setpoint of the first control loop, e.g. 952°F, or exceed a second value corresponding to the setpoint of the second control loop, e.g. 962°F. The function generator 128L and the high-low limiter 130L combine to produce an output signal as graphically shown in FIG. 11. The horizontal axis of FIG. 11 represents the output signal amplitude as derived from the proportional plus integral block 127L, representing the position of the superheater bypass valve 588, as applied to the input of the function generator 128L, whereas the vertical axis represents the variable setpoint signal supplied to the input of the subtraction circuit 135L. As graphically demonstrated in FIG. 11, a variable setpoint is supplied to the second control loop as a function of the opening of the superheater bypass valve 588. In particular, the setpoint for the second control loop controlling the position of the fuel valve 19a is maintained substantially constant as the superheater bypass valve 588 is opened from its closed position until it achieves a 70%-open position, at a level higher than the setpoint at which the first control loop is set. For example, the setpoint of the first control loop is set at an illustrative value of 952°F, whereas for the described range, the setpoint of the second control loop is set at 962°F. When the superheater bypass control valve 588 has reached an opening in the order of 70% of its fully-opened position, it tends to lose its effectiveness to decrease the superheated steam temperature; at that point as shown in FIG. 11, the setpoint as applied to the second control loop is decreased from a relatively high value, e.g. 962°F, toward a second, lower value, e.g. 952°F, i.e. the value of the first setpoint as imposed upon the first control loop. The relationships of the setpoints is significant in that if both control loops use the same setpoint, the total control system would "hunt" in an oscillatiing manner. On the other hand, if the setpoint of the second control loop controlling the afterburner fuel supply was set lower than that of the superheater bypass valve, the bypass valve would never open. Thus, by choosing the setpoints in the manner as described with respect to FIG. 11, the steam generator 36 is capable of producing a maximum steam flow at a maximum amount of temperature without risk of over-temperature operation. As will be described, additional protective override signals are developed if either the superheated steam temperature or pressure, or the temperature of the gas turbine gases as directed to the afterburner 16 become too high, whereby suitable action is taken to reduce the setpoint as applied to the fuel valve 19a (or 19b).

As shown in FIG. 7, the second temperature control loop includes the subtraction circuit 135L and the proportional plus integral function block 136L, the output of which is applied to the low selector circuit 138L. A load demand signal is applied to the other input of the low selector circuit 138L; in FIG. 7, the load demand is obtained illustratively from a potentiometer 144L, the sliding top 142L of which is controlled by a knob 140L illustratively disposed upon the operator's panel. The low selector circuit 138L passes the lesser of the two input signals to the fuel valve 19a. Thus, the load demand signal as determined by the operator in a MANUAL mode of operation or by the digital computer in an AUTOMATIC mode of operation, controls the operation of the fuel valve 19a, when the temperature of the superheated steam is less than the variable setpoint value as determined by the output of the subtraction circuit 135L of the second control loop. Thus, if the superheated steam temperature is less than the variable value (from 960°F to 952°F), the load demand signal controls the operation of the fuel valve 19a and the second or afterburner control loop is inoperative. However, when the superheated steam temperature approaches a critical value, i.e. the variable setpoint, the second control loop is rendered effective to control the operation of the fuel valve 20 to hold the steam temperature at the setpoint value as determined by the output of the proportional plus integral circuit 136L. The operation of the second or afterburner control loop is inverse in that if the superheated steam temperature becomes greater than the variable setpoint, then the output of the proportional plus integral function block 136L is reduced in order to decrease the degree of opening of the fuel valve 19a and to correspondingly reduce the amount of heat provided by the afterburner 14. This control action brings the superheated steam temperature back down to the setpoint value as established by the second control loop. Conversely, if the steam temperature is too low, the degree of opening of the fuel valve 19a is increased to cause the afterburner 16 to supply even a greater amount of heat to the exhaust gases of the gas turbine 162 passed to the steam generator 18.

Thus, the first or bypass valve control loop is the primary control loop and acts first to correct the steam temperature to its desired value, e.g. 952°F. As the effectiveness of the first control loop to limit the variable, e.g. superheated temperature, decreases, the second control loop is rendered effective to effect a different action, e.g. to close the afterburner fuel valve 19a. As the control action of the bypass valve 588 becomes ineffective, a signal is derived from the first control loop and in particular from the proportional plus integral controller 127L and is used to bias or to vary the setpoint of the second control loop in a manner that the second or afterburner control loop is increasingly made effective, i.e. its setpoint is gradually reduced and is made equal to the first or bypass valve control loop setpoint, i.e. 952°F.

E-1. Control Functions of Superheated Steam Temperature Control

Figure 8:
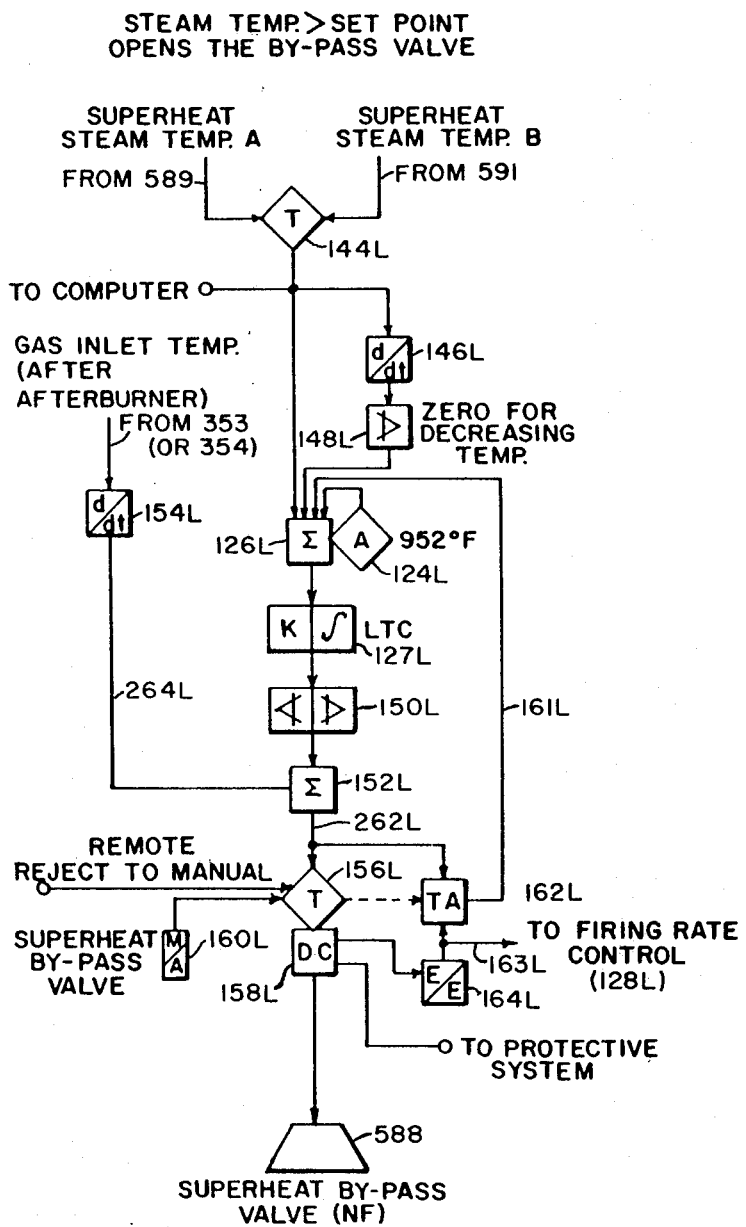
FIG. 8 shows a functional diagram of a first control loop for controlling the position of the superheater bypass valve of the superheated steam control system as generally shown in FIG. 7.
Figure 9A:
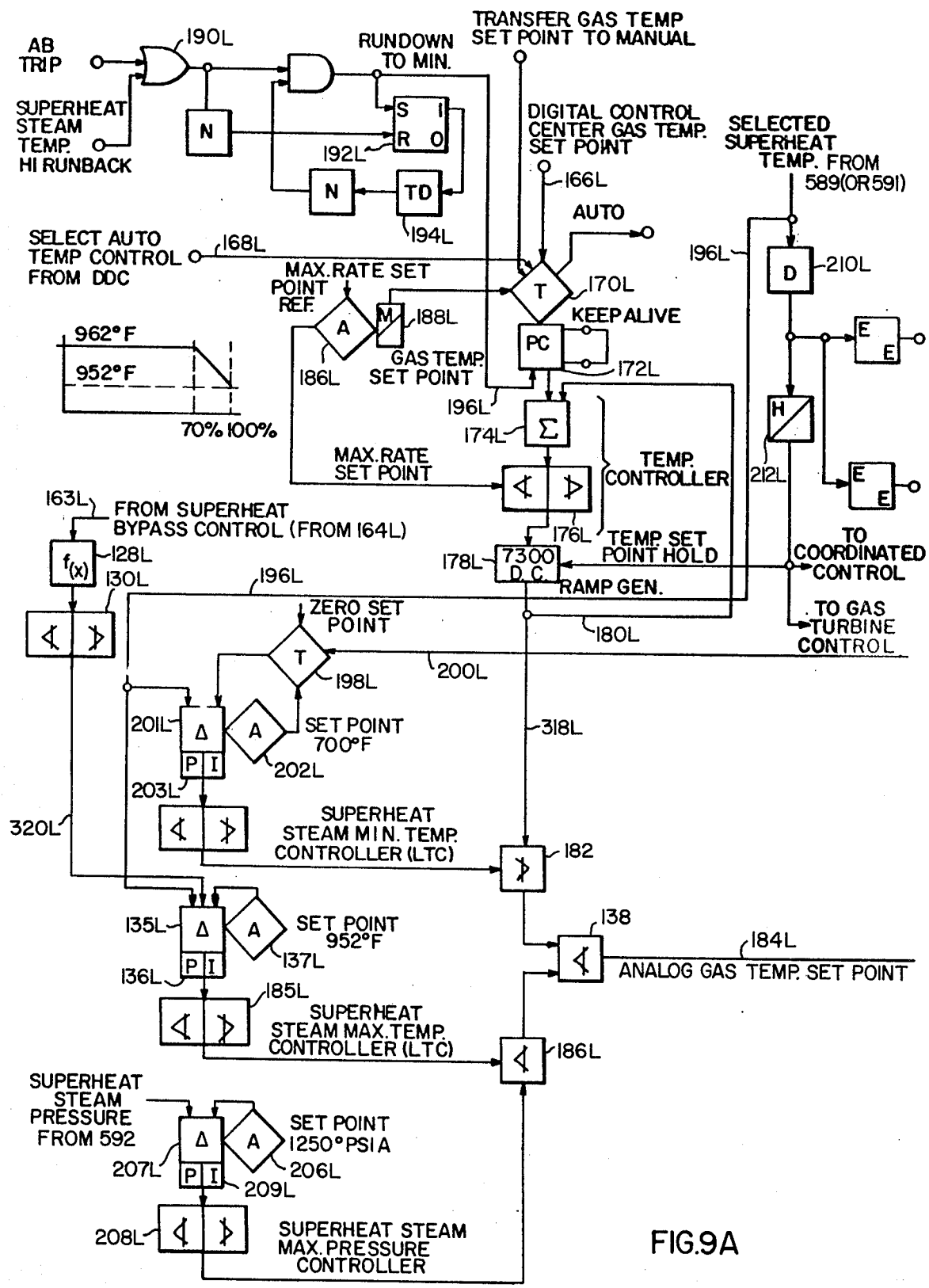

There is shown in more, functional detail an electrical diagram of the first or superheater bypass valve control loop in FIG. 8 and of the second or afterburner valve control loop in FIGS. 9A and 9B. As shown in FIG. 8, the first or superheater bypass control loop includes a function transfer block 144L for selecting one of the output signals of either the temperature emitter 589 or 591 (see FIG. 5A) and for applying the selected signal indicative of the superheat temperature to the summing circuit 126L. As explained above, the setpoint of the first control loop is applied through the setpoint block 124L to another input of the summing circuit 126L. In turn, the output of the summing circuit 126L is applied by way of the proportional plus integral block 127L, a high-low limiter 150L, a second summing block 152L, a transfer function block 156L and a driver card 158L to control the position of the superheater bypass valve 588. When the selected, temperature indicating signal as derived from the transfer function block 144L increases, the first control loop takes additional action to offset the increasing temperature. In particular, the temperature indicating signal is differentiated by a differentiating circuit 146L and applied to a limit circuit which provides an output only for increasing temperature signals, to the summing circuit 126L, whose output is temporarily increased as the temperature increases, to more rapidly open the superheater bypass valve 588. In a similar fashion, the temperature of the turbine gases as passed from the afterburner 16, to the steam generator 36 is measured by temperature emitter 353 or 354 to provide an output signal applied to a differential circuit 154L, the output of which is applied to the summing circuit 152L. As a result, while the gas inlet temperature is increasing, the control signal applied to the superheater bypass valve 588 is increased for this period.

If, for example, the control system is rejected to MANUAL to protect the steam generator, an appropriate signal is applied to the transfer function block 156L whereby the superheater bypass valve 588 is opened to a value as set by the operator. When set to MANUAL, the operator enters the valve position as through the manual/auto block 160L to provide the setpoint at which the superheater bypass valve 588 is operated. To ensure a bumpless transfer between that bypass valve position as set by the first control loop and as entered through the manual/auto block 160L, an output is derived from the driver car 158L and is applied through a voltage converter 164L to a tracking amplifier 162L to be compared with the output of the first control loop, i.e. the output of the summing amplifier 152L. When disposed into a MANUAL mode, the transfer or switch block 156L applies an enabling signal to the tracking amplifier 162L, whereby it is actuated to provide a signal indicative of the difference between the two input values applied thereto, to be applied along connector 161L to the summing block 126L whereby the output of the summing block 126L, and therefore the first control loop, is driven toward a value corresponding to the valve position as established during the MANUAL mode. Thus, if it is desired to shift from a MANUAL to an AUTOMATIC mode, such a switch will not occur until a bumpless transfer may be effected.

A signal indicative of the output of the first control loop and therefore the valve position of the superheater bypass valve 588 is derived from the voltage converting circuit 164L (see FIG. 8), and is applied along connector 163L to the second or afterburner control loop as shown in FIGS. 9A and 9B and in particular to the function generator 128L as shown in FIG. 9A. In a manner as previously described, the function generator 128L provides an output in accordance with FIG. 11, to be applied through a high-low limiter 130L to one input of the subtraction circuit 135L having a second input to which is applied the selected superheat temperature as derived from either the temperature emitter 589 or 591 along connector 196L, as explained above with respect to FIG. 8, along conduit 196L. The difference output of the subtraction circuit 135L is applied by way of the proportional plus integral controller 136L and the high-low limiting circuit 184L, and a low selector circuit 186L to the low selector circuit 138L. In a manner to be explained in detail later, the output of the low selector circuit 138L represents the analog gas setpoint to be applied to control the position of either the afterburner gas valve 19b or the afterburner oil valve 19a, as shown in FIG. 9B.

In an AUTOMATIC mode of operation, the digital computer applies a gas temperature setpoint along connector 166L to a function transfer block 170L and an auto-command signal along connector 168L, whereby the function transfer block 170L applies the gas temperature setpoint as derived from the digital computer to a process controller 172L which functions to convert the digital signals derived from the computer into corresponding analog signals to be applied to a summing circuit 174L. In turn, the output of the summing circuit 174L is applied by way of the high-low limiting circuit 176L, a ramp generator 178L, and a high selector circuit 182L to the low selector circuit 138L. The ramp generator 178L ramps up or ramps down at a rate set by the limited input derived from the summing circuit 174L. As shown in FIG. 9A, the ramp generator output is also applied by a feedback connector 180L to a second input of the summing circuit 174L, whereby when the setpoint as determined by the digital computer is reached, the output of the summing circuit 174L goes to zero and the ramp generator 178L ceases to function.

In a MANUAL mode of operation, a manual-command signal is applied to the transfer function block 170L, whereby the gas temperature setpoint as entered through the manual control block 188L is applied by the transfer function block 170L to the process controller 172L. Further, the rate at which the setpoint may be varied is entered through setpoint block 186L and is applied to the high-low limiting circuit 176L to set limits imposed upon the output of the summing circuit 174L and therefore the rate at which the ramp generator 178L may ramp up or ramp down.

Under certain critical conditions such as an afterburner trip or sensing of a superheated steam temperature above a critical level, an output is derived by an OR gate 190L to derive a run-down command signal to be applied as by connector 196L to the process controller 172L. At the same time, a flip-flop 192L is set to start a timedelay circuit 194L to time for a predetermined period, e.g. 10 seconds, at the end of which the run-down signal is discontinued. Thus, for the predetermined period, the gas temperature setpoint is run down in response to one of the noted critical conditions.

As shown in FIG. 9A, the selected superheat temperature as derived from the temperature emitter 589 or 591 is also applied to a differential circuit 210L to provide a differentiated signal applied to a high monitor 210L to provide a differential signal applied to a high monitor 212L to apply a hold-command signal to the ramp generator 178L.

Further, the selected superheat steam temperature is also applied to a superheated steam minimum temperature protective circuit which provides an output to the high selected circuit 182L, when the temperature of the superheated steam falls below a predetermined, critical value, e.g. 700°F. In particular, the selected superheated steam temperature signal is applied to one input of a subtraction circuit 201L, whereas a setpoint signal corresponding to a value of 700°F is applied to the other input by way of a transfer function block 198L as derived from a setpoint block 202L. The difference signal as derived from circuit 201L is applied by way of a proportional plus integral block 203L and a high-low limit circuit 204L to the high selector 182L. Thus, if the superheat steam temperature does fall below 700°F, the output of the superheated steam temperature protective circuit is selected by the high selector 182L to provide the analog gas setpoint as directed by low selector circuit 138L and connector 184L to control either of the afterburner valves 19b or 19a.

Further, upon receipt of a transfer control signal to minimum fuel as applied along connector 200L to the transfer block 198L, a zero setpoint is applied to the subtraction circuit 201L.

In addition, a superheated steam maximum pressure protective circuit is incorporated into the superheated steam temperature control to provide an output to the low selector circuit 186L; upon sensing a pressure in excess of a critical value, e.g. 1250° PSIG, a signal is developed to reduce the anlog gas temperature setpoint and thus the pressure of the superheated steam as applied to the steam turbine 36. In particular, a signal indicative of the superheated steam pressure is developed by the pressure transmitter 592 (see FIG. 5A) and is applied to one input of the subtraction circuit 207L, whereas another input indicative of a superheated steam pressure setpoint is applied thereto by a setpoint block 206L. The difference signal of the subtraction circuit 207L is applied by way of the proportional plus integral block 209L and the highlow limiter 208L to the input of the low selector circuit 186L.

As seen in FIG. 9B, the analog gas temperature setpoint is applied by the connector 184L to the afterburner fuel control and in particular to one input of a subtraction circuit 214L to be compared thereby with a signal indicative of the gas inlet temperature measured at a point past the afterburner 16 by a selected one of the temperature emitters 353 or 354 (see FIG. 5A). It is understood that in many instances where a parameter is to be measured, at least two sensing elements are employed so that if one is damaged or becomes defective, the other measuring element does provide the desired output signal. In turn, the difference signal derived from circuit 214L is applied by way of the proportional plus integral circuit 216L, a high-low limiting circuit 218L to a transfer function block 220L, whose output is applied to control both the afterburner gas and oil valves 19b and 19a. In particular, the transfer function block output is applied by way of a low selector 222L, a function generator 226L, a further transfer function block 228L and a driver card 232L to the afterburner gas valve 19b. To prevent the gas flow to the afterburner from falling below a minimum level, a minimum value setpoint is applied by block 224L to the low selector circuit 222L, to prevent the afterburner gas valve 19b from being disposed at a position less than this minimum value of gas flow. In addition, the gas valve may be operated in a MANUAL mode and an operator-entered value applied thereto by a manual/ auto control block 230L which applies a setpoint to the transfer function block 228L. As shown in FIG. 9B, the control path to the afterburner oil valve 19a is similar to that described with respect to the afterburner gas valve control path.

At certain times in the operation of the combined cycle electric power plant, it is desired to apply a minimum fuel flow to the afterburner as by applying a control signal to the transfer function block 220L, whereby a corresponding minimum fuel transfer setpoint is applied by a block 234L as the setpoint or demand signal to control the valve position of the gas or oil valve 19b or 19a.

In order to ensure a bumpless transfer of the valve control from its operating state in MANUAL or when it is operating at a minimum fuel level, to the AUTOMATIC mode, an output is derived from each of the driver cards 232L and 254L indicative, respectively, of the valve positions of the afterburner gas and oil valves 19b and 19a, by way of a low select circuit 256L to a tracking amplifier 236L. The tracking 236L compares the actual position of the fuel valves with that position as indicated by the output of the proportional plus integral circuit 216L to provide a trim signal as applied to the third input of the subtraction circuit 214L whereby output of the proportional plus integral circuit 216L as applied through the transfer function block 220L to control the afterburner valve 19b or 19a, is driven toward the measured position of the valve. The tracking amplifier 236L is enabled by a signal derived from an OR gate 238L to which is applied the transfer fuel master control signal and a signal derived from the AND gate 252L to which is applied signals derived from the transfer function blocks 228L and 248L indicating that the afterburner temperature control is operating in its MANUAL mode.

E-2. System Circuitry

Figure 10A:
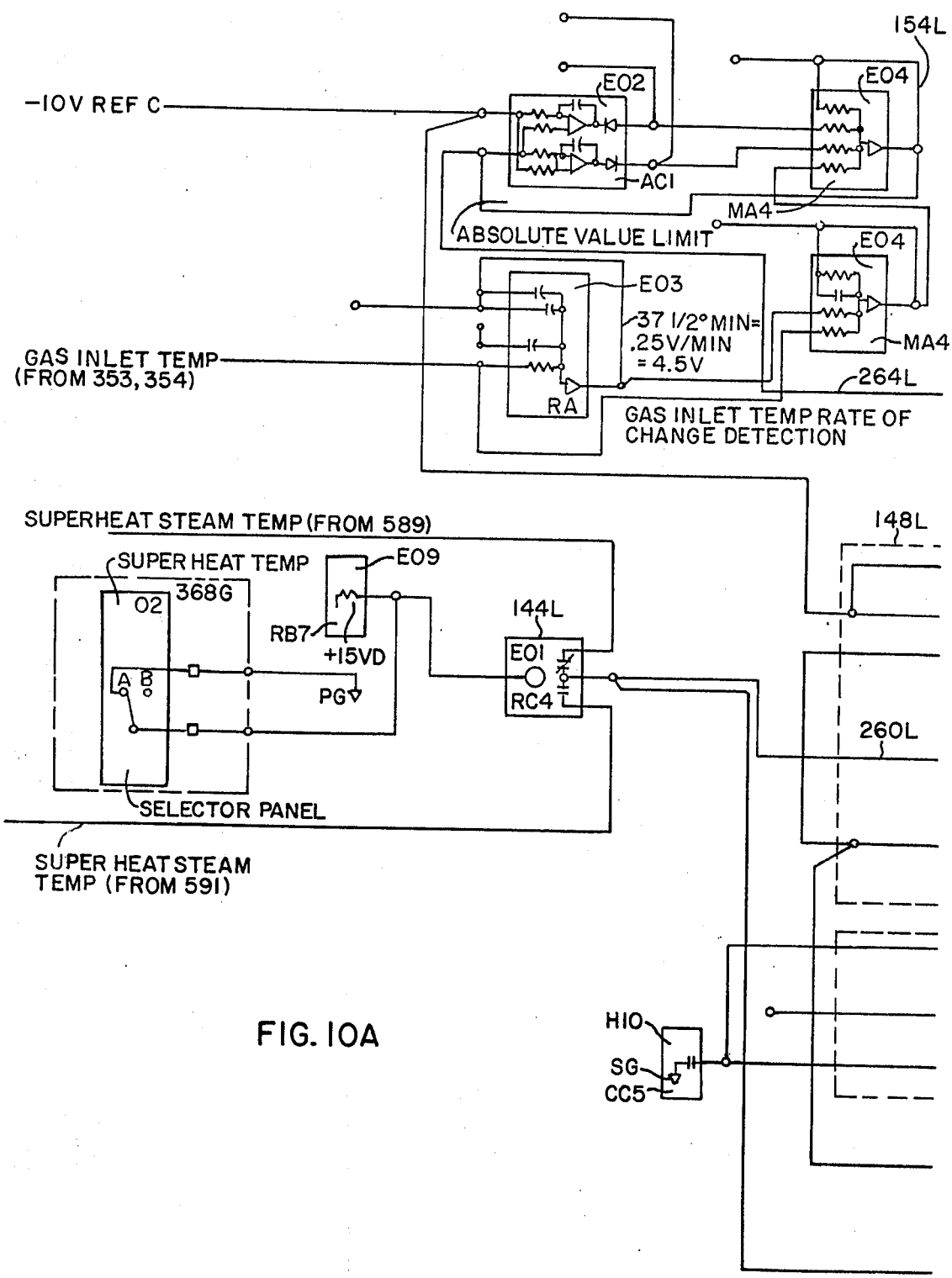
Figure 10B:
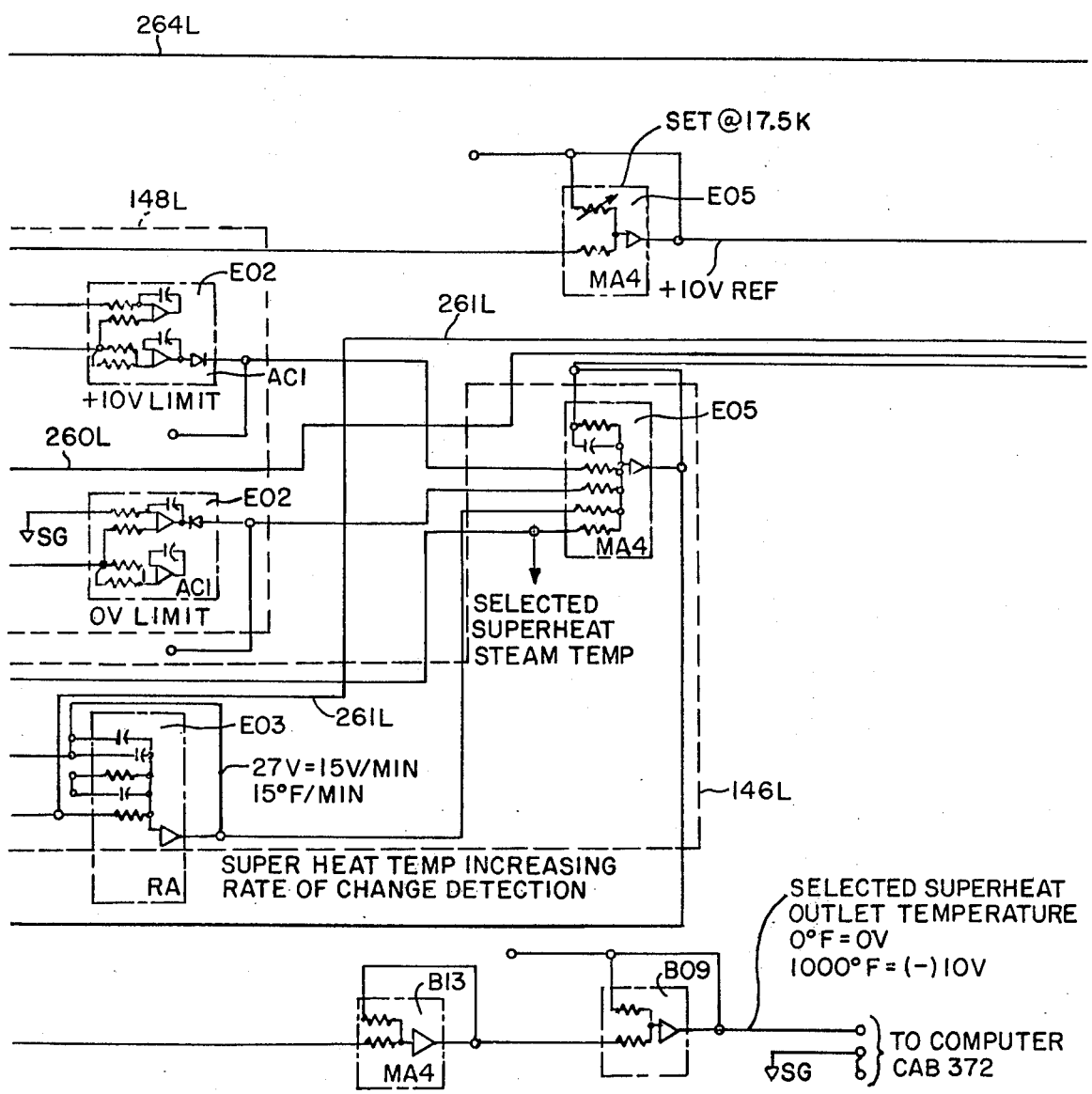
Figure 10C:
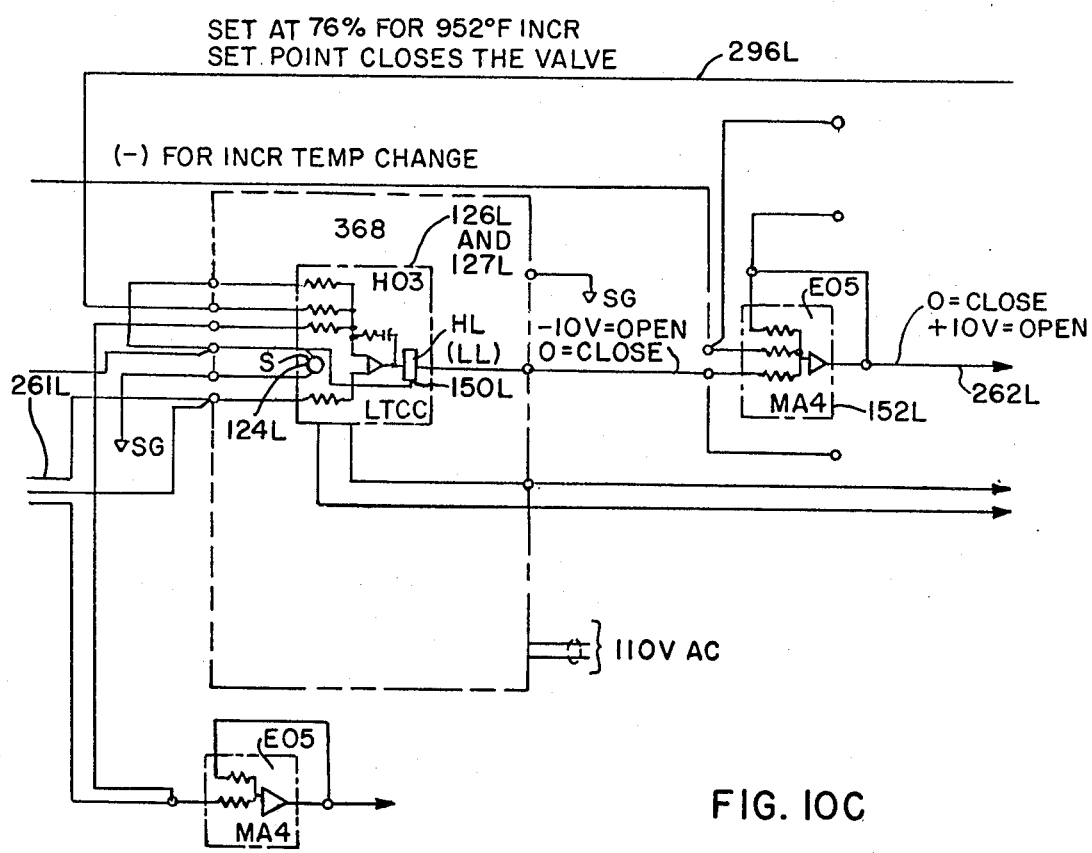
Figure 10D:
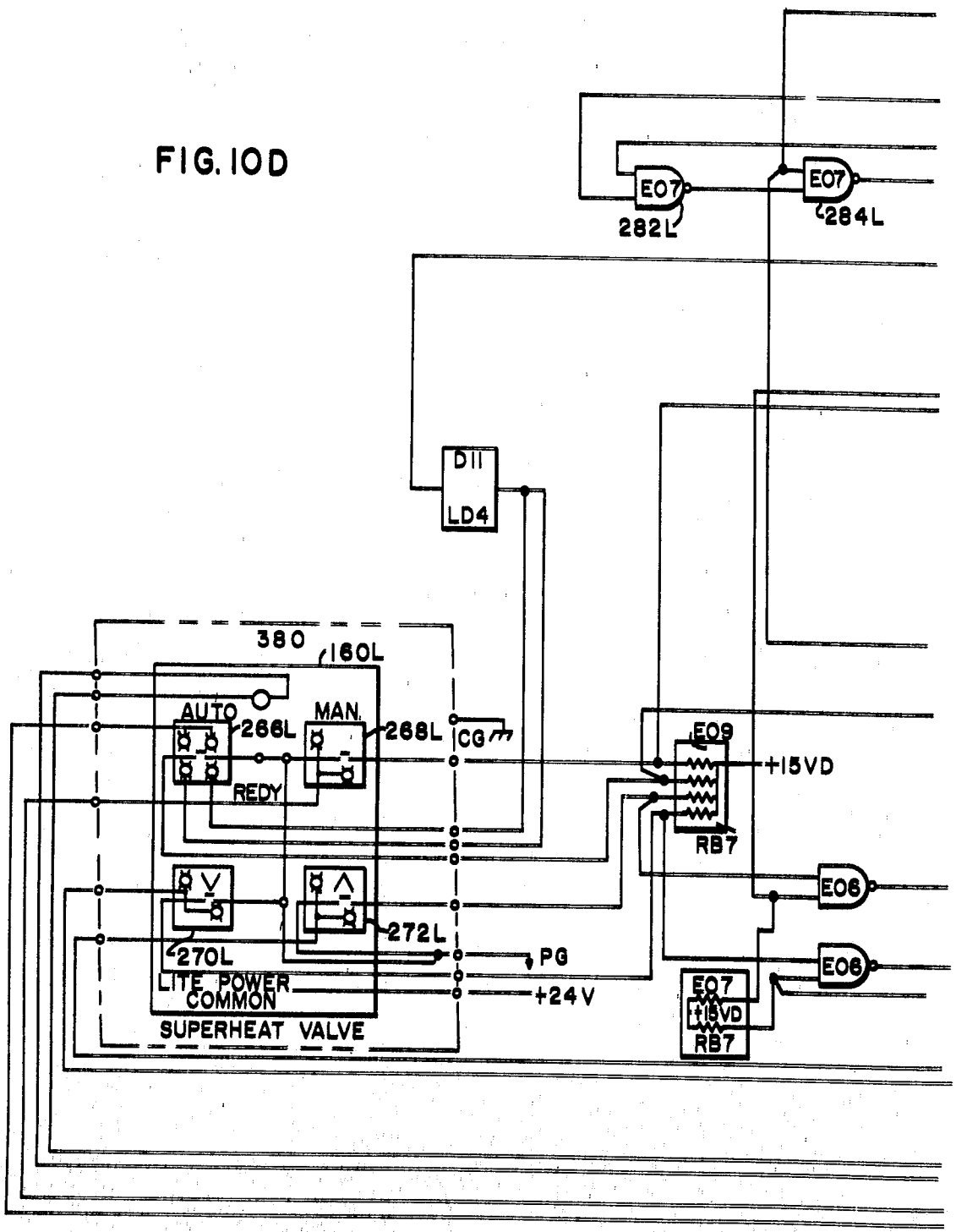
Figure 10F:
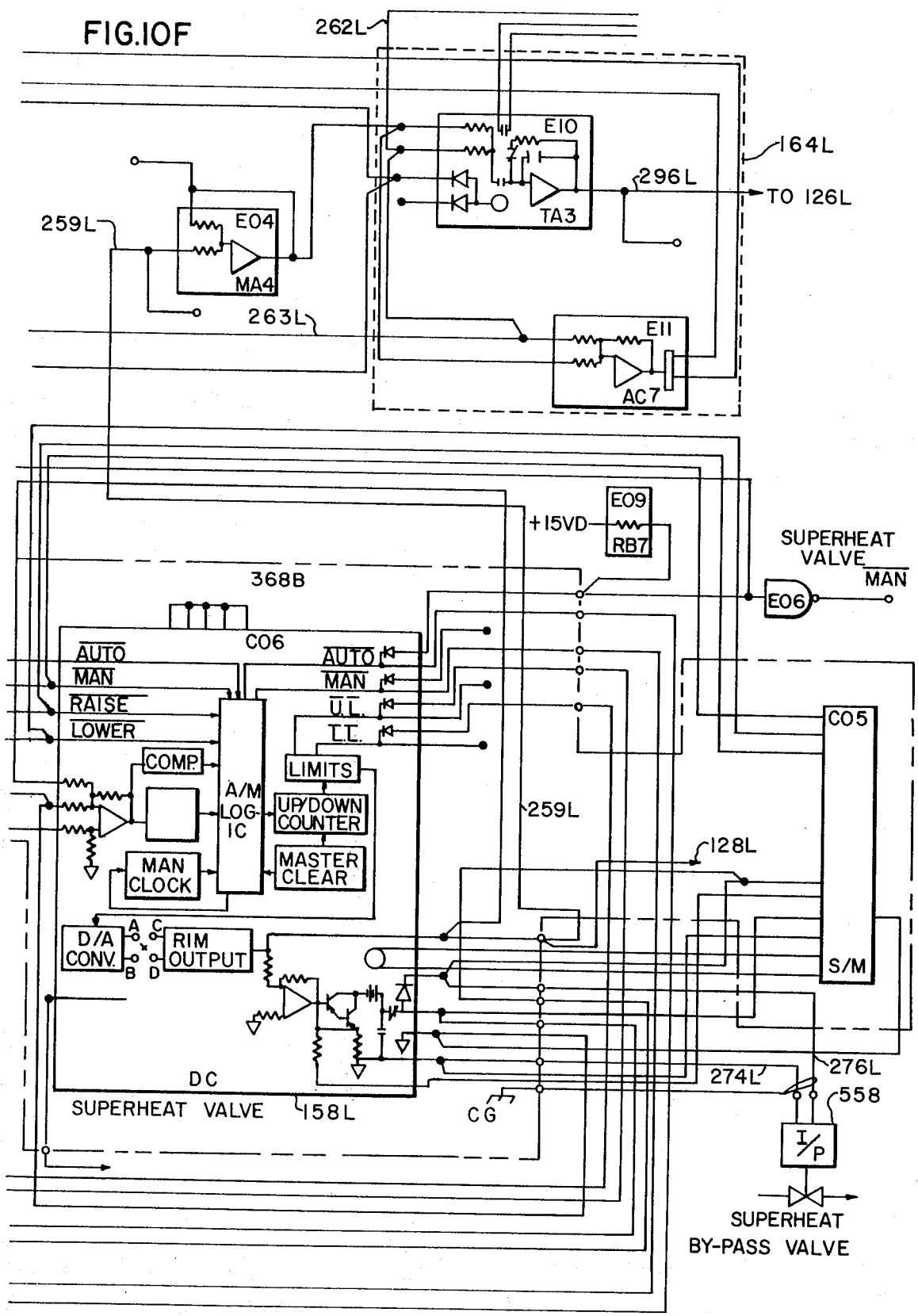

In FIGS. 10A and 10F, there is shown detailed circuitry preferably employed to implement the functions described in connection with FIG. 8. A signal indicative of the superheated steam temperature as derived from the temperature emitter 589 or 591 is selected by the transfer function block 144L taking the form of a normally-closed relay contact and a normally-open contact, dependent upon a signal as derived from the selector panel. The selected temperature signal is applied by connector 260L to the summing circuit 126L and the proportional plus integral circuit 127L. A further input is made to the subtraction circuit 126L as by a setpoint block 124L whereby an output indicative of the difference between the measured and superheated steam temperature setpoint is derived. Further, the selected superheated steam temperature signal also is applied by connectors 260L and 261L to a differentiating circuit 146L, the output of which is applied to a processing circuit 148L which only provides an output when an increasing superheated steam temperature is sensed, to a third input of the summing circuit 126L. The output of the proportional plus integral circuit 127 is applied by way of the high-low limiting circuit 150L to the second summing circuit 152L. Further, the gas inlet temperature is sensed and a signal is derived as from either of the temperature elements 353 or 354 and applied to the differentiating circuit 154L whose output is applied to a second input of the summing circuit 152L, whereby as the measured gas inlet temperature (after the afterburner 16) changes rapidly, the setpoint controlling the position of the superheater bypass valve 588 is further reduced.

FIGS. 10D, E and F particularly relate to the manner in which the operator enters a position-command or setpoint signal by the manual/auto control panel 160L to control the position of the superheater bypass valve 588. In particular, the operator sets the superheater bypass valve control to MANUAL by depressing the MANUAL pushbutton 268L whereby a signal is applied to one input of an OR gate 286L thereby to generate a rejected manual signal to be applied by conductor 28L to the driver card 158L. The OR gate 286L forms the essence of the transfer function block 156L, and as generally indicated in FIG. 8, responds to the manual input signal to apply an appropriate setpoint to the driver car 158L. In particular, the operator may manipulate either the UP button 272L or the DOWN button 270L of the manual/auto control block 160L to apply corresponding command signals along connectors 292L and 294L to the driver card 158L, whereby an output is developed and applied by connectors 274L and 276L to open and close the superheater bypass valve 588. A signal indicative of the superheater bypass valve position is applied by a connector 259L to one input of the tracking amplifier 164L, which compares that input to a second input applied by connector 262L as derived from the summing amplifier 152L indicative of the superheater bypass valve position (in an AUTOMATIC mode of operation), to generate a difference signal to be applied along conductor 296L to an input of the summing amplifier 126L (see FIG. 10C). Further, the tracking amplifier generates and applies Bup and Bdn signals along conductors 280L and 278L to an OR gate 282L, which provides an output indicative of the presence of a difference between the inputs to the tracking amplifier 164L. The OR gate output is applied through an OR gate 284L to the OR gate 286L to generate a reject-to-manual signal to be applied to the driver card 158L as explained above. In this manner, the superheated steam temperature control may not be set from a MANUAL to an AUTOMATIC mode of operation unless the inputs to the tracking amplifier 164L are substantially equal, i.e. the position as controlled by the output of the summing amplifier 125L is essentially that to which the superheater bypass valve has been previously set.

Figure 11A:
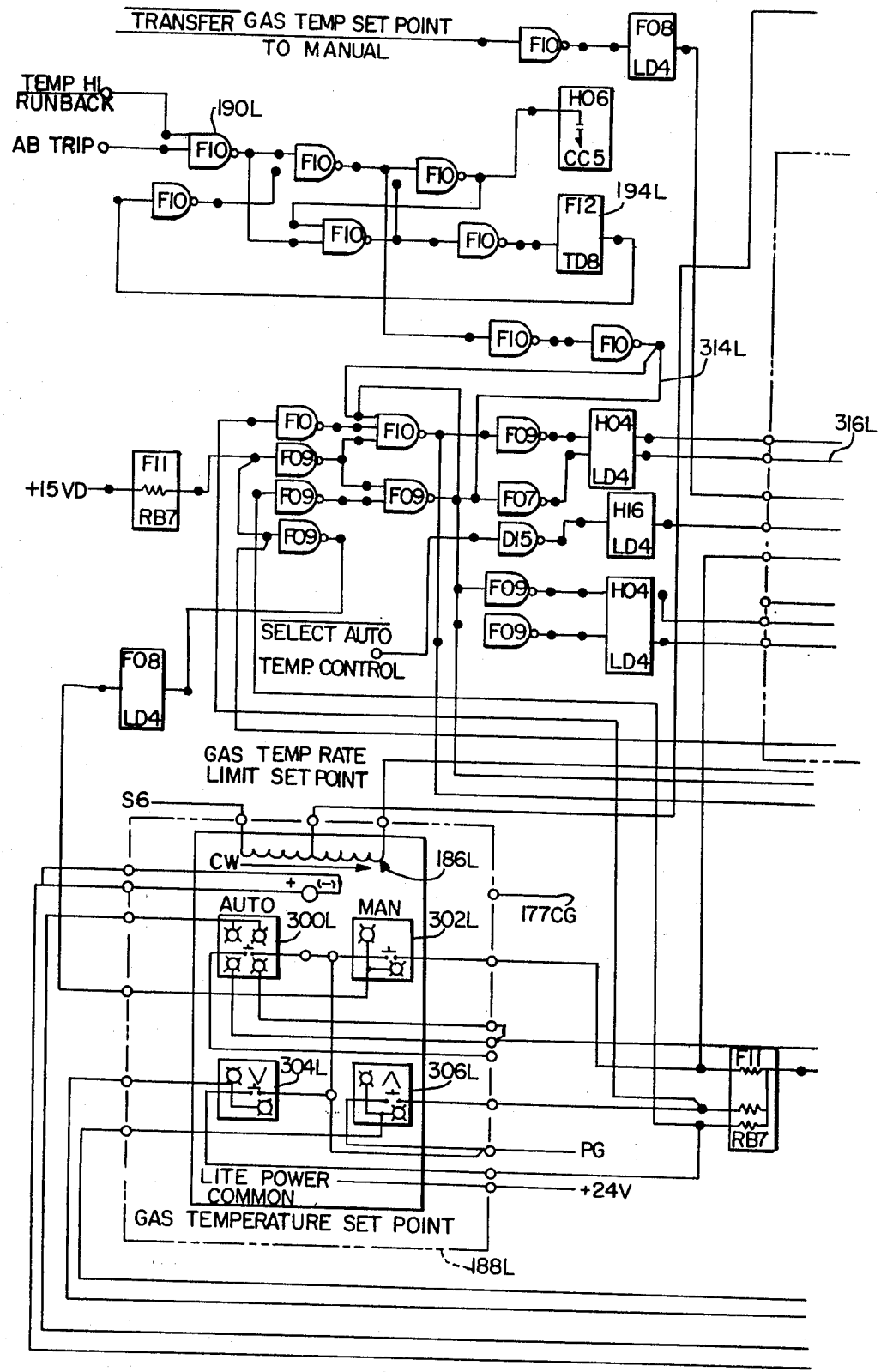
FIGS. 11A to 11L show in detail an illustrative embodiment of the circuitry which may be employed to perform the various functional blocks shown in FIGS. 9A and 9B.
Figure 11B:
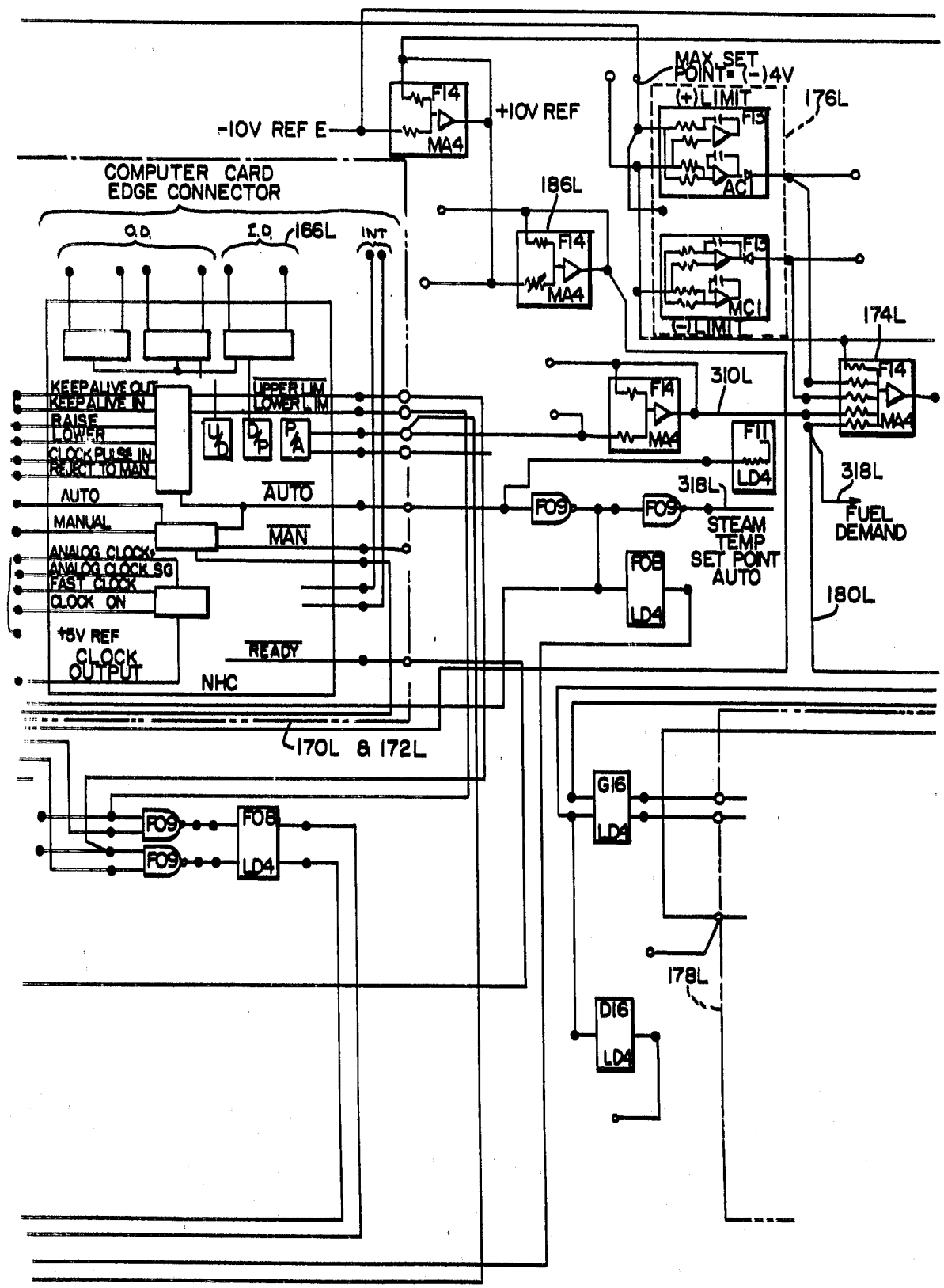
Figure 11C:
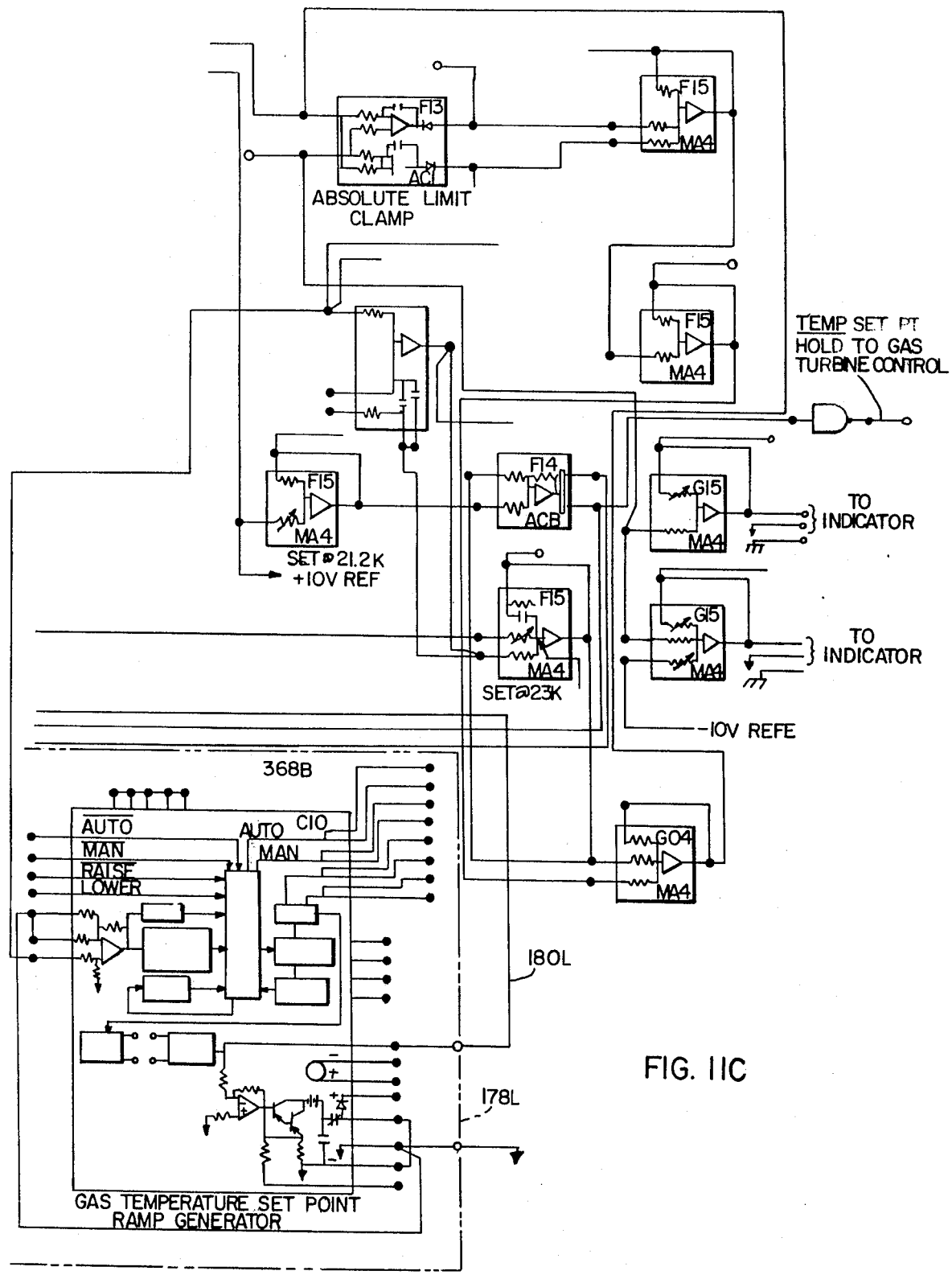
Figure 11D:
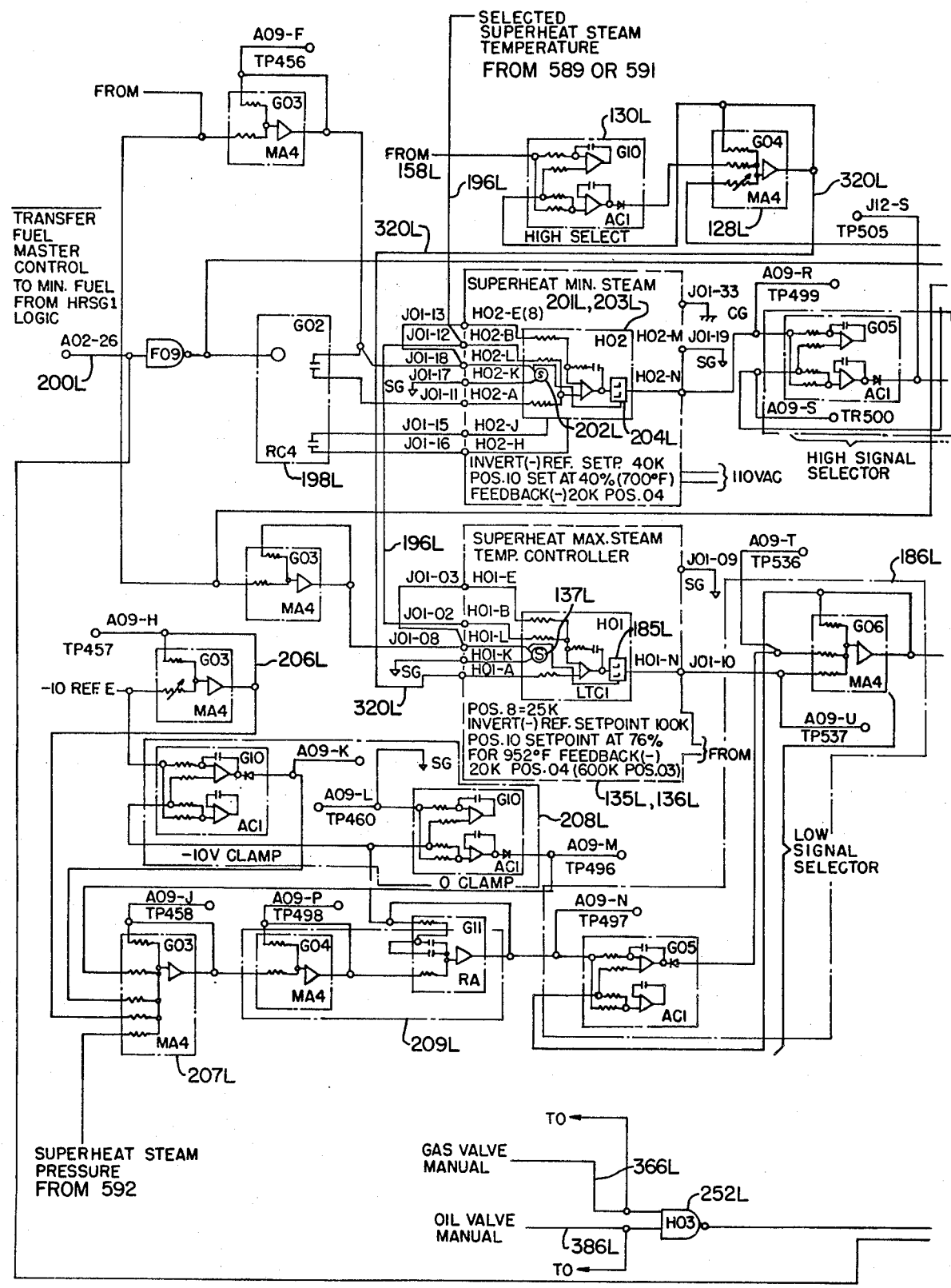
Figure 11E:
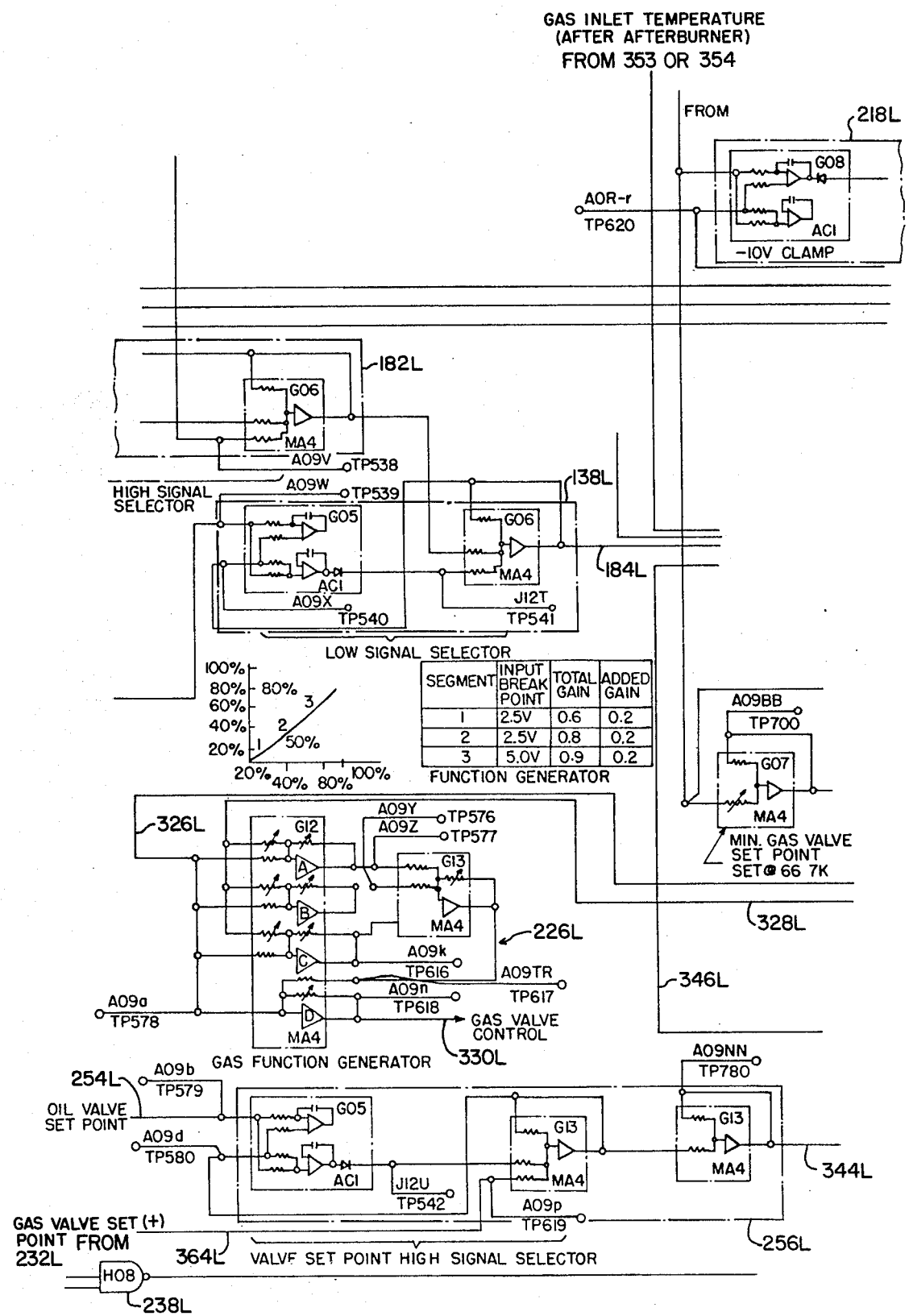
Figure 11:
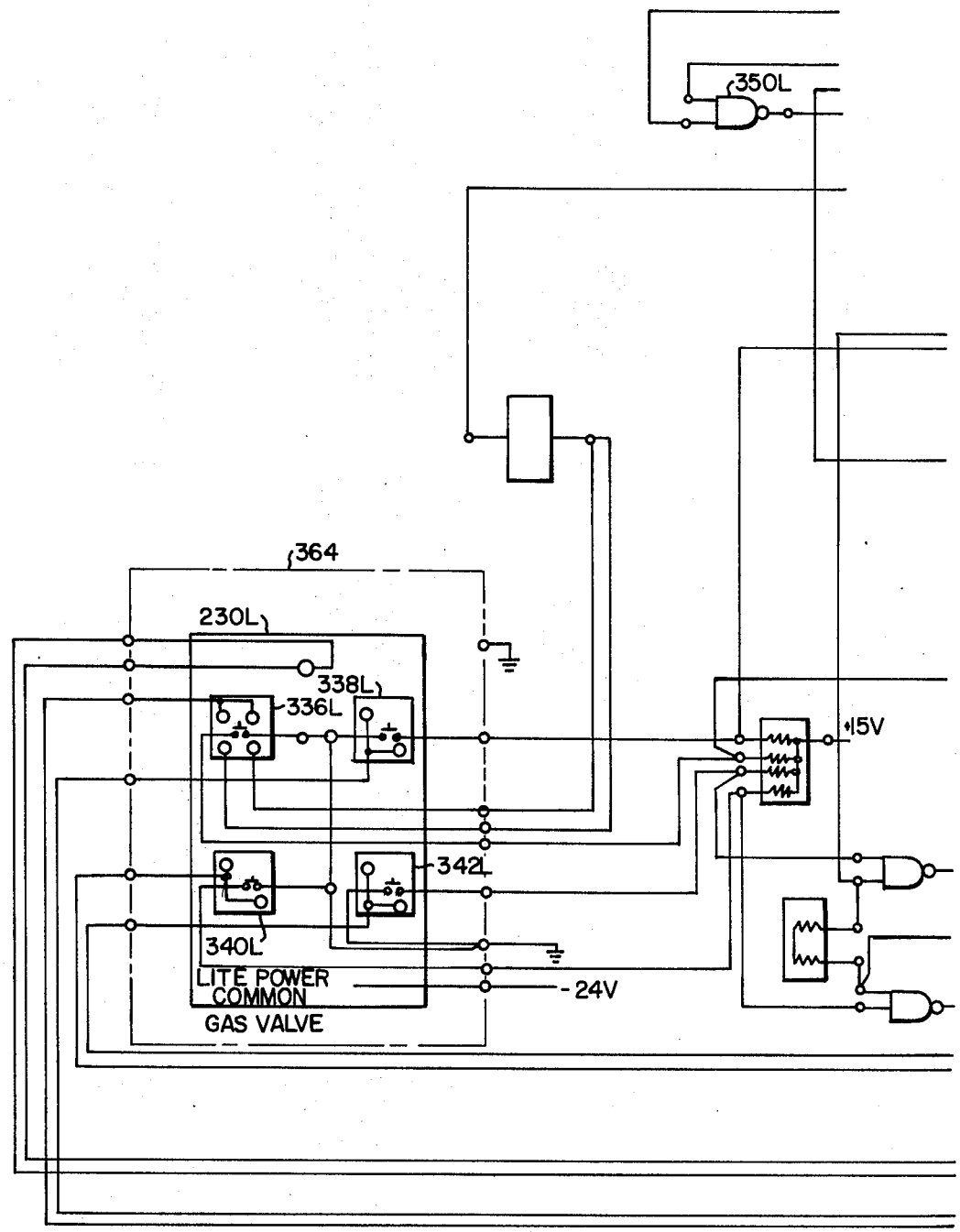
Figure 11H:
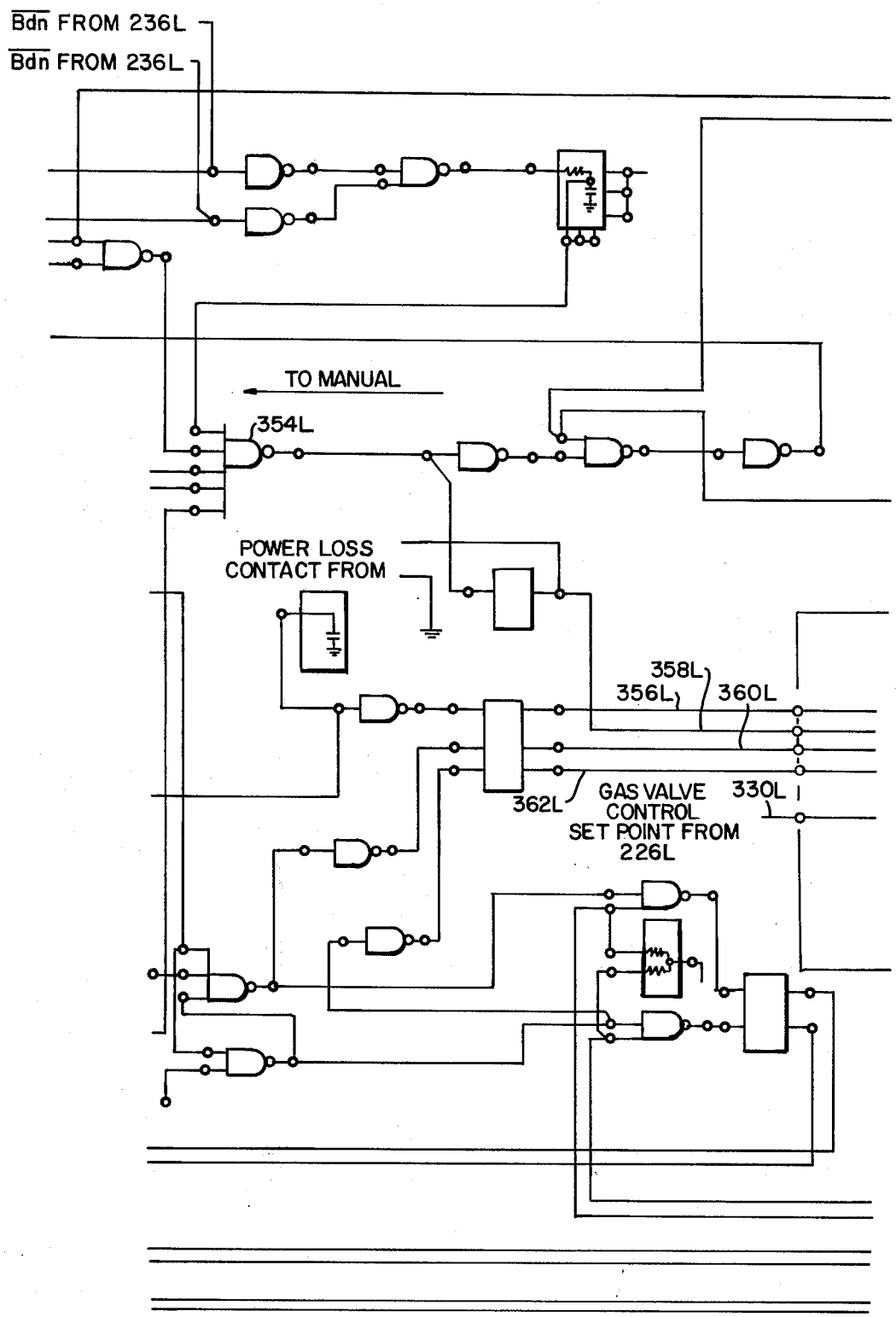
Figure 11:
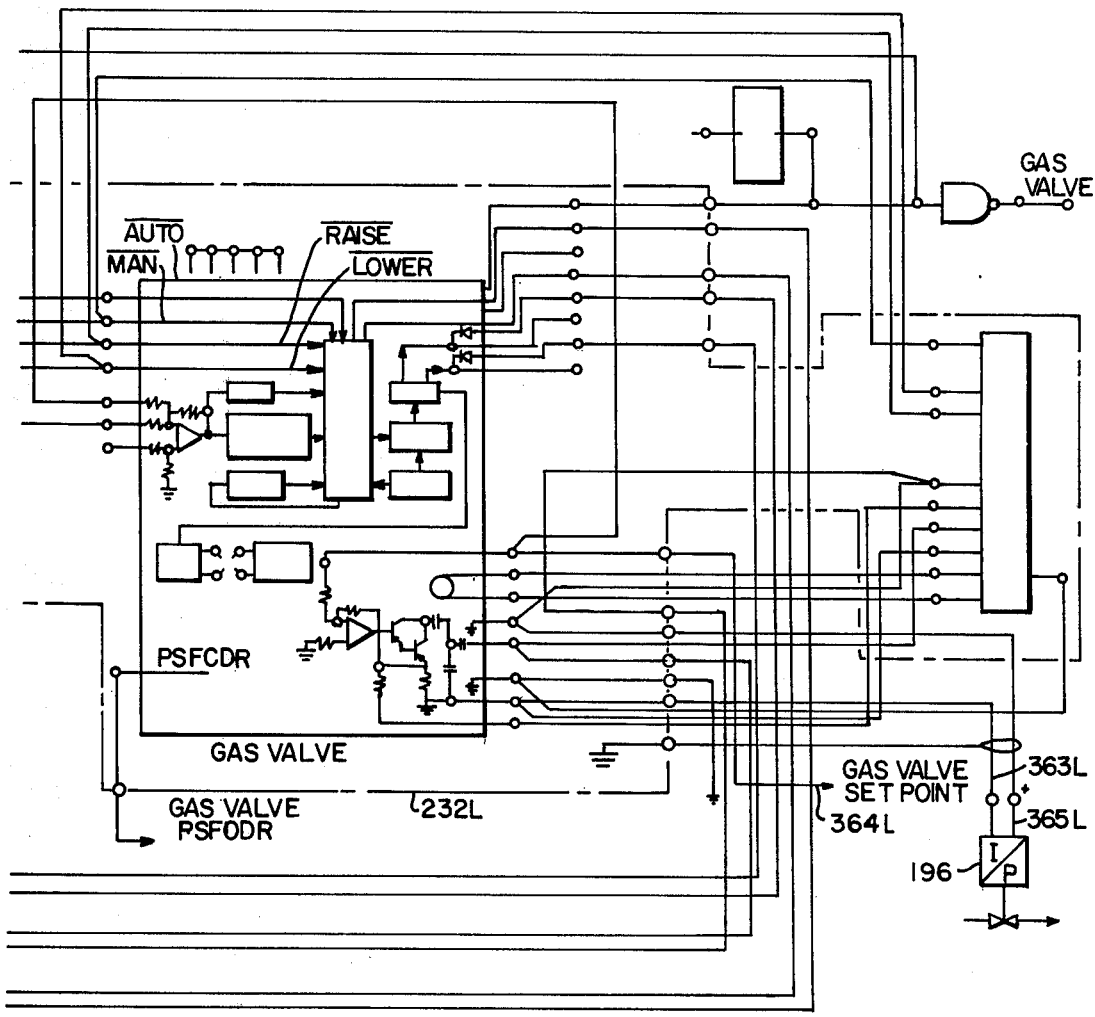
Figure 11J:
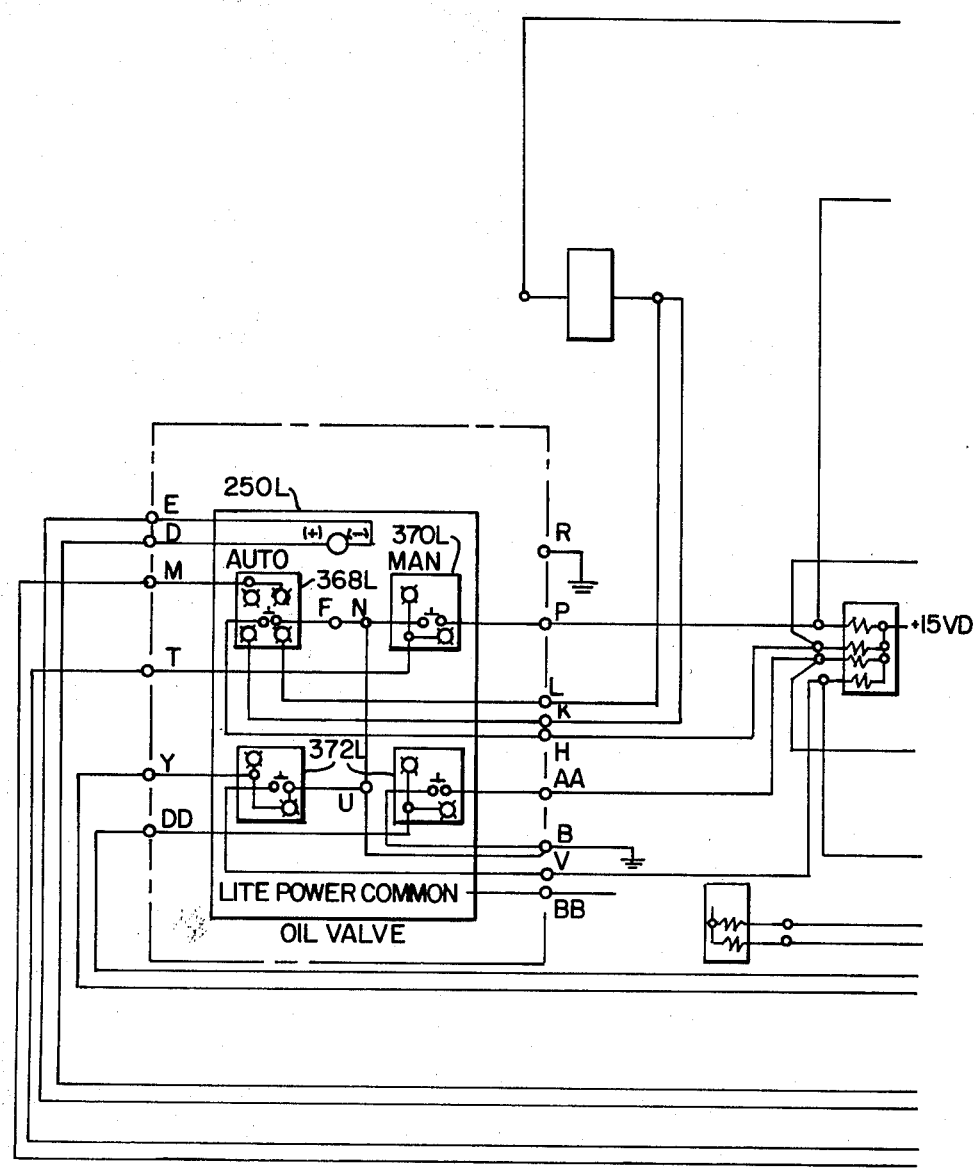
Figure 11K:
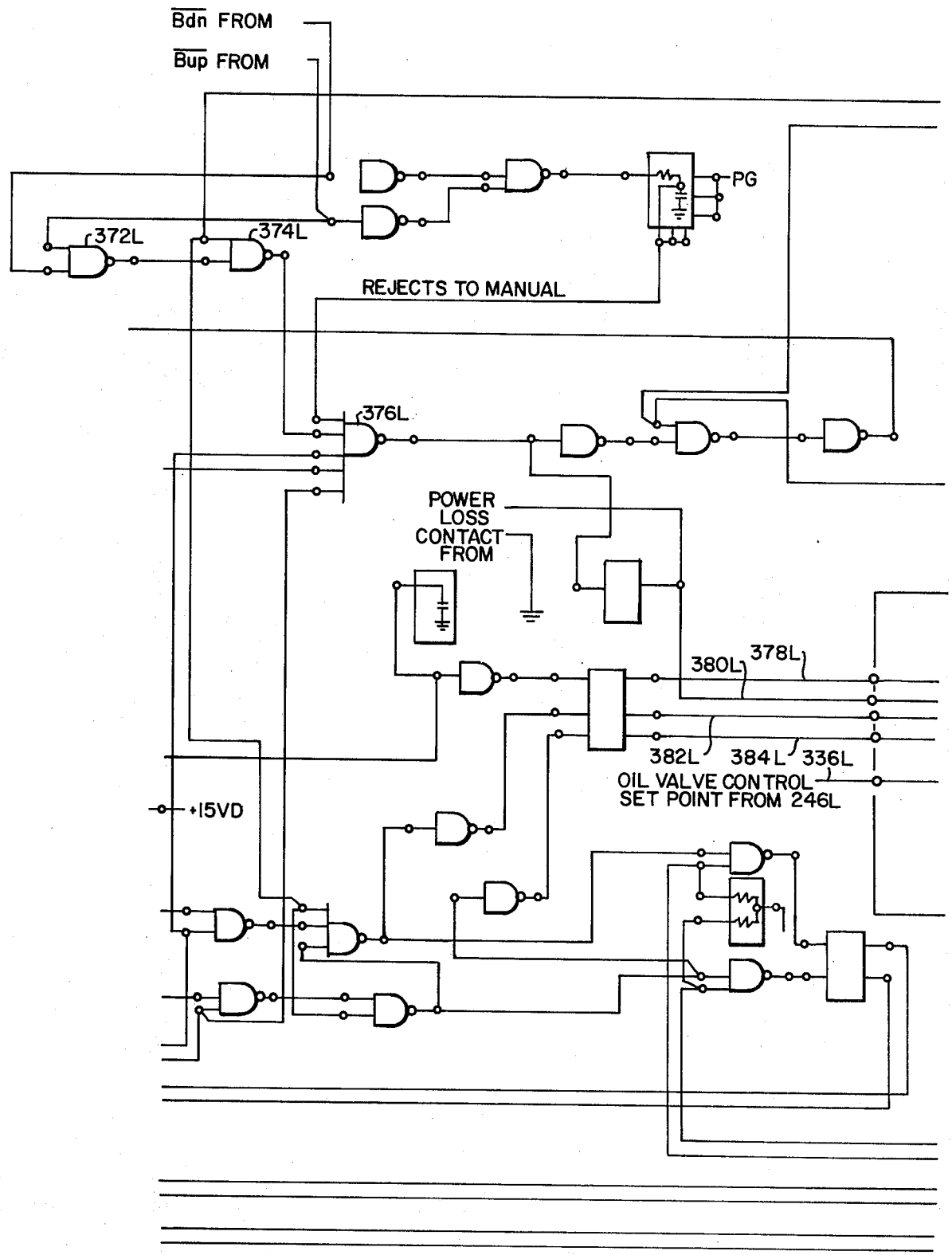
Figure 11L:
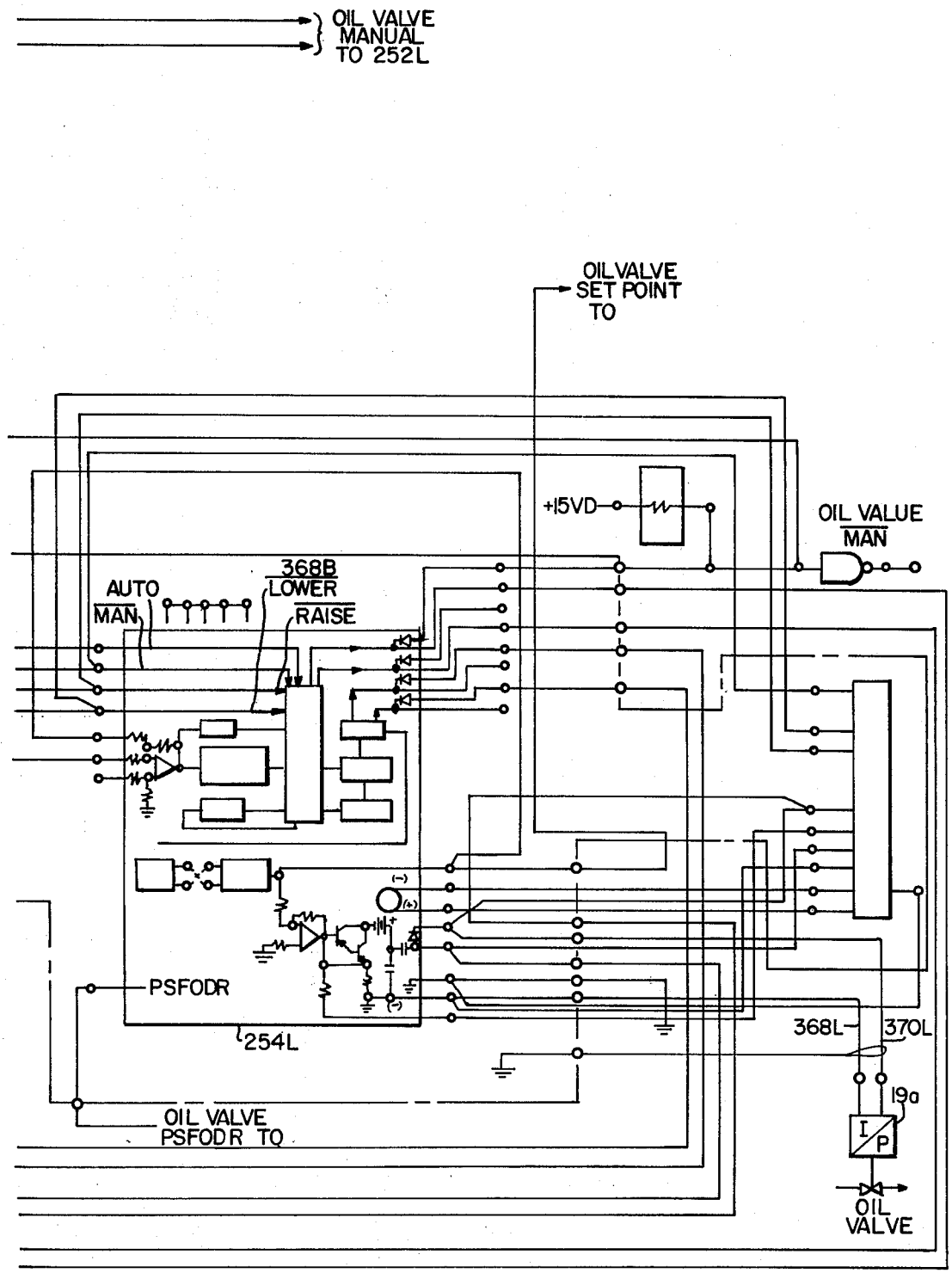
Figure 12:
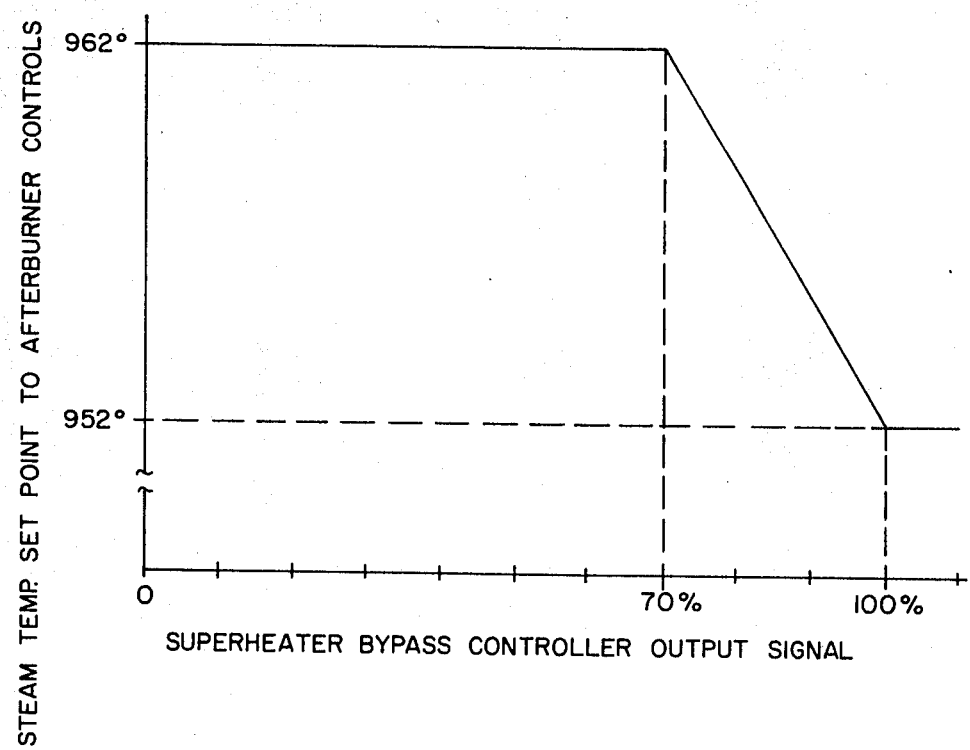
FIG. 12 is a graph illustrating the output of the function generator coordinating the first and second loops as shown generally in FIG. 7.

In FIGS. 11A and 11L, there is shown the detailed circuitry preferably employed to implement the functions described in connection with FIGS. 9A and 9B. As shown in FIG. 11, the digital control center gas temperature setpoint derived from the digital computer is applied by input connector 166L into the transfer block 170L. In FIG. 11A, the circuitry of the function block 170L and the process controller 172L, including a digital-to-analog converter, are shown within a single block designated with the numerals 170L and 172L. The output of the process controller 172L, in analog form, is applied by conductor 310L to the summing circuit 174L, the output of which is limited by the high-low limiting circuit 176L. In turn, the limited signal is applied to the ramp generator 178L by conductor 312L, to set the rate at which the ramp generator 178L increases the gas temperature setpoint. The ramp generator 178L output is fed back by conductor 180L to be summed with the output of the process controller 172 to control the operation of the ramp generator 178L.

Referring to FIG. 11A, the gas temperature setpoint may be manually entered through manual/auto control block 184 including AUTOMATIC and MANUAL pushbuttons 300L and 302L, and DOWN and UP pushbuttons 304L and 306L, whereby corresponding command signals are developed and applied to the input terminals of the process controller 172L. Upon actuation of the MANUAL pushbutton 302L, the operator-entered value is utilized by the transfer function block 170L as the gas temperature setpoint. The set block 168L takes the form of a variable impedance whose movable contact is set by the operator to determine the gas temperature rate limit setpoint, i.e. the maximum rate at which the ramp generator 178 may increase or decrease. As explained above in the event of either an afterburner trip or a superheat steam runback condition, suitable inputs are applied through an OR gate 190L, whereby a runback condition is set for a period of time as determined by the time delay 194L. The runback control signal is applied along conductors 314L and 316L to be applied to the lower input terminal of the process controller 172L, whereby a corresponding action is commanded.

The output of the ramp generator 178L is applied by connectors 180L and 318L to the high-select circuit 182L as shown in FIG. 11E. A second input is applied to the high-selector circuit 182L as derived from the superheated steam minimum temperature controller comprising, as shown in FIG. 11D, a subtraction circuit and a proportional plus integral circuit, both shown in a single block identified with the numerals 201L and 203L. The selected superheated steam temperature as derived from either of the temperature emitters 589 or 591 is applied to an input of the subtraction circuit 201L to be compared with a setpoint entered through setpoint block 202L. The output of the proportional plus integral circuit is limited by the high-low limiter 204L to provide an output to increase the analog gas temperature setpoint when a superheated steam temperature in the order of 700°F is sensed. The high-select circuit 182L selects the higher of the output of the ramp generator 178L or the superheated steam minimum temperature controller and applies the higher signal to the low-select circuit 138L.

Further, the selected superheated steam temperature signal also is applied by connector 196L to the superheated steam maximum temperature controller comprised of the subtraction circuit and the proportional plus integral circuit, both shown in a block designated 135L, 136L. A setpoint is entered through setpoint block 137L and the output of the proportional plus integral block 136L is limited by a high-low limiter 185L. A second input is derived from the function generator 128L as limited by the high-low limiting circuit 130L. As explained in detail, a signal indicative of the superheater bypass valve is derived from the driver card 158L associated with the superheat bypass valve 588 and is applied to the limiting circuit 130L and the function generator 128L. The function generator 128L produces the setpoint of the second or afterburner control valve control loop as a function of the position of the superheater bypass control valve, i.e. as the superheater bypass control valve is being fully opened under the control of the first control loop, the setpoint as developed by the superheated steam maximum temperature controller including the function generator 128L, decreases toward that setpoint as determined for the first control loop (see curve of FIG. 5G).

The output of the high-low limiting circuit 185L is applied to one input of the low-selector circuit 186L, whereas the other input is derived from the output of the superheat steam maximum pressure controller and in particular the high-low limiting circuit 208L. The superheated steam maximum pressure controller responds to an indication of the superheat steam pressure as derived from the pressure transmitter 592 and its output is applied to the subtraction circuit 207L, whereby a difference signal between the measured superheat steam pressure and a setpoint entered through setpoint block 206L. The difference signal is applied by the proportional plus integral circuit 209L as limited by the high-low limiting circuit 208L to the second input of the low-selector circuit 186L. Thus, if the pressure of the superheat steam approaches a selected value, e.g. 1250 PSIA, the superheat steam maximum pressure controller generates a signal to decrease the gas temperature setpoint. The lower of the signals as provided by the superheat steam maximum pressure controller and the superheat steam maximum temperature controller is determined by the low-selector circuit 186L and applied through the low-selector 138L to the conductor 184L.

As seen in FIG. 11E, the output of the low-selector circuit 186L is applied by connector 184 to the fuel main controller comprised of the subtraction circuit 214L and the proportional plus integral circuit 216L. A second input indicative of the selected gas inlet temperature as derived from temperature emitter 353 or 354 is applied by connector 187L to the fuel main controller. The output of the proportional plus integral circuit 216L is applied by connector 322L to an input of the transfer function block 220L taking the form of an energizable relay having one contact normally closed and the other normally open. As seen in FIG. 11F, the normally-closed contact applies the output of the fuel main controller to the high-selector circuit 222L by connector 322L. A setpoint indicative of the minimum gas valve setpoint is applied through the set block 224L to the high-selector circuit 222L, the output of which is in turn applied by connector 326L to the gas function generator 226L. The output of the gas function generator 226L is applied to a conductor 330L to control the afterburner gas valve 19b, as will be explained later.

In a manner similar to that as explained as to the afterburner gas valve control, the afterburner oil valve control forms a path along connector 332L from the transfer function block 220L to the oil valve high select circuit 242L to which a minimum oil value setpoint is applied through block 240L. In turn, the output of the high-selector circuit 242L is applied by connector 334L to the oil function generator 246L, whose output on connector 336L is applied in a manner to be explained to control the afterburner oil valve 19a.

FIGS. 11G, 11H and 11I relate to the manner in which the afterburner gas valve 19b may be operated in a MANUAL mode. In particular, a setpoint may be entered through the manual/auto control block 230L including AUTO and MANUAL pushbuttons 336L and 338L as well as DOWN and UP pushbuttons 340L and 342L, the actuation of which causes corresponding command signals to be applied by connectors 356L, 358L, 360L and 362L, to the corresponding inputs of the gas valve driver card 232L. The driver card 232L generates a drive signal applied by conductors 363L and 365L to control the position of the afterburner gas valve 19b. An input as derived from the function generator 226L (see FIG. 11E) is applied by conductors 330L to the driver card 233L (see FIG. 11I). the gate 354L forms a key portion of the transfer function block 228L (shown generally in FIG. 9B) and generates a reject to manual signal applied along connector 358L to the driver card 232L to dispose it in its MANUAL mode of operation. The gate 354L responds to a command from the manual/auto control 230L, as well as to the presence of a Bup or Bdn signal as applied to the gate 350L to operate the afterburner gas valve control in its MANUAL mode of operation.

The output of the gate 354L, indicating a reject to manual, is also applied by connector 366L to the AND gate 252L as seen in FIG. 11D. A similar reject to manual signal is developed by the afterburner oil valve control and is likewise applied to the gate 252L to enable or set the tracking amplifier 236L (see FIG. 11F) to a TRACKING mode of operation. In particular, the valve position signal as derived by the high-select circuit 256L (see FIG. 11E) in response to valve position signals applied thereto from the driver cards 232L and 254L associated respectively with the afterburner gas and oil valves. The high-select circuit 256L applies its output by connector 344L to the tracking amplifier 236L as shown in FIG. 11F, whose output is applied by connector 346L to the subtraction circuit 214L as a part of the fuel main controller, whereby the controller output is driven toward a value corresponding to that of the highest position valve signal as derived from either the afterburner gas valve or oil valve. Further, as shown in FIG. 11F, the tracking amplifier 236L generates Bup and Bdn signals to be applied to the transfer function blocks 228L and 248L (generally shown in FIG. 9B), and in particular to the gate 350L by connector 336L of the afterburner gas valve position control and to the gas 372L by connector 386L of the afterburner oil valve control.

FIGS. 11J, 11K and 11L relate primarily to the manner in which the afterburner oil valve 19a may be operated in its MANUAL mode and is similar in circuitry and function to the afterburner gas valve control as described above with respect to FIGS. 11G, 11H and 11I. Briefly, the manual/auto control block 250L includes AUTO, MANUAL, DOWN and UP pushbuttons 368L, 370L, 372L and 374L, for generating and applying as by conductors 378L, 380L, 382L and 384L to the corresponding inputs of the afterburner oil valve driver card 254L. In a manner similar to that described above, there is provided a gate 376L for generating a reject to manual signal when the afterburner oil valve control is being operated in its MANUAL mode. The output of the driver card 254L is applied by connectors 368L and 370L to drive the afterburner oil valve 19a to its set position (see FIG. 11L).

What is claimed is:

1. A combined cycle electric power plant comprising:
   a. at least one gas turbine including an exit through which heated exhaust gases pass;
   b. means for generating steam coupled to said gas turbine exit for transferring heat from the exhaust gases to a fluid passing through said steam generating means;
   c. a steam turbine coupled to said steam generating means and driven by the steam supplied thereby;
   d. means for generating electric power by the driving power of said turbines;
   e. an afterburner for supplying additional heat to the exhaust gases passing from said gas turbine to said steam generating means;
   f. valve means for controlling the flow of fuel to said afterburner;
   g. condenser means for receiving and converting the spent steam from said steam turbine into condensate;
   h. means for controlling the operation of said turbines and said steam generating means;
   i. said steam generating means including a heat exchange tube wherein the condensate flow derived from said condenser is heated by the exhaust gases from said gas turbine and having an inlet and outlet, a fluid conduit disposed between said inlet and outlet bypassing fluid about said heat exchange tube, and a bypass valve for setting the bypass flow about said heat exchange tube, the bypass fluid and the fluid heated by said heat exchange tube being combined to be directed to said steam turbine; and
   j. said controlling means comprising a first control means responsive to the temperature of the superheated steam directed to said steam turbine for controlling the position of said bypass valve, said first control means including first means for setting a first setpoint according to the desired value of temperature for the superheated steam passed to said steam turbine, with which said control means compares the superheated steam temperature to effect control of said bypass valve, and second control means responsive to the temperature of the superheated steam for controlling the position of said afterburner valve means, said second control means including means for setting a second setpoint higher than the first-mentioned setpoint, with which said second control means compares the superheated steam temperature to effect control of said afterburner valve means.

2. The combined cycle electric power plant as claimed in claim 1, wherein said controlling means includes coordinating means for applying the output of said first control means to said setpoint means of said second control means.

3. The combined cycle electric power plant as claimed in claim 2, wherein said coordinating means comprises a function generator to which the output of said first control means is applied for providing a setpoint varying with the opening of said bypass valve, the second setpoint being equal to the first setpoint at the maximum opening position of said bypass valve.

4. The combined cycle electric power plant as claimed in claim 1, wherein said first control means comprises a first subtraction circuit for providing a difference signal indicative of the measured steam temperature and the first setpoint, and said second control means comprises a second subtraction circuit for providing a difference signal indicative of the difference between the measured steam temperature and the second, varying setpoint.

5. The combined cycle electric power plant as claimed in claim 1, wherein said first control means comprises a first subtraction circuit for an output indicative of the difference between the first setpoint and a measured value of the superheated steam temperature, a proportional plus integral circuit for processing the output of said first subtraction circuit and a limiting circuit for limiting the output of said proportional plus integral circuit.

6. The combined cycle electric power plant as claimed in claim 5, wherein said first control means comprises differential circuit means responsive to the temperature of the exhaust gases heated by said afterburner for providing a differentiated signal thereof, and a summing circuit responsive to the differentiated output and the difference output of said first subtraction circuit to provide an output for the control of said bypass valve.

7. The combined cycle electric power plant as claimed in claim 6, wherein there is included differential circuit means responsive to the temperature of the superheated steam directed to said steam turbine for providing a differentiated output thereof to be applied to an input of said first subtraction circuit, whereby the output thereof is effected by a change of superheated steam temperature.

8. The combined cycle electric power plant as claimed in claim 5, wherein there is included differential circuit means responsive to the temperature of the gas turbine exhaust gases directed to said steam generator for providing a differentiated output thereof to be applied to said first subtraction circuit, whereby the output thereof is affected by a change of gas turbine exhaust gas temperature.

9. A combined cycle electric power plant comprising:
   a. at least one gas turbine including an exit through which heated exhaust gases pass;
   b. means for generating steam coupled to said gas turbine exit for transferring heat from the exhaust gases to a fluid passing through said steam generating means;
   c. a steam turbine coupled to said steam generating means and driven by the steam supplied thereby;
   d. means for generating electric power by the driving power of said turbines;
   e. an afterburner for supplying additional heat to the exhaust gases passing from said gas turbine to said steam generating means;
   f. valve means for controlling the flow of fuel to said afterburner;
   g. condenser means for receiving and converting the spent steam from said steam turbine into condensate;
   h. means for controlling the operation of said turbines and said steam generating means;
   i. said steam generating means including a heat exchange tube wherein the condensate flow derived from said condenser is heated by the exhaust gases from said gas turbine and having an inlet and outlet, a fluid conduit disposed between said inlet and outlet bypassing fluid about said heat exchange tube, and a bypass valve for setting the bypass flow about said heat exchange tube, the bypass fluid and the fluid heated by said heat exchange tube being combined to be directed to said steam turbine; and
   j. said controlling means comprising a first control means responsive to a characteristic of the superheated steam directed to said steam turbine for controlling the position of said bypass valve, second control means responsive to the aforementioned characteristic of the superheated steam for controlling the position of said afterburner valve means, means for setting a variable load demand signal indicative of the superheated steam temperature for a particular load placed upon said electric power generating means, and means for selecting the lower of the load demand signal or the output of said second control means for controlling the position of said afterburner valve means.

10. A control system for a steam generator for circulating steam to and from a steam turbine associated with a condenser for converting the spent steam from said steam turbine to condensate, said steam generator including a heat exchange tube, having an inlet and outlet, a fluid conduit disposed between said inlet and outlet bypassing fluid about said heat exchange tube, and a bypass valve for setting the bypass flow about said heat exchange tube, the bypass fluid and the fluid heated by said heat exchange tube being combined to be directed to said steam turbine, a burner for heating gases directed to said steam generator and a valve for controlling the fuel flow to said burner, said control system comprising:

first control means responsive to the temperature of the superheated steam directed to said steam turbine for controlling the position of said bypass valve, and including first means for setting a first setpoint according to the desired value of temperature for the superheated steam passed to said steam turbine, with which said first control means compares the superheated steam temperature to effect control of said bypass valve; and second control means responsive to the temperature of the superheated steam for controlling the position of said burner valve, and including means for setting a second setpoint higher than the first-mentioned setpoint, with which said second control means compares the superheated steam temperature for effecting control of said burner valve.

11. A control system for a steam generator as claimed in claim 10, further comprising coordinating means for applying the output of said first control means to said setpoint means of said control means.

12. A control system for a steam generator as claimed in claim 11, wherein said coordinating means comprises a function generator to which the output of said first control means is applied for providing a setpoint varying with the opening of said bypass valve, the second setpoint being equal to the first setpoint at the maximum opening position of said bypass valve.

13. A control system for a steam generator as claimed in claim 10, wherein said first control means comprises a first subtraction circuit for providing a difference signal indicative of the measured steam temperature and the first setpoint, and said second control means comprises a second subtraction circuit for providing a different signal indicative of the difference between the measured steam temperature and the second, varying setpoint.

14. A control system for a steam generator as claimed in claim 10, wherein said first control means comprises a first subtraction circuit for an output indicative of the difference between the first setpoint and a measured value of the superheated steam temperature, a proportional plus integral circuit for processing the output of said first subtraction circuit and a limiting circuit for limiting the output of said proportional plus integral circuit.

15. A control system for a steam generator as claimed in claim 14, wherein said first control means comprises differential circuit means responsive to the temperature of the gases heated by said burner for providing a differentiated signal thereof, and a summing circuit responsive to the differentiated output and the difference output of said first subtraction circuit to provide an output for the control of said bypass valve.

16. A control system for a steam generator as claimed in claim 15, wherein there is included differential circuit means responsive to the temperature of the superheated steam directed to said steam turbine for providing a differentiated output thereof to be applied to an input of said first subtraction circuit, whereby the output thereof is effected by a change of superheated steam temperature.

17. A control system for a steam generator for circulating steam to and from a steam turbine associated with a condenser for converting the spent steam from said steam turbine to condensate, said steam generator including a heat exchange tube, having an inlet and outlet, a fluid conduit disposed between said inlet and outlet bypassing fluid about said heat exchange tube, and a bypass valve for setting the bypass flow about said heat exchange tube, the bypass fluid and the fluid heated by said heat exchange tube being combined to be directed to said steam turbine, a burner for heating gases directed to said steam generator and a valve for controlling the fuel flow to said burner, said control system comprising:

first control means responsive to a characteristic of the superheated steam directed to said steam turbine for controlling the position of said bypass valve, second control means responsive to the aforementioned characteristic of the superheated steam for controlling the position of said burner valve, means for setting a variable load demand signal indicative of the characteristic of the superheated steam for a particular load placed upon said electric power generating means, and means for selecting the lower of the load demand signal or the output of said second control means for controlling the position of said burner valve.

18. A control system for a combined cycle electric power plant including a gas turbine including an exit through which heated exhaust gases pass, means for generating steam coupled to said gas turbine exit for transferring heat from the exhaust gases to a fluid passing through said steam generating means, a steam turbine coupled to said steam generating means and driven by the steam supplied thereby, means for generating electric power by the driving power of said turbines, condenser means for receiving and converting the spent steam from said steam turbine into condensate, said steam generating means including a heat exchange tube wherein the condensate flow derived from said condenser is heated by the exhaust gases from said turbine and having an inlet and outlet, a fluid conduit disposed between said inlet and outlet bypassing fluid about said heat exchange tube, and a bypass valve for setting the bypass flow about said heat exchange tube, the bypass fluid and the fluid heated by said heat exchange tube being combined to be directed to said steam turbine, an afterburner for supplying additional heat fuel flow to said afterburner, said control circuit comprising:

a. first control means responsive to the temperature of the superheated steam directed to said steam turbine for controlling the position of said bypass valve, and including first means for setting a first setpoint according to the desired temperature of the superheated steam passed to said steam turbine, with which said first control means compares a measured value of the superheated steam temperature to effect control of said bypass valve, and b. second control means responsive to the temperature of the heated steam for controlling the position of said afterburner valve means, and including means for setting a second setpoint higher than the first-mentioned setpoint, with which said second control means compares the measured value of superheated steam temperature for effecting control of said afterburner valve means.

19. A control system for a combined cycle electric power plant as claimed in claim 18, further comprising coordinating means for applying the output of said first control means to said setpoint means of said second control means.

20. A control system for a combined cycle electric power plant as claimed in claim 19, wherein said coordinating means comprises a function generator to which the output of said first control means is applied for providing a setpoint varying with the opening of said bypass valve, the second setpoint being equal to the first setpoint at the maximum opening position of said bypass valve.

21. A combined cycle electric power plant comprising:

a. at least one gas turbine including an exit through which heated exhaust gases pass;

b. means for generating steam coupled to said gas turbine exit for transferring heat from the exhaust gases to a fluid passing through said steam generating means;

c. a steam turbine coupled to said steam generating means and driven by the steam supplied thereby;

d. means for generating electric power by the driving power of said turbines;

e. an afterburner for supplying additional heat to the exhaust gases passing from said gas turbine to said steam generating means;

f. valve means for controlling the flow of fuel to said afterburner;

g. condenser means for receiving and converting the spent steam from said steam turbine into condensate;

h. means for controlling the operation of said turbines and said steam generating means;

i. said steam generating means including a heat exchange tube wherein the condensate flow derived from said condenser is heated by the exhaust gases from said gas turbine and having an inlet and outlet, a fluid conduit disposed between said inlet and outlet bypassing fluid about said heat exchange tube, and a bypass valve for setting the bypass flow about said heat exchange tube, the bypass fluid and the fluid heated by said heat exchange tube being combined to be directed to said steam turbine; and j. said controlling means comprising a first control means responsive to a characteristic of the superheated steam directed to said steam turbine for controlling the position of said bypass valve, second control means responsive to the aforementioned characteristic of the superheated steam for controlling the position of said afterburner valve means, and means for coordinating the operation of said first and second control means in a manner whereby said first control means is operative to control said bypass valve in a first range of the superheated steam characteristic and said second control means is operative in a second range of the superheated steam characteristic greater than the first range, to control said afterburner valve so that said controlling means is effective to control the superheated steam characteristic throughout both of the first and second ranges.

22. A control system for a steam generator for circulating steam to and from a steam turbine associated with a condenser for converting the spent steam from said steam turbine to condensate, said steam generator including a heat exchange tube, having an inlet and outlet, a fluid conduit disposed between said inlet and outlet bypassing fluid about said heat exchange tube, and a bypass valve for setting the bypass flow about said heat exchange tube, the bypass fluid and the fluid heated by said heat exchange tube being combined to be directed to said steam turbine, a burner for heating gases directed to said steam generator and a valve for controlling the fuel flow to said burner, said control system comprising:

first control means responsive to a characteristic of the superheated steam directed to said steam turbine for controlling the position of said bypass valve, second control means responsive to the aforementioned characteristic of the superheated steam for controlling the position of said burner valve, and means for coordinating the operation of said first and second control means in a manner whereby said first control means is operative to control said bypass valve in a first range of the superheated steam characteristic and said second control means is operative in a second range of the superheated steam characteristic greater than the first range to control said afterburner valve so that said controlling means is operative to control effectively the superheatd steam characteristic throughout both of the first and second ranges.

23. A control system for a combined cycle electric power plant including a gas turbine including an exit through which heated exhaust gases pass, means for generating steam coupled to said gas turbine exit for transferring heat from the exhaust gases to a fluid passing through said steam generating means and driven by the steam supplied thereby, means for generating electric power by the driving power of said turbines, condenser means for receiving and converting the spent steam from said steam turbine into condensate, said steam generating means including a heat exchange tube wherein the condensate flow derived from said condenser is heated by the exhaust gases from said gas turbine and having an inlet and outlet, a fluid conduit disposed between said inlet and outlet bypassing fluid about said heat exchange tube, and a bypass valve for setting the bypass flow about said heat exchange tube, the bypass fluid and the fluid heated by said heat exchange tube being combined to be directed to said steam turbine, an afterburner for supplying additional heat to the exhaust gases passing from said gas turbine to said steam generating means, and valve means for controlling the fuel flow to said afterburner, said control system comprising:

a. first control means responsive to a characteristic of the superheated steam directed to said steam turbine for controlling the position of said bypass valve;

b. second control means responsive to the aforementioned characteristic of the superheated steam for controlling the position of said afterburner valve means; and c. means for coordinating the operation of said first and second control means in a manner whereby said first control means is operative to control said bypass valve in a first range of the superheated steam characteristic and said second control means is operative in a second range of the superheated steam characteristic greater than the first range to control said afterburner valve so that said control system is operative to control effectively the superheated steam characteristic throughout both of the first and second ranges.

* * * * *